US007082463B1

(12) United States Patent
Bradley et al.

(10) Patent No.: US 7,082,463 B1
(45) Date of Patent: Jul. 25, 2006

(54) TIME-BASED MONITORING OF SERVICE LEVEL AGREEMENTS

(75) Inventors: Karen Ann Bradley, San Jose, CA (US); Christian Lemler, Fremont, CA (US); Amrit C. Patel, Pleasanton, CA (US); Ray Mein Lau, Sacramento, CA (US)

(73) Assignee: Cisco Technology, Inc., San Jose, CA (US)

( * ) Notice: Subject to any disclaimer, the term of this patent is extended or adjusted under 35 U.S.C. 154(b) by 733 days.

(21) Appl. No.: 09/727,567

(22) Filed: Nov. 30, 2000

Related U.S. Application Data

(60) Provisional application No. 60/210,236, filed on Jun. 7, 2000, provisional application No. 60/210,237, filed on Jun. 7, 2000.

(51) Int. Cl.
*G06F 15/173* (2006.01)

(52) U.S. Cl. ...................................... 709/223; 709/224

(58) Field of Classification Search ................ 709/224, 709/200, 223; 370/230; 715/500, 513; 714/4; 707/104.1
See application file for complete search history.

(56) References Cited

U.S. PATENT DOCUMENTS 5,488,715 A * 1/1996 Wainwright .................... 714/4
5,893,905 A 4/1999 Main et al.
5,974,237 A * 10/1999 Shurmer et al. ............ 709/224
6,269,401 B1 7/2001 Fletcher et al.
6,304,892 B1 10/2001 Bhoj et al.
6,311,175 B1 * 10/2001 Adriaans et al. .............. 706/25
6,336,138 B1 * 1/2002 Caswell et al. ............. 709/223
6,363,053 B1 * 3/2002 Schuster et al. ............ 370/230
6,397,359 B1 5/2002 Chandra et al.
6,459,682 B1 10/2002 Ellesson et al.
6,466,984 B1 10/2002 Naveh et al.
6,584,502 B1 * 6/2003 Natarajan et al. ........... 709/224

(Continued)

OTHER PUBLICATIONS

St. Laurent, Simon, Describing your Data: DTDs and XML Schemas, Dec. 1, 1999, O'Reilly XML.com, pp. 1-7.*

(Continued)

*Primary Examiner*—John Follansbee
*Assistant Examiner*—Kenny Lin
(74) *Attorney, Agent, or Firm*—Hickman Palermo Truong & Becker, LLP

(57) ABSTRACT

A Time-Based Service Monitoring mechanism for monitoring Service Level Agreements (SLAs) over specific time intervals is described. To provide for the time-based monitoring of service, data is received for defining one or more tests for monitoring the level of network service that is being provided to a particular customer. Based on the received data, information is created and stored that defines a specific time range for when the one or more tests are to be enforced. The one or more tests are distributed to one or more agents that are configured to communicate with devices that are associated with the network. The devices are then configured to perform the one or more tests within the specific time range. Based on the results, the customer is provided information indicating whether they are receiving the level of service that has been guaranteed by the service provider over the specific time intervals.

18 Claims, 16 Drawing Sheets

U.S. PATENT DOCUMENTS

| | | | | |
|---|---|---|---|---|
| 6,687,873 | B1* | 2/2004 | Ballantyne et al. | 715/500 |
| 6,701,342 | B1 | 3/2004 | Bartz et al. | |
| 6,701,345 | B1 | 3/2004 | Carley et al. | |
| 6,704,883 | B1 | 3/2004 | Zhang et al. | |
| 2002/0049815 | A1 | 4/2002 | Dattatri | |
| 2002/0169788 | A1* | 11/2002 | Lee et al. | 707/104.1 |
| 2003/0187966 | A1 | 10/2003 | Sinha | |

OTHER PUBLICATIONS

Internet Draft: Schema for service Level Administration of Differentiated Services and Integrated Services in Networks draft-ellesson-sla-schema-00.txt, Ed Ellesson, IBM, Feb. 19, 1998.

* cited by examiner

250

305

506

568

567

569

570

700

TIME-BASED MONITORING OF SERVICE LEVEL AGREEMENTS

RELATED APPLICATION

This application claims domestic priority from prior provisional application Ser. No. 60/210,236, filed on Jun. 7, 2000, entitled TIME-BASED MONITORING OF SERVICE LEVEL AGREEMENTS, and naming as inventors Karen Bradley, Christian Lemler, Amrit Patel and Ray Lau, which claims benefit of Provisional Application No. 60/210,237, filed Jun. 7, 2,000 the entire disclosure of which is hereby incorporated by reference as if fully set forth herein.

COPYRIGHT AUTHORIZATION

A portion of the disclosure of this patent document contains material which is subject to copyright protection. The copyright owner has no objection to the facsimile reproduction by any one of the patent disclosures, as it appears in the U.S. Patent & Trademark Office patent files or records, but otherwise reserves all copyright rights whatsoever.

FIELD OF THE INVENTION

The present invention generally relates to the management of network systems, and more specifically to time-based monitoring of Service Level Agreement (SLA).

BACKGROUND OF THE INVENTION

The ability to network and share resources is extremely critical for the success and prosperity of most companies. In general, a service provider, often generally referred to as an Internet Service Provider (ISP), supplies the services that are needed to allow a company to share its resources between different remote sites. For example, a company_X may have a headquarters site in Chicago and a plurality of satellite sites that are located in Miami, Seattle, Los Angeles and Dallas. To allow the different sites to communicate and share resources with each other, company_X may enter into a Service Level Agreements (SLA) with a particular Service Provider (SP) to obtain the necessary services.

A Service Level Agreement is a contract between the supplier of a service, (the SP) and the users of that service (the Customer). In general, the Service Level Agreement sets out the levels of service that will be offered, preferably in quantitative terms, and any obligations that are required by the Customer of the service. For example, a typical Service Level Agreement for a network service will typically set out the expected levels of service measured in such terms as: (1) availability; (2) latency; (3) bandwidth quality; (4) response times and other similar measures of service as seen by the end user. To be in compliance with the Service Level Agreement, the Service Provider must provide the Customer with a service quality that either meets or exceeds the quality of service that is guaranteed by the Service Level Agreement.

In today's market, Service Level Agreements have become an important marketing tool for differentiating the quality of service that is to be guaranteed on the part of a particular Service Providers. For example, by comparing the Service Level Agreement of two or more Service Providers, a Customer can quickly determine which provider is most cost effective for their needs. However, from a Customer's stand-point, the implementation and accountability of a Service Provider remains problematic.

In particular, there is a lack of available tools that a Customer may use to determine whether a Service Provider is in compliance with a Service Level Agreement. For example, one of the most popular techniques used for measuring network service levels is the ICMP ping. By "pinging" different devices within a network, it can quickly be determined which devices are able to communicate with each other. An advantage of this technique is that it provides a simple universal means for determining the basic connectivity of a network system. However, a significant drawback with using the ICMP ping is that it does not characterize the actual experiences of higher layer and application traffic. Thus, although the ICMP ping may be used to determine whether a connection exists between a pair of network devices, it cannot be used to determine service metrics such as the actual throughput or variation between packets (jitter) that is seen by the devices within the network system.

Furthermore, because these organizations have a customer/provider relationship, there are significant monetary terms that define the acceptability of the service levels. The main interest of a customer is to obtain the service levels adequate for their business. Hence a customer is motivated to monitor service levels both as a report card on the provider and as a tool to demand better service. However, because there are no standardized measurements for determining the quality of service that is provided by a Service Provider, even if a Customer could create a set of tests to determine whether they are receiving the quality of service that is guaranteed by the Service Level Agreement, the Service Provider may oppose the method or technique that were used in determining the service quality.

In addition, the quality of service that is acceptable to a customer may vary over time. For example, a customer may require a higher quality or level of service from the hours of 7:00 am to 10:00 pm, then they do from the hours of 10:00 pm to 7:00 am. However, there is currently no mechanism for performing time-based monitoring of the quality of service that is provided to a customer.

Based on the foregoing, there is a clear need for a mechanism that can be used to determine whether a Customer is receiving the quality of service that has been guaranteed within a Service Level Agreement.

There is further a need for a mechanism for performing time-based monitoring of the quality of service that is being provided to a customer.

There is also a clear need for a mechanism that can be run by the Customer to consistently generate reliable test results for which a Service Provider concedes are representative of the quality of service that is being provided to the Customer.

There is still further need for a mechanism that can monitor the level of service that is being provided on a long-term basis and to provide feedback over an extended period of time as to the Service Provider's compliance with a Service Level Agreement.

SUMMARY OF THE INVENTION

A Time-Based Service Monitoring mechanism is provided for monitoring Service Level Agreements (SLAs). In one aspect, a method for monitoring a level of network service offered by a service provider is provided. According to the method, data is received for defining one or more tests for monitoring the level of network service that is being provided to a particular customer. Information is created and stored that defines a specific time range for when the one or more tests are to be enforced. The one or more tests are distributed to one or more agents that are configured to communicate with devices that are associated with the network. The devices are configured to perform the one or more tests within the specific time range.

The invention also encompasses a computer-readable medium, and a network device, configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
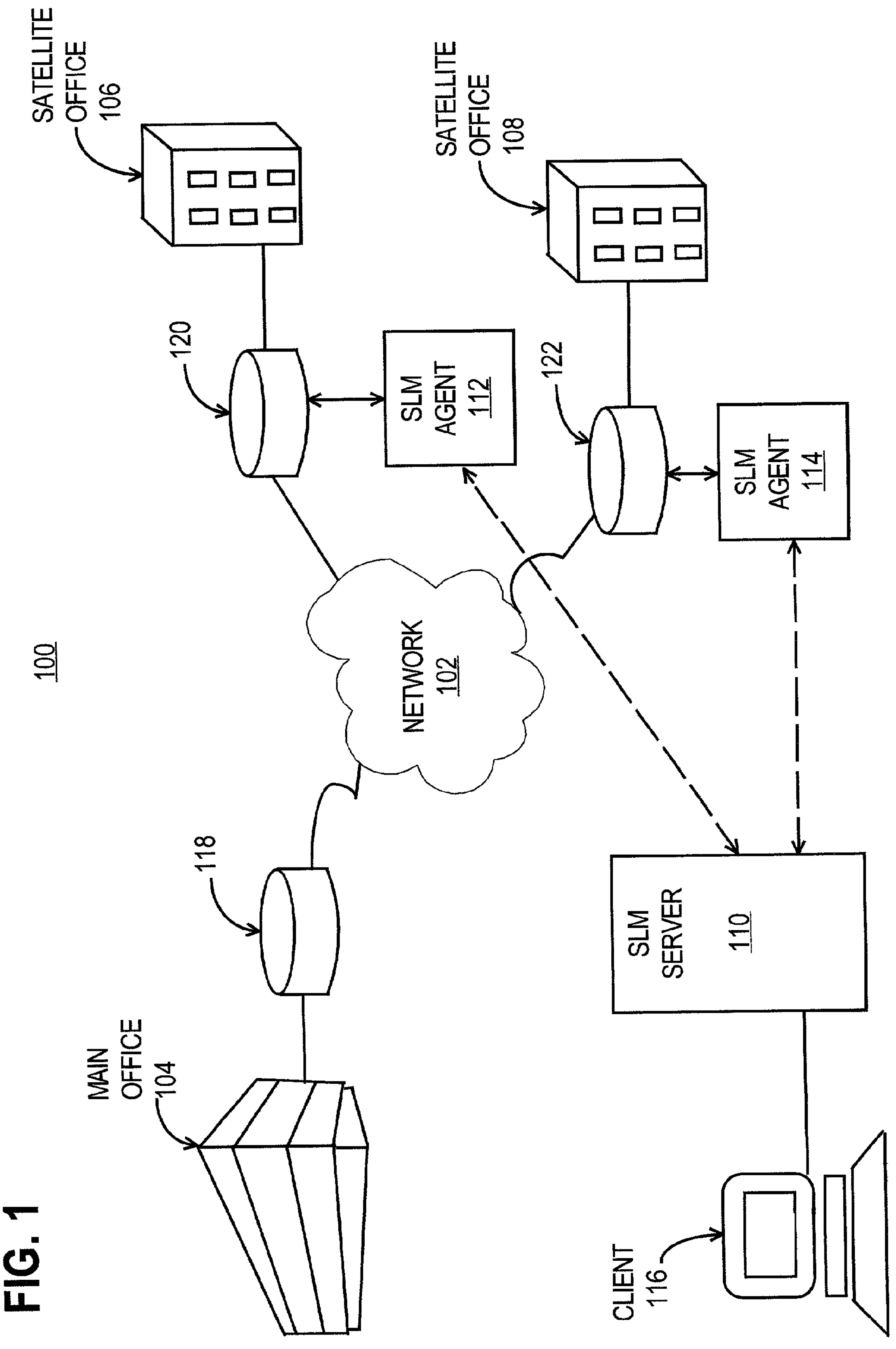
FIG. 1 is a block diagram of a computer system architecture in which the present invention may be utilized.

A method and apparatus for providing time-based monitoring of Service Level Agreement (SLAs) and Service Level Contracts (SLCs) is disclosed. In one embodiment, a set of standardized Document Type Definitions (DTDs) are used to provide an standard open interface for creating, monitoring and managing SLAs and SLCs. By providing a standard open interface, different applications, including third party applications can be configured for monitoring and managing SLAs and SLCs via a standardized common interface. In addition, the standard open interface provides a mechanism whereby a user may define one or more specific time ranges for when the one or more tests are to be enforced. For example, through the standard open interface a user may generate an SLC that contains one or more SLAs, and which defines a particular time range (apply times) over which the one or more SLAs apply (e.g. Monday–Friday, 9:00 am–5:00 pm). Thus, users may specify a particular time range in which a particular level of service is to be verified.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Operational Context

A service monitoring mechanism for providing a standardized interface for monitoring Service Level Agreements (SLAs) and Service Level Contracts (SLCs) is provided. An SLA defines the expected level of service for a specific type of network operation (e.g., DNS lookup response time, or Jitter) that is guaranteed by a service provider. An SLA encapsulates the type of network service that should be monitored, the acceptable levels of performance (thresholds), and the list of device pairs covered by the SLA.

For example, an SLA may guarantee that a customer will incur a maximum message latency of 200 milliseconds (ms) between devices A and B, and a maximum packet jitter of ~75 ms. To verify that the customer is receiving the service that is guaranteed by the SLA, the service monitoring mechanism performs metric tests to monitor the service that is actually being provided to the customer.

Alternatively, a Service Level Contract (SLC) as used herein, is a contract or agreement between a service provider and a customer. An SLC contains one or more specific SLAs and defines the time range or interval for which the corresponding SLAs apply. For example, an SLC may indicate that a particular set of SLAs are to be applied from 8:00 am–7:00 pm on Monday through Friday.

In general, each SLC is associated with a unique identifier or name that distinguishes it from all other SLC configurations that are maintained by a SLM server. In one embodiment, the SLM Server uses the unique identifier to identify the SLCs that are associated with a particular customer.

According to one embodiment of the invention, a Service Level Manger (SLM) is configured to manage, monitor, and verify the SLAs that have been established between a customer and a Service Provider. The SLM provides a standardized open interface that allow users, including third parties, to define SLCs and SLAs for monitoring and verifying the level of service that is being provided by a service provider.

In one embodiment, the standardized open interface is provided through the use of one or more Data Type Definitions (DTDs) that include a set of rules which define the tags that can be included within a document, for example an XML document, and how the tags may be nested with each other (XML schema). Moreover, the one or more DTDs specify the set of required and optional elements (and their attributes) and the ways in which they may be combined within a document.

In certain embodiments, a set of standardized template definitions are provided that define for an SLA, the type of information that is to be collected, how often the information is to be collected and what constitutes a violation of the contract. Thus, by interfacing with the SLM a customer can determine whether they are actually receiving the service they are paying for from the Service Provider. In addition, because the SLM provides a set of standardized templates or "configuration" definitions for monitoring an SLA, the Service Providers are assured that generated test results are in fact reliable.

In one embodiment, the standardized templates define a set of metric tests that a service provider has approved for verifying the level service that is being provided to a customer. In certain embodiments, the standardized templates may include a group of metric test parameters that has been approved for verifying the level service that is being provided to a customer. The metric test parameters define a range of values that may be used for verifying the level service that is being provided to a customer.

FIG. 1 is a block diagram of a system 100 in which the invention can be used. Generally, the system 100 includes a SLM Server 110, one or more devices 118,120,122, one or more SLM Agents 112,114, one or more Customer sites 104,106,108, a client 116, and a network 102.

Customer sites 104,106,108 represent different campuses that have been established by a particular entity. Customer Sites 104,106,108 may be located relatively close from one another or may be separated by thousands of miles.

Devices 118,120,122, represent a group of managed devices such as switches, or routers that are connected to network 102 and which provide communication services for Customer Sites 104,106,108.

Client 116 may be a device, such as a personal computer or workstation. In certain embodiments, client 116 includes a browser application, such as Microsoft Internet Explorer® or Netscape Navigator®, which may be used to communicate with the SLM Server 110 in a client/server type relationship. Although FIG. 1 depicts only a single client 116, in certain embodiments, multiple clients may be configured to communicate with the SLM Server 110.

SLM Server 110 is a computer, or one or more hardware or software components or processes that cooperate or execute in one or more computer systems. As will be explained in detail below, SLM server 110 is configured to communicate with Client 116 through a standard open interface that allows users to define, update and manage SLAs and SLCs. In one embodiment, the SLM Server 110 performs as a central processing and reporting unit. In this capacity, the SLM Server 110 is responsible for archiving and processing SLC requests (create/modify requests) that are received from client 116 and for managing the SLM Agents 112,114. When an SLC is created or updated, the SLM Server 110 parses the SLC and contacts the appropriate SLM Agents to gather data for the SLAs that are defined within the SLC. Thereafter, the SLM Server 110 periodically sweeps the SLM Agents to gather the data and to store the results. In certain embodiments, SLM Server 110 may itself be configured to include a SLM Agent, such as SLM Agents 112, 114.

SLM Agents 112, 114 are computers, or one or more hardware or software components or processes that cooperate or execute in one or more computer systems. SLM Agents 112, 114 may be distributed anywhere on the network are configured to communicate with the SLM Server 110 and to perform the required setup and polling of the managed devices to obtain metric information about the quality of service that is being provided to the Customer sites 104,106,108. These functions include but are not limited to collecting data, performing data aggregation, monitoring resources, tracking non-responding devices and maintaining data repositories. In one embodiment, the SLM Agents 112, 114 store the metric information locally as it is received. The information is then communicated back to the SLM Server 110 at a later time.

Network 102 is a private or semi-private company network that is used to communicate between the different Customer sites 104,106,108. Network 102 may be configured as part of a LAN or WAN and may use a variety of different communication protocols.

Open Standard Interface

Figure 2A:
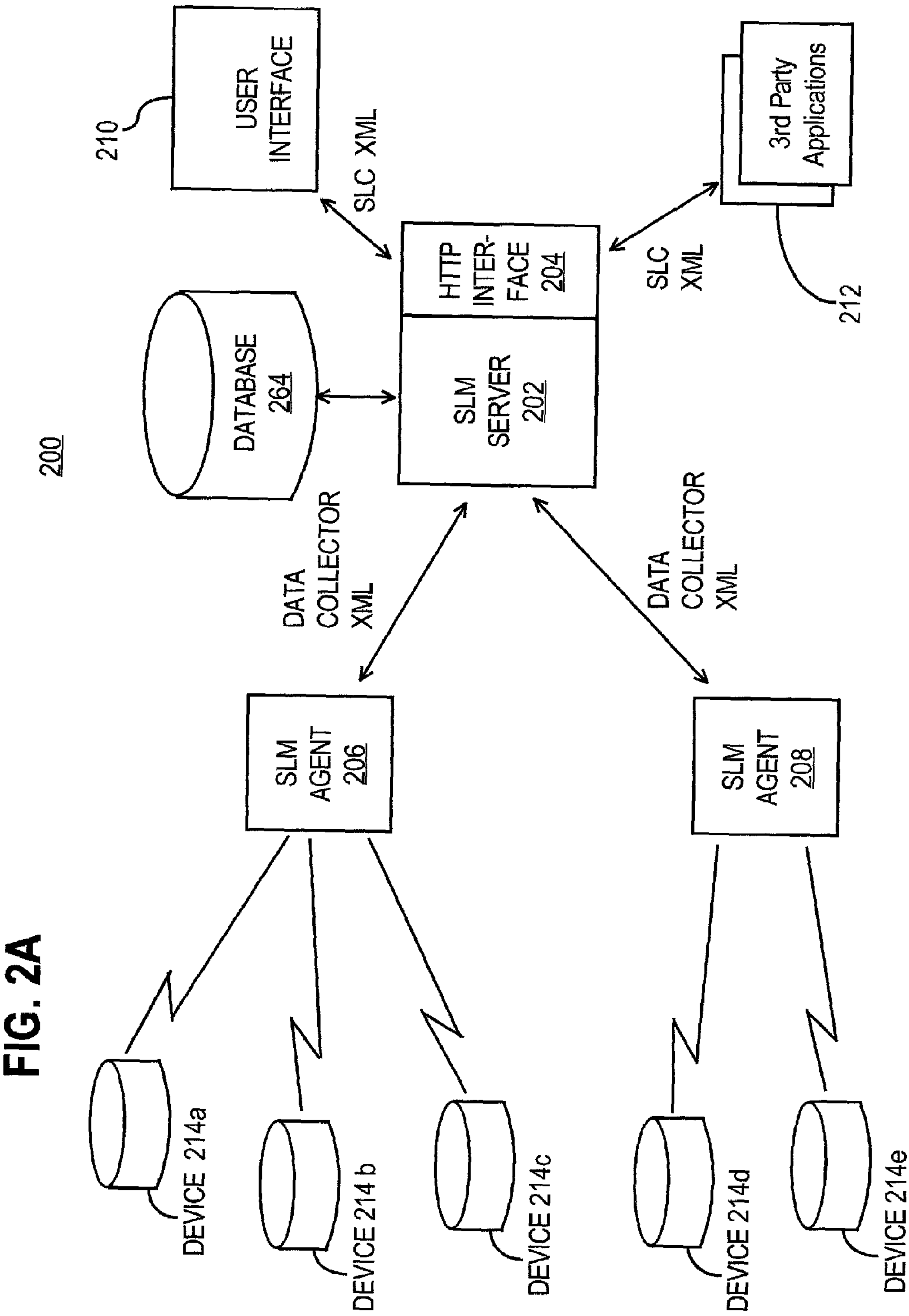
FIG. 2A is a block diagram illustrating a communication mechanism for monitoring Service Level Agreements.

FIG. 2A is a block diagram that illustrates a system 200 that provides an open standardized communication interface for monitoring Service Level Agreements. In one embodiment, an interface, such as HTTP interface 204 is provided to allow third party applications 212 to integrate SLM into their own network management tools. For example, as depicted in FIG. 2A, SLM server 202 includes an HTTP interface 204 for communicating with third party applications 212. In one embodiment, system 200 provides a standard open architecture for communicating service level contracts with the SLM server. In certain embodiments, HTTP interface 204 provides a platform independent interface using an open standard API that is built upon HTTP and XML. The HTTP interface 204 provides a mechanism for creating, initiating, modifying and deleting SLCs and SLAs. The HTTP interface 204 also provides an interface for retrieving data that was gathered as part of an SLA and for displaying reports based on data that was collected for a given SLA or SLC.

In addition to allowing third party applications 212 to integrate SLM into their own network management tools, in certain embodiments, SLM server 202 provides a user interface 210 that may received and displayed on a client that is connected or networked with SLM server 202. For example, user interface 210 may be communicated and displayed at client, such as client 116. By interacting with user interface 210 a user can create, initiate, modify and delete SLCs and SLAs. The user interface 2010 also provides a mechanism for user to retrieve data that was gathered as part of an SLA and to display reports based on a data that was collected for a given SLA or SLC.

As illustrated in FIG. 2A, in one embodiment, the SLM server 202 exposes interfaces for working with Service Level Contracts and for retrieving results through the use of XML. Clients are allowed to connect to the SLM server 202 using HTTP and to pass requests, (such as create, modify, delete SLC) as a series of POST parameters. Upon receiving a request, SLM server 202 services the request and returns the results using XML.

As previously indicated, the SLM server 202 is responsible for archiving and processing SLC requests. When an SLC is created, the SLM server 202 communicates with the distributed SLM agents, such as SLM agents 206 and 208 to gather metric data for the defined SLC. In response, SLM agents 206,208 perform the setup and polling of each managed device as specified in the SLC. For example, SLM agents 206,208 may be configured as Management Engine 1100 (ME 1100), commercially available from Cisco Systems, Inc.

In one embodiment, the SLM agents 206,208 are configured to store the results to a local disk for later retrieval by the SLM server 202 which is configured to periodically sweep the SLM agents 206,208 to gather the data. As depicted, SLM Server 202 may be coupled to a database 264 that is used to maintain the different SLC and SLA configurations that have previously been defined. In addition, database 264 may also be used to store the results received from SLM Agents 206,208 and for generating and storing the report information that is presented to clients 258,260.

As illustrated in FIG. 2A, the SLM server 202 may be configured to communicate with the SLM agents 206,208 using XML. The use of HTTP and XML can eliminate common problems, such as Firewall issues and language dependence that is often incumbent with other technologies such as CORBA or RMI. In addition, using a communication protocol or standardized language such as HTTP and XML, allows applications to be developed using a variety of languages, such as Perl, Java, or C++, on virtually any operating system and to be distributed across a variety of networks.

In particular, Appendix A describes in detail a method for modeling SLCs and SLAs using XML. In one embodiment, a set of Document Type Definitions (DTDs) are used to capture and model the SLCs and SLAs which define a contract between a customer and a Service Provider. As illustrated in Appendix A, the DTDs define an XML schema for providing an online standardized contract configuration for monitoring service level contracts and agreements.

Figure 2B:
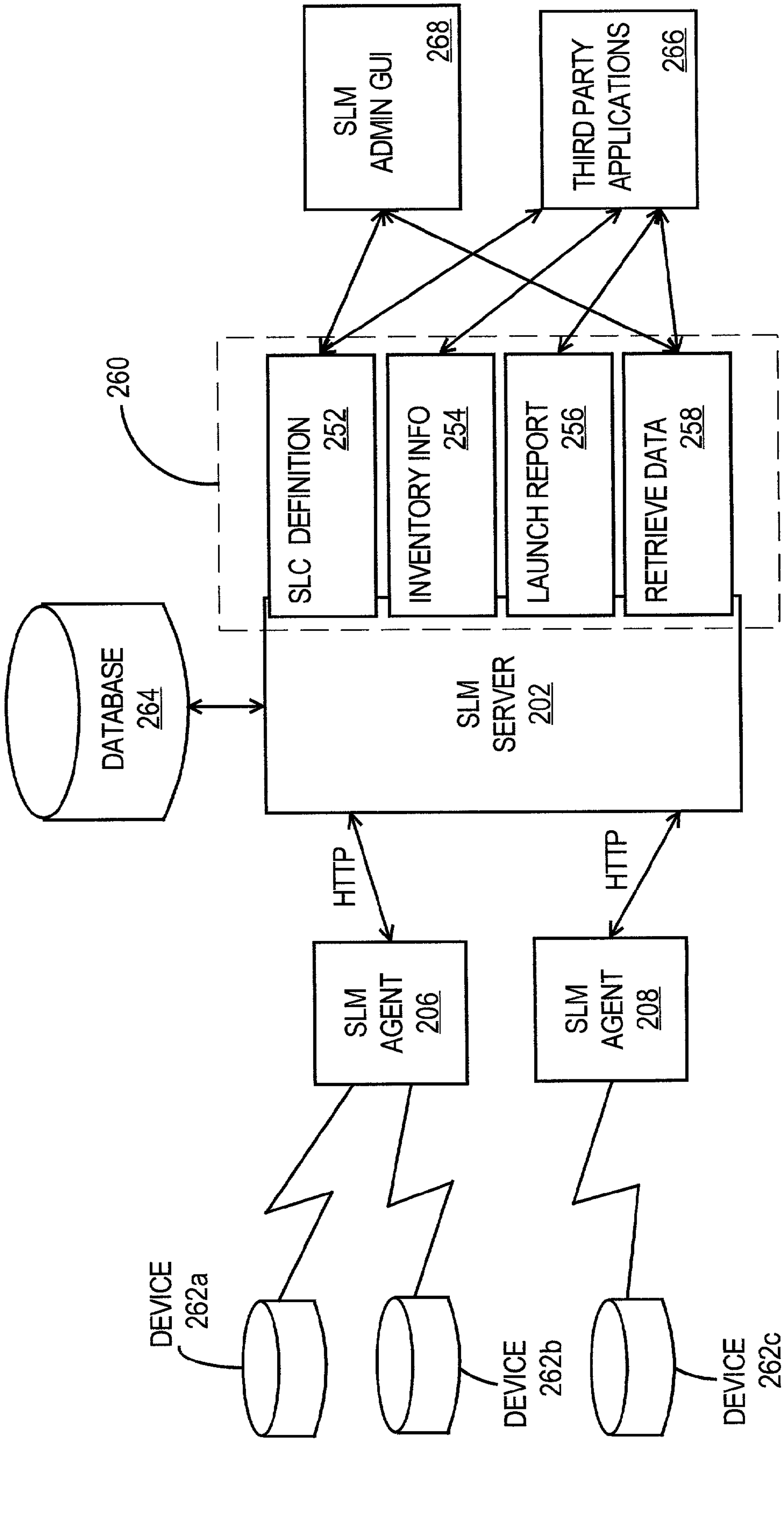
FIG. 2B is a block diagram illustrating a further detailed example of a communication mechanism for monitoring Service Level Agreements.

FIG. 2B depicts a system configuration 250 that further illustrates certain internal details of the standardized interface provided by SLM server 202. As depicted, in certain embodiments, SLM server 202 provides a set of Servlets 260 that expose an XML interface for communicating with a variety of applications, such as an SLM administration GUI 268 and third party applications 266. Clients connect to the SLM server 202 using HTTP and pass requests (e.g., Create SLC) as a series of POST parameters. Upon receiving a request, the SLM server 202 services the request and returns the results, if any, using XML. For example, Servlets 260 are configured to service requests that are received from SLM administration GUI 268 and third party applications 266. Table 1 provides an example of the SLC operations and parameters that may be supported by the Admin Servlet. For this example, the request's POST parameters would be structured as follows:

class=SLC&cmd=command¶m=value&data="URL-encoded XML data string . . . "

TABLE 1

EXEMPLARY SLC OPERATIONS AND PARAMETERS
SLC Operations

| REQUEST | | | RESPONSE |
|---|---|---|---|
| Command | Parameters | Data (XML) | Return Value (if successful) |
| Enumerate | | | An XML list of all the SLC names and handles defined on the system. |
| Add | folder = folderID (optional; will be created in default folder if not specified) | New SLC-SLA XML data string. Must be URL encoded. | <SlamAdminResult><br>SLC_ID<br></SlamAdminResult> |
| Delete | slchandle = SLC_ID | | Deletes the SLC with a handle of SLC_ID<br><SlamAdminResult><br>"Success"<br></SlamAdminResult> |
| Get | slchandle = SLC_ID | | SCL-SLA XML data string of the form:<br><Slc Enabled = "True"<br>Handle = "1234"><br><Name>Test SLC</Name><br><Comment>This is an SLC comment</Comment><br><ApplyTime><br>. . .described elsewhere. . .<br></ApplyTime><br><Sla>. . .described elsewhere. . .<br></Sla><br><Sla>. . .described elsewhere. . .<br></Sla><br><LastModifiedTime><br>23-Jun-1999 22:17:35 UTC<br></LastModifiedTime><br></Slc> |
| Modify | slchandle = SLC_ID | New SLC-SLA XML data string | <SlamAdminResult><br>"Success"<br></SlamAdminResult> |

In one embodiment, Servlets 260 are accessed from the SLM Admin GUI 268 that is a Java Foundation Class (JFC) applet that is accessible from a browser executing on a client. Servlets 260 are configured to handle a variety of different requests, for example user configuration requests (SLC and SLA definitions) and report generation requests, that conform with the predefined DTDs (well-formed requests). Appendix A illustrates an example of a variety of different DTDs that may be used to provide an open standard interface for monitoring and managing SLCs and SLAs and for verifying the level of service that is being provided to an ISP customer.

Processing SLC Requests

Figure 4:
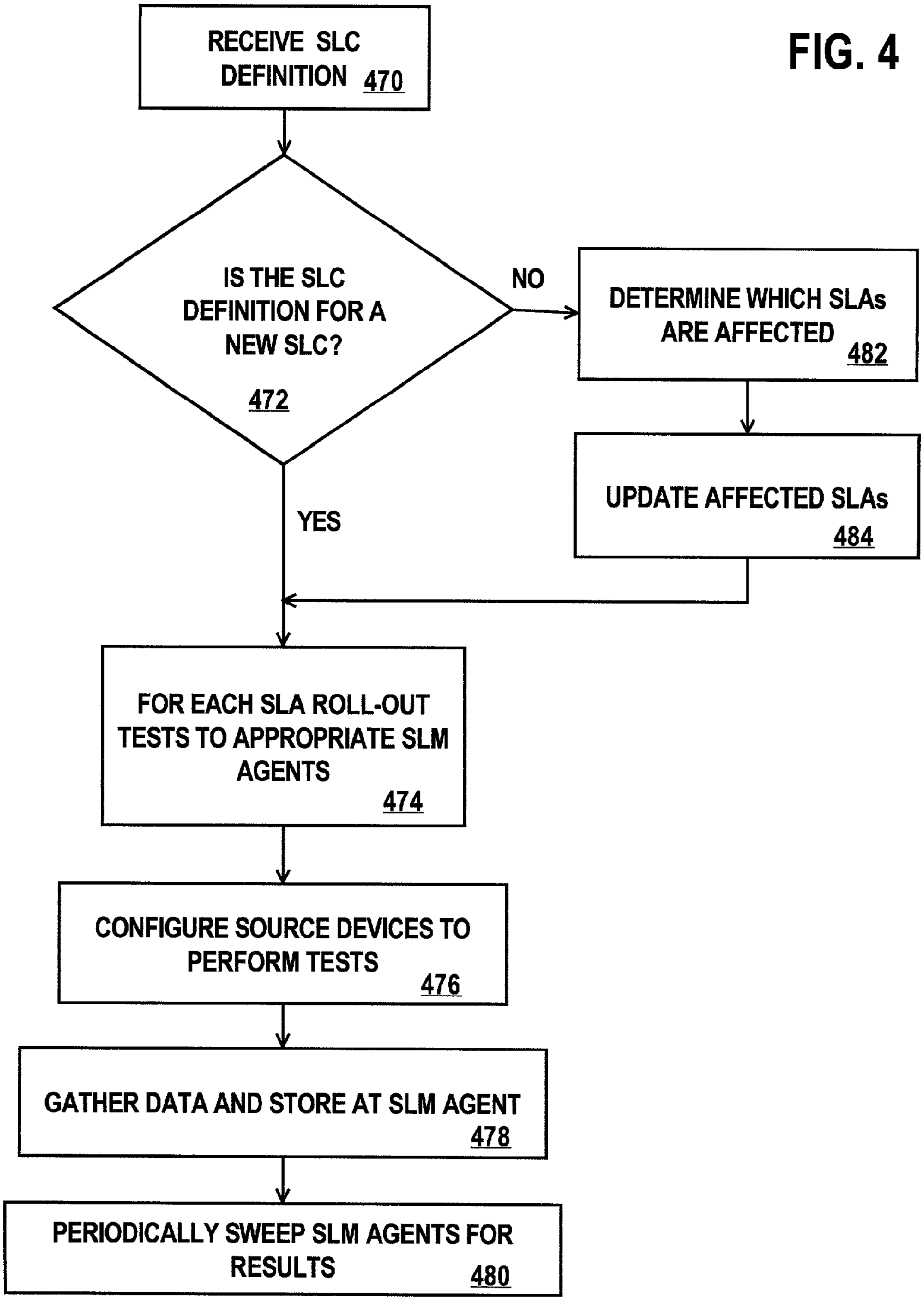
FIG. 4 illustrates a flow diagram of a method for providing online standardized configurations for monitoring service level agreements.

FIG. 4 illustrates a flow diagram of a method for providing online standardized configurations for monitoring service level agreements. For explanation purposes the blocks of FIG. 4 will be explained in reference to the components of FIG. 1.

At block 470, a user interacts with client 116 to communicate with SLM Server 110 to define a Service Level Contract. Once defined the Service Level Contract is communicated to the SLM Server for processing.

At block 472, the SLM Server 110 parses the Service Level Contract and determines whether it is an existing Service Level Contract. If the SLM Server 110 determines that the Service Level Contract is new, control proceeds to block 474. Alternatively, if the SLM Server 110 determines that the Service Level Contract is not new, at block 482 the SLM Server 110 determines which SLAs are affected. At block 484, the affected SLAs are updated.

At block 474, for each SLA the SLM Server 110 determines the polling interval for each test and then rolls-out the tests to the appropriate SLM Agents 112, 114. In one embodiment, the SLM Server 110 is configured to collapse duplicate polling requests (for example, 5 min, 10 min, 20 min, 30 min) into the least common multiplier (5); (15, 30) into (15); or (10, 15) into (5). In certain situations, the process of collapsing duplicate polling requests can significantly decrease the amount of traffic that is induced into the network.

Further, if the SLM Server 110 determines that a particular test is already being performed based on a different SLA, the SLM Server 110 is configured to use the test results from the other SLA rather than cause the test to be performed multiple times.

At block 476, the SLM Agents 112,114 configure source devices 118,120,122 to perform the metric tests as defined by the SLAs.

At block 478, the SLM Agents 112,114 gather the metric data and store the results in local memory.

At block 480, SLM Server 110 periodically sweeps the SLM Agents 112,114 to gather the results and to generate reports for reporting the results back to the client. As is described in detail below, the customer may then interface with the SLM Server 110 to view the results online.

In certain cases, the report information is automatically emailed to the customer. For example, the report information may be automatically sent to the customer on a periodic basis or in response to completing a time period defined within an SLC. Alternatively, the SLM Server may be configured to email the report information only in response to determining that the Service Provider has failed to provide the level of service that was guaranteed by an SLC or SLA.

Standardized Interface Templates

As previously indicated, a Service Level Contract represents a contract between a service provider and a customer. An SLC contains one or more SLAs, and defines the time range over which its SLAs apply (e.g. Monday–Friday, 9:00 am–5:00 pm). Each SLC is associated with a name or ID that allows it to be uniquely identified from other SLCs that are maintained by the SLM server 202. Each SLA encapsulates the type of metric which should be monitored (e.g. DNS response time), the thresholds for the given metric, and the list of device-pairs covered by the SLA. The metric type defines the type of test that is to be performed or monitored. For example, the types metrics may include but are not limited to ICMP metrics, UDP metrics, DNS metrics, HTTP metrics, and VoIP metrics. In general, each type of metric has its own unique set of possible threshold values. For example, the ICMP metric has thresholds for latency and availability. A device specification is used to define the pair of devices between which a SLA has been established. For each type of metric, there is a matching DeviceSpec entity. For example, an HTTP metric will have an associated HTTPDeviceSpec to define the source device, and the destination HTTP server.

Figure 7:
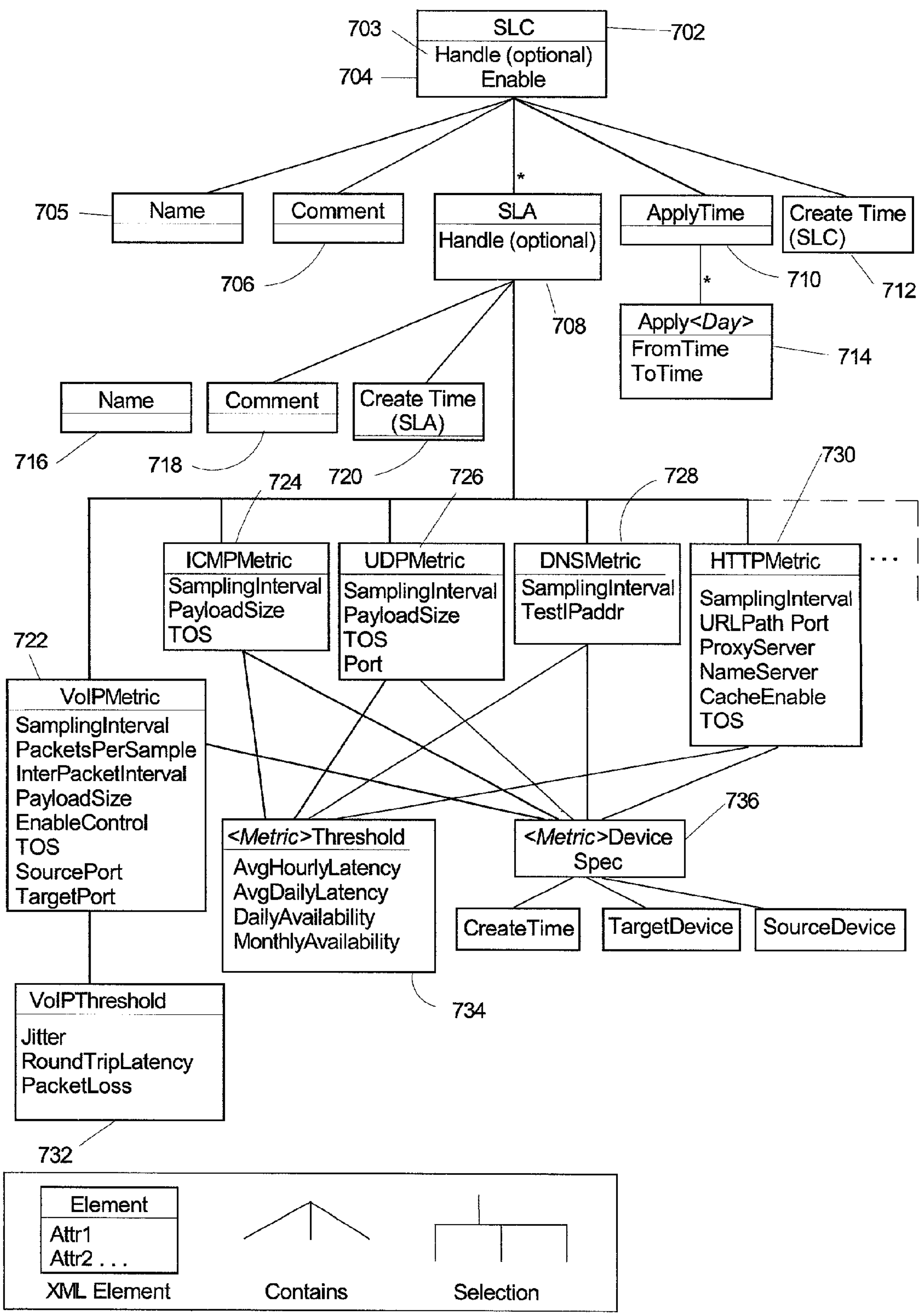
FIG. 7 is a block diagram illustrating an example of the relationship between the various components used to define a SLC.

FIG. 7 illustrates a SLC block diagram 700 that provides an example of how the various components that define an SLC are related with each other and how the SLCs and SLAs may be modeled within the SLM 202. In this example, SLC block diagram 700 includes an SLC block 702 that represent an example SLC schema that contains an optional Handle component 703, an Enabled indicator component 704, a Name component 705, a Comment component 706, an SLA component 708, an ApplyTime component 710 and a Create Time component 712. Table 2 provides a further description of the information that may be associated with the SLC schema (block 702).

TABLE 2

SLC SCHEMA
Slc (Name, Comment, Enabled, Sla, ApplyTime, Handle, LastModifiedTime)

| Component | Description | Required | Quantity |
|---|---|---|---|
| Name | The name of the SLC. The name must be unique on the SLM server. | Yes | 1 |
| Comment | A description which can be associated with the SLC. . . | No | 0 or 1 |
| Enabled | Flag indicating if the SLC is enabled or not. If an SLC is disabled, the data collection will be stopped for all of the SLAs defined in the SLC. Allowed values are "True" or "False". The default value is "True". | No | 0 or 1 |
| Sla | The list of service level agreements associated with the SLC. | Yes | 1 or more |
| ApplyTime | The days of the week, and time over which the SLC (and underlying SLAs) apply. For example, you can define the SLC to apply Monday through Friday, from 9:00 am to 5:00 pm | Yes | 1 |
| Handle | This is an integer value used as an internal identifier for the SLC. The SLM server assigns this number. It is not a required parameter. Normally the SLM server uses the SLC Name to identify a SLC. However, it will use the Id if present in order to improve performance. The Handle may also be used to update the SLC Name during a Modify operation. | No | 0 or 1 |
| LastModified Time | The time that the SLC was added or last changed on the SLM server. This is an optional parameter that will be filled in by the SLM server after the SLC is created on the server. This is a string of the form dd-MMM-yyyy:hh:mm:ss ZZZ E.g., 08-Sep-1999:15:03:02 GMT | No | 0 or 1 |

The ApplyTime component, corresponding to block 710, defines the days of the week, and the time over which the SLC (and underlying SLAs) apply. In one embodiment, each day of the week is associated with a separate time range or time interval. For example, a user may define an SLC that is to be applied Monday through Friday, from 6:00 am to 11:00 pm, and 9:00 am to 5:00 pm on Saturdays and Sundays. The time zone can be specified as either Local (for time relative to the SLM Server), or UTC for universal time (also known as GMT). Table 3 provides a further description of the information that may be associated with the ApplyTime component (block 710).

TABLE 3

APPLYTIME COMPONENT
ApplyTime (ApplyMon, ApplyTue, ApplyWed, ApplyThu, ApplyFri, ApplySat, ApplySun) ApplyMon (FromTime, ToTime)-similar syntax for other days of the week

| Component | Description | Required | Quantity |
|---|---|---|---|
| Zone | Defines the time zone in which the apply-times are defined. The possible values are LOCAL or UTC. LOCAL refers to the local time on the SLM Server. UTC is universal time (also known as GMT). | Yes | 1 |
| Apply<Day> | Contains the time range for which the SLC applies for the given day of the week (e.g. "Mon", "Tue", "Wed", "Thu", "Fri", "Sat", and "Sun"). | Yes | 1 or more |
| FromTime | The start time that the SLC applies on each day. This must be a whole number between 0 and 24. The default is "00". NOTE: If both the FromTime and ToTime are equal to zero ("00"), then the SLC does not apply to the entire day. | Yes | 1 |
| ToTime | The ending time that the SLC applies on each day. This must be a whole number between 0 and 24, and must be greater than the FromTime. The default is "24" | Yes | 1 |

For explanation purposes, an example ApplyTime is provided below.

```
<ApplyTime Zone=LOCAL>
        <ApplyMon>
            <FromTime>00</FromTime>
            <ToTime>23</ToTime>
        </ApplyMon>
        <ApplyTue>
            <FromTime>00</FromTime>
            <ToTime>23</ToTime>
        </ApplyTue>
        <ApplySun>
            <FromTime>08</FromTime>
            <ToTime>17</ToTime>
        </ApplySun>
</ApplyTime>
```

The SLA component, corresponding to block 708, encapsulates the type of metric which should be monitored (e.g. DNS response time), the thresholds for the given metric, and the list of device-pairs covered by the SLA. In certain embodiments, a plurality of link/device-pairs may be covered under a single SLA. Table 4 provides a further description of the information that may be associated with the SLA component (block 708).

TABLE 4

SLA COMPONENT
Sla (Name, Comment, CreateTime, (UDPMetric | ICMPMetric | HTTPMetric | DNSMetric | VoIPMetric), Handle)

| Component | Description | Required | Quantity |
|---|---|---|---|
| Name | The name of the SLA. The name must be unique within the parent SLC, and can be forty (40) characters in length | Yes | 1 |
| Comment | A description which can be associated with the SLA. The comment can be 255 characters in length. | No | 0 or 1 |
| CreateTime | The time that the SLA was added to the SLM server. This is an optional parameter that will be filled in by the SLM server, not client applications. | No | 0 or 1 |
| <*>Metric | Defines type of metric that the SLA will monitor. SLM 1.0 supports the following metrics:<br>UDPMetric<br>ICMPMetric<br>HTTPMetric<br>DNSMetric<br>VoIPMetric<br>Complete details on each metric and its associated components will be presented in the sections that follow. | Yes | 1 |
| Handle | This is an integer value used as an internal identifier for the SLA. The SLM server assigns this number. It is not a required parameter. Normally the SLM server uses the SLA Name to identify an SLA. However, it will use the Id if present in order to improve performance. | No | 0 or 1 |

For explanation purposes, an example SLA is provided below:

```
<SLA>
            <Name>ICMP SLA</Name>
            <Comment>This is an SLA comment
</Comment>
            <CreateTime.>23-Jun-1999 22:17:35
UTC </CreateTime>
            <ICMPMetric> . . . described elsewhere . . .
</ICMPMetric>
</SLA>
```

The ICMPMetric component, corresponding to block 724, is primarily used to measure the network latency between two devices. In addition to latency, this metric allows users to monitor the availability, Mean-Time-Between-Failures (MTBF), and Mean-Time-To-Repair (MTTR) of the path between the two devices. Table 5 provides a further description of the information that may be associated with the ICMPMetric component (block 724).

TABLE 5

ICMPMETRIC COMPONENT
ICMPMetric (ICMPDeviceSpec, SamplingInterval, TOS, ICMPThreshold)

| Component | Description | Re-quired | Quan-tity |
|---|---|---|---|
| ICMPDeviceSpec | The list of device pairs for which round trip response should be measured. See the ICMPDeviceSpec section for details. | Yes | 1 or more |
| SamplingInterval | The interval that an ICMP probe should be sent in minutes. Allowed values are "1", "5", "10", "15", or "30". The default is 5 minutes. | No | 0 or 1 |
| PayloadSize | The number of bytes to include in the data section of the ICMP packet. Must be between 28 and 1500 octets; the default is 64 octets. | No | 0 or 1 |
| TOS | The Type of Service value for the ICMP probe packet. This can be a number from 0 to 63. The default for ICMP is 0. | No | 0 or 1 |
| ICMPThreshold | Defines the threshold values for the ICMPMetric. See the ICMPThreshold section for further details. | Yes | 1 |

For explanation purposes, an example ICMPMetric is provided below.

```
<ICMPMetricSamplingInterval="15">
        <ICMPDeviceSpec> . . . described
elsewhere . . . </ICMPDeviceSpec>
        <ICMPDeviceSpec> . . . described
elsewhere . . . </ICMPDeviceSpec>
        <ICMPThreshold> . . . described
elsewhere . . . </ICMPThreshold>
</ICMPMetric>
```

The ICMPDeviceSpec (device specification) component is used to define the source and destination devices in an ICMPMetric (block 724). Table 6 provides a description of the information that may be associated with the ICMPDeviceSpec component (block 736).

TABLE 6

ICMPDEVICESPEC COMPONENT

| Component | Description | Re-quired | Quan-tity |
|---|---|---|---|
| SourceDevice | The source device. This is the SAA capable device that will send a probe to the target device. The SourceDevice you select must already exist in the RME Inventory database on the SLM Server. | Yes | 1 |
| TargetDevice | The fully qualified domain name of the target device. | Yes | 1 |
| CreateTime | The time that the device pair was added to the SLA. The SLM server will fill in this field. Its purpose is to help the reporting framework know how much historical data is available for the device. | No | 0 or 1 |

For explanation purposes, an example ICMPDeviceSpec is provided below.

```
<ICMPDeviceSpec>
        <SourceDevice> source.domain.com
</SourceDevice>
        <TargetDevice>target.domain.com</
TargetDevice>
</ICMPDeviceSpec>
```

The ICMPThreshold component defines the set of threshold values for the ICMPMetric. Table 7 provides a description of the information that may be associated with the ICMPThreshold component (block 734).

TABLE 7

ICMPTHRESHOLD SCHEMA
ICMPThreshold (AvgHourlyLatency, AvgDailyLatency, DailyAvailability, MonthlyAvailability)

| Component | Description | Re-quired | Quan-tity |
|---|---|---|---|
| AvgHourlyLatency | The threshold value for the average hourly latency. The number should be a whole number representing latency in milliseconds (e.g. 60, 1000). | Yes | 1 |
| AvgDailyLatency | The threshold value for the average daily latency. The number should be a whole number representing latency in milliseconds (e.g. 60, 1000). | Yes | 1 |
| DailyAvailability | The expected availability percentage for any given day. The number should be a floating point number like 99.9 or 92.50. The possible range is 0.00 to 100.00. | Yes | 1 |
| MonthlyAvailability | The expected availability percentage for any given month. The number should be a floating point number like 99.9 or 92.50. The possible range is 0.00 to 100.00. | Yes | 1 |

```
<ICMPThreshold>
        <AvgHourlyLatency>90</AvgHourlyLatency>
        <AvgDailyLatency>75</AveDailyLatency>
        <DailyAvailability>99.5</DailyAvaliability>
        <MonthlyAvailability>99.8</MonthlyAvailability>
</ICMPThreshold>
```

The UDPMetric is primarily used to measure the UDP latency between two devices. It differs from ICMPMetric in that it is using the UDP protocol rather than IP. In addition to latency, this metric allows users to monitor the availability, MTBF, and MTTR of the path between the two devices. Table 8 provides a description of the information that may be associated with the UDPMetric component (block 726).

TABLE 8

UDPMETRIC SCHEMA
UDPMetric (UDPDeviceSpec, SamplingInterval, PayloadSize, TOS, UDPThreshold)

| Component | Description | Required | Quantity |
|---|---|---|---|
| UDPDeviceSpec | The list of device pairs for which round trip response should be measured. See the UDPDeviceSpec section for details. | Yes | 1 or more |
| SamplingInterval | The interval that a UDP probe should be sent in minutes. Allowed values are "1", "5", "10", "15", and "30". The default is 5 minutes. | No | 0 or 1 |
| PayloadSize | The size (in bytes) of the UDP probe packet's data section. Must be between 4 and 1500 octets; the default is 64 octets. | No | 0 or 1 |
| Port | The port number on the target device to which the packets will be sent. Default is 7 (UDP Echo). | No | 0 or 1 |
| TOS | The Type of Service value for the UDP probe packet. This can be a number from 0 to 63. The default is 0. | No | 0 or 1 |
| UDPThreshold | Defines the threshold values for the UDPMetric. See the UDPThreshold section for further details. | Yes | 1 |

For explanation purposes, an example UDPMetric is provided below.

```
<UDPMetric SamplingInterval="15" PayloadSize="256">
                    <UDPDeviceSpec> . . . described
elsewhere . . . </UDPDeviceSpec>
                    <UDPDeviceSpec> . . . described
elsewhere . . . </UDPDeviceSpec>
                    <UDPThreshold> . . . described
elsewhere . . . </UDPThreshold>
</UDPMetric>
```

The UDPDeviceSpec (device specification) is used to define the source and destination devices in an UDPMetric. Table 9 provides a description of the information that may be associated with the UDPDeviceSpec component (block 736).

TABLE 9

UDPDEVICESPEC SCHEMA
UDPDeviceSpec (SourceDevice, TargetDevice, CreateTime)

| Component | Description | Re-quired | Quan-tity |
|---|---|---|---|
| SourceDevice | The source device. This is the SAA capable device that will send a probe to the target device. The SourceDevice must already exist in the RME Inventory database and support SAA. | Yes | 1 |
| TargetDevice | The fully qualified domain name of the target device. | Yes | 1 |
| CreateTime | The time that the device-pair was added to the SLA. The SLM server will fill in this field. Its purpose is to help the reporting framework know how much historical data is available for the device. | No | 0 or 1 |

For explanation purposes, an example UDPDeviceSpec is provided below.

```
<UDPDeviceSpec>
                    <SourceDevice> source.domain.com
</SourceDevice>
                    <TargetDevice>target.domain.com</
TargetDevice>
    <CreateTime> 10-25-1999 03:22:19 GMT
</CreateTime>
</UDPDeviceSpec>
```

The UDPThreshold defines the set of threshold values for the UDPMetric. Table 10 provides a description of the information that may be associated with the UDPThreshold component (block 734).

TABLE 10

UDPDEVICESPEC SCHEMA
UDPThreshold (HourlyLatency, DailyLatency, HourlyAvailability, DailyAvailability)

| Component | Description | Re-quired | Quan-tity |
|---|---|---|---|
| AvgHourlyLatency | The threshold value for the average hourly latency. The number should be a whole number representing latency in milliseconds (e.g. 60, 1000). | Yes | 1 |
| AvgDailyLatency | The threshold value for the average daily latency. The number should be a whole number representing latency in milliseconds (e.g. 60, 1000). | Yes | 1 |
| DailyAvailability | The expected availability percentage for any given day. The number should be a floating point number like 99.9 or 92.50. The possible range is 0.00 to 100.00 | Yes | 1 |
| MonthlyAvailability | The expected availability percentage for any given month. The number should be a floating point number like 99.9 or 92.50. The possible range is 0.00 to 100.00 | Yes | 1 |

For explanation purposes, an example UDPThreshold is provided below.

```
<UDPThreshold>
          <AvgHourlyLatency>90</AvgHourlyLatency>
          <AvgDailyLatency>75</AvgDailyLatency>
          <DailyAvailability>99.5</DailyAvaliability>
          <MonthlyAvailability>99.8</MonthlyAvailability>
</UDPThreshold>
```

The DNSMetric is used to measure the response time of a DNS server. A DNS request is sent from the SAA device to a specified DNS server to resolve the user specified IP address. In addition to response time, this metric allows users to monitor the availability, MTBF, and MTTR of the DNS server. Table 11 provides a description of the information that may be associated with the DNSMetric component (block 728).

TABLE 11

DNSMETRIC SCHEMA
DNSMetric (DNSDeviceSpec, SamplingInterval, TestIPAddr, DNSThreshold)

| Component | Description | Required | Quantity |
|---|---|---|---|
| DNSDeviceSpec | The list of device pairs (SAA source and a DNS server) and sample IP address, for which DNS lookup response-time should be measured. See the DNSDeviceSpec section for details. | Yes | 1 or more |
| SamplingInterval | The interval that an DNS probe should be sent in minutes. Allowed values are “1“, “5”, “10”, “15”, and “30”. The default is 5 minutes. | No | 0 or 1 |
| TestIPAddr | The address to use in the DNS reverse name lookup test. If not included, the address of the SLM server host will be used. | No | 0 or 1 |
| DNSThreshold | Defines the threshold values for the DNSMetric. See the DNSThreshold section for further details. | Yes | 1 |

For explanation purposes, an example DNSMetric is provided below.

```
<DNSMetric SamplingInterval="30">
        <DNSDeviceSpec> . . . described
elsewhere . . . </DNSDeviceSpec>
        <DNSDeviceSpec> . . . described
elsewhere . . . </DNSDeviceSpec>
        <TestIPAddr>131.108.234.17</TestIPAddr>
        <DNSThreshold> . . . described
elsewhere . . . </DNSThreshold>
</DNSMetric>
```

The DNSDeviceSpec is used to define the source device and the DNS server for use in a DNSMetric. Table 12 provides a description of the information that may be associated with the DNSDeviceSpec component (block 736).

TABLE 12

DNSDEVICESPEC SCHEMA
DNSDeviceSpec (SourceDevice, TargetDevice, CreateTime)

| Component | Description | Required | Quantity |
|---|---|---|---|
| SourceDevice | The source device. This is the SAA capable device that will send a DNS probe to the specified DNS server. The DNSSourceDevice must already exist in the RME Inventory Database and support SAA. | Yes | 1 |
| TargetDevice | The fully qualified domain name of the DNS server to test. | Yes | 1 |

TABLE 12-continued

DNSDEVICESPEC SCHEMA
DNSDeviceSpec (SourceDevice, TargetDevice, CreateTime)

| Component | Description | Required | Quantity |
|---|---|---|---|
| CreateTime | The time that the device-pair was added to the SLA. The SLM server will fill in this field. Its purpose is to help the reporting framework know how much historical data is available for the device. | No | 0 or 1 |

For explanation purposes, an example DNSDeviceSpec is provided below.

```
<DNSDeviceSpec>
            <SourceDevice> source.domain.com
</SourceDevice>
            <TargetDevice> target.domain.com
</TargetDevice>
</DNSDeviceSpec>
```

The DNSThreshold defines the set of threshold values for the DNSMetric. Table 13 provides a description of the information that may be associated with the DNSThreshold component (block 734).

TABLE 13

DNSTHRESHOLD SCHEMA
DNSThreshold (AvgHourlyLatency, AvgDailyLatency, DailyAvailability, MonthlyAvailability)

| Component | Description | Required | Quantity |
|---|---|---|---|
| AvgHourlyLatency | The threshold value for the average hourly latency. The number should be a whole number representing latency in milliseconds (e.g. 60, 1000). | Yes | 1 |
| AvgDailyLatency | The threshold value for the average daily latency. The number should be a whole number representing latency in milliseconds (e.g. 60, 1000). | Yes | 1 |
| DailyAvailability | The expected availability percentage for any given day. The number should be a floating point number like 99.9 or 92.50. The possible range is 0.00 to 100.00 | Yes | 1 |
| MonthlyAvailability | The expected availability percentage for any given month. The number should be a floating point number like 99.9 or 92.50. The possible range is 0.00 to 100.00 | Yes | 1 |

For explanation purposes, an example DNSThreshold is provided below.

```
<DNSThreshold>
        <AvgHourlyLatency>90</AvgHourlyLatency>
        <AvgDailyLatency>75</AvgDailyLatency>
        <DailyAvailability>99.5</DailyAvailability>
        <MonthlyAvailability>99.8</MonthlyAvailability>
</DNSThreshold>
```

The HTTPMetric is used to measure the response time of a web server. An HTTP request is sent from the SAA device to a specified web server to retrieve a user specified URL. In addition to response time, this metric allows users to monitor the availability, MTBF, and MTTR of the web server. Table 14 provides a description of the information that may be associated with the HTTPMetric component (block 730).

TABLE 14

HTTPMETRIC SCHEMA
DNSMetric (HTTPDeviceSpec, SamplingInterval, URLPath, ProxyServer, Port, TOS, NameServer, CacheEnable, HTTPThreshold)

| Component | Description | Req'd | Quantity |
|---|---|---|---|
| HTTPDeviceSpec | The list of device pairs (SAA source and an HTTP server), for which an HTTP GET should be performed. See the HTTPDeviceSpec section for details. | Yes | 1 or more |
| SamplingInterval | The interval that an HTTP probe should be sent in minutes. Allowed values are "1", "5", "10", "15", and "30". The default is 5 minutes. | No | 0 or 1 |
| URLPath | An Optional string to append to the URL path of the destination web server name. The complete URL will be built up as follows: http://<TargetDevice>:<Port >/<URLPath> For example, if the TargetDevice is www.dom.com, the Port is "100", and the URLPath is "mydir/index.html", The HTTP probe will be applied to the URL "www.dom.com:100/mydir/index.html." If the element is blank, then no URL path is added. | No | 0 or 1 |
| Port | The port number of the web server. The default port number is 80. | No | 0 or 1 |
| ProxyServer | The hostname of the proxy server to be used for the target device. If the element is blank, then no proxy server is used. | No | 0 or 1 |
| NameServer | The name server that the SAA source device should use to resolve the HTTP server's hostname. if the element is blank, then the default name server is used. | No | 0 or 1 |
| TOS | The Type of Service (priority) value for the HTTP probe packet. This can be a number from 0 to 63 | No | 0 or 1 |
| CacheEnable | Defines whether the HTTP Server should use its cache. Possible values are "True" or False". The default value is "False". | No | 0 or 1 |
| HTTPThreshold | Defines the threshold values for the HTTPMetric. See the HTTPThreshold section for further details. | Yes | 1 |

For explanation purposes, an example HTTPMetric is provided below.

```
<HTTPMetric>
            <HTTPDeviceSpec> . . . described
elsewhere . . . </HTTPDeviceSpec>
            <URLPath>
```

-continued

```
"Mktg/CustomerData/Index.html" </URLPath>
            <SamplingInterval>15</SamplingInterval>
            <HTTPThreshold> . . . described
elsewhere . . . </HTTPThreshold>
</HTTPMetric>
```

The HTTPDeviceSpec is used to define the source device and the hostname or IP address of the target HTTP server for use in a HTTPMetric. Table 15 provides a description of the information that may be associated with the HTTPDeviceSpec component (block 736).

TABLE 15

HTTPDEVICESPEC SCHEMA
HTTPDeviceSpec (SourceDevice, TargetDevice, CreateTime)

| Component | Description | Required | Quantity |
|---|---|---|---|
| SourceDevice | The source router that will send out the HTTP tests. This is the SAA capable device that will send an HTTP probe to the specified web server. | Yes | 1 |
| TargetDevice | Fully qualified name of the HTTP server address to test (e.g. www.domain.com). | Yes | 1 |
| CreateTime | The time that the device-pair was added to the SLA. The SLM server will fill in this field. Its purpose is to help the reporting framework know how much historical data is available for the device. | No | 0 or 1 |

For explanation purposes, an example HTTPDeviceSpec is provided below.

```
<HTTPDeviceSpec>
            <SourceDevice> source.domain.com
</SourceDevice>
            <TargetDevice> target.domain.com
</TargetDevice>
      <CreateTime> 10-25-1999 03:22:19 GMT
</CreateTime>
</HTTPDeviceSpec>
```

The HTTPThreshold defines the set of threshold values for the HTTPMetric. Table 16 provides a description of the information that may be associated with the HTTPThreshold component (block 734).

TABLE 16

HTTPTHRESHOLD SCHEMA
HTTPThreshold (AvgHourlyLatency, AvgDailyLatency)

| Component | Description | Required | Quantity |
|---|---|---|---|
| AvgHourlyLatency | The threshold value for the average hourly latency. The number should be a whole number representing latency in milliseconds (e.g. 60, 1000). | Yes | 1 |
| AvgDailyLatency | The threshold value for the average daily latency. The number should be a whole number representing latency in milliseconds (e.g. 60, 1000). | Yes | 1 |

TABLE 16-continued

HTTPTHRESHOLD SCHEMA
HTTPThreshold (AvgHourlyLatency, AvgDailyLatency)

| Component | Description | Required | Quantity |
|---|---|---|---|
| DailyAvailability | The expected availability percentage for any given day. The number should be a floating point number like 99.9 or 92.50. The possible range is 0.00 to 100.00 | Yes | 1 |
| MonthlyAvailability | The expected availability percentage for any given month. The number should be a floating point number like 99.9 or 92.50. The possible range is 0.00 to 100.00 | Yes | 1 |

For explanation purposes, an example HTTPThreshold is provided below.

```
<HTTPThreshold>
        <AvgHourlyLatency>90</AvgHourlyLatency>
        <AvgDailyLatency>75</AvgDailyLatency>
        <DailyAvailability>99.5</DailyAvailability>
        <MonthlyAvailability>99.8</MonthlyAvailability>
</HTTPThreshold>
```

The VoIPMetric is used to measure the jitter between two SAA devices. Table 17 provides a description of the information that may be associated with the VoIPMetric component (block 722).

TABLE 17

VOIPMETRIC SCHEMA
VoIPMetric (VoIPDeviceSpec, SamplingInterval, PacketsPerSample, PayloadSize, InterPacketInterval, EnableControl, TOS, SourcePort, TargetPort, VoIPThreshold)

| Component | Description | Required | Quantity |
|---|---|---|---|
| VoIPDeviceSpec | The list of SAA device pairs, between which jitter should be measured. See the VoIPDeviceSpec section for details. | Yes | 1 or more |
| SamplingInterval | The interval that the jitter probes should be sent in minutes. Allowed values are "1", "5", "10", "15", and "30". The default is 5 minutes. | No | 0 or 1 |
| PacketsPerSample | The number of packets to send each interval. The default is 10 packets. | Yes | 0 or 1 |
| PayloadSize | The size of the data portion of each packet (in octets). This must be between 16 and 1500 octets. The default is 64 octets. | No | 0 or 1 |
| InterPacketInterval | The time in milliseconds between each packet. (This is called Inter-Packet Delay in the GUI.) This value must be between 1 and 60000 milliseconds; the default is 20 milliseconds. InterPacketInterval must not exceed the specified SamplingInterval. | Yes | 0 or 1 |
| EnableControl | Allows SAA control packets to enable the desired listening port | No | 0 or 1 |

TABLE 17-continued

VOIPMETRIC SCHEMA
VoIPMetric (VoIPDeviceSpec, SamplingInterval, PacketsPerSample, PayloadSize, InterPacketInterval, EnableControl, TOS, SourcePort, TargetPort, VoIPThreshold)

| Component | Description | Required | Quantity |
|---|---|---|---|
| | on the target SAA device. If the port has already been enabled via the SAA control, this is not required. Default is True. | | |
| TOS | The Type of Service value for the VoIP probe packet. This can be a number from 0 to 63 | No | 0 or 1 |
| SourcePort | The port number to send the packets out of on the SourceDevice. This should not be a well-known port. The typical address range used by SLM is 8020–8050. The default is 8020. | Yes | 0 or 1 |
| TargetPort | The port number to send the packets to on the TargetDevice. This should not be a well-known port. The typical address range used by SLM is 8020–8050. The default is 8020. | Yes | 0 or 1 |
| VoIPThreshold | Defines the threshold values for the VoIPMetric. See the VoIPThreshold section for further details. | Yes | 1 |

For explanation purposes, an example VoIPMetric is provided below.

```
<VoIPMetric>
                <VoIPDeviceSpec> . . . described
elsewhere . . . </VoIPDeviceSpec>
                <VoIPDeviceSpec> . . . described
elsewhere . . . </VoIPDeviceSpec>
                <SamplingInterval>15</SamplingInterval>
                <PacketsPerSample>10</PacketsPerSample>
                <PayloadSize>1500</PayloadSize>
                <InterPacketInterval>10</InterPacketInterval>
                <VoIPThreshold> . . . described
elsewhere . . . </VoIPThreshold>
</VoIPMetric>
```

The VoIPDeviceSpec is used to define the source and destination SAA device for use in a VoIPMetric. Table 18 provides a description of the information that may be associated with the VoIPDeviceSpec component (block 736).

Table 18—VoIPDeviceSpec Schema

VoIPDeviceSpec (SourceDevice, TargetDevice, CreateTime)

TABLE 18

VOIPDEVICESPEC SCHEMA
VoIPDeviceSpec (SourceDevice, TargetDevice, CreateTime)

| Component | Description | Required | Quantity |
|---|---|---|---|
| SourceDevice | The source device. This is the SAA capable device that will | Yes | 1 |

TABLE 18-continued

VOIPDEVICESPEC SCHEMA
VoIPDeviceSpec (SourceDevice, TargetDevice, CreateTime)

| Component | Description | Required | Quantity |
|---|---|---|---|
| | send the jitter probes to the destination device. The device must already exist in the RME Inventory database. | | |
| TargetDevice | Fully qualified domain name of the target device (e.g. myhost.domain.com). | Yes | 1 |
| CreateTime | The time that the device-pair was added to the SLA. The SLM server will fill in this field. Its purpose is to help the reporting framework know how much historical data is available for the device. | No | 0 or 1 |

For explanation purposes, an example VoIPDeviceSpec is provided below.

```
<VoIPDeviceSpec>
                    <SourceDevice> source.domain.com
</SourceDevice>
                    <TargetDevice>
target.domain.com</TargetDevice>
</VoIPDeviceSpec>
```

The VoIPThreshold is used to define the set of threshold values for the VoIPMetric. Table 19 provides a description of the information that may be associated with the VoIPThreshold component (block 734).

TABLE 19

VOIPTHRESHOLD SCHEMA
VoIpThreshold (Jitter, RoundTripLatency, PacketLoss)

| Component | Description | Required | Quantity |
|---|---|---|---|
| Jitter | The threshold for positive and (absolute) negative jitter in milliseconds. The default is 75 milliseconds. This is a positive integer. | No | 0 or 1 |
| RoundTripLatency | The threshold value for the average hourly latency. The number should be a whole number representing latency in milliseconds (e.g. 60, 1000). | Yes | 1 |
| PacketLoss | Maximum packet loss as a percentage of traffic, averaged over an hour. The default value is 2.50%. The number should be a floating point number like 1.9 or 2.50. The valid range is 0.00 to 100.00. | No | 0 or 1 |

For explanation purposes, an example VoIPThreshold is provided below.

```
<VoIPThreshold>
                    <Jitter>60</Jitter>
                    <RoundTripLatency>100</RoundTripL
atency>
                    <PacketLoss>2.50</PacketLoss>
</VoIPThreshold>
```

Good Practice Configurations

As previously indicated, in certain cases, even if a Customer is allowed to create a set of tests that they feel will determine whether they are receiving the quality of service that is guaranteed by the Service Provider, the Service Provider may oppose the method or technique that were used in determining the service quality. To address this problem, in certain embodiments of the invention, the SLM server 202 maintains standardized configurations for SLAs for monitoring the quality of service that is being provided by a particular Service Provider. In one embodiment, a company such as Cisco Systems, Inc., may provide a set of "good" practice configurations that it feels will accurately monitor the service that is being provided by a Service Provider. A customer can then monitor the service that they are being provided by selecting, for a particular SLA, a predefined configuration from the set of "good" practice configurations. Because these "good" practice configuration are being provided by a reputable company that is an expert in the network industry, Service Providers are less likely to oppose the method or technique used in determining the quality of service that is being provided.

In addition, in certain embodiments, a Service Provider, such as MCI, can itself provide specific configurations for monitoring or validating the service that is being providing to a customer. For example, by interacting with user interface 210, a Service Provider can create and define an "standard" SLA that they feel will accurately monitor the service that they are providing to their customers. A customer may then execute the standard SLA to monitor the service that they are being provided, typically through interface 210 or a third party application 212.

Alternatively, companies such as MCI, may provide metric test parameters that can be downloaded over a network and used to define an "standard" SLA configuration for monitoring the quality of service that they are providing. For example, in one embodiment, the SLM server 202 is configured to communicate with a Service Provider's server to obtain metric information for configuring "standard" SLAs for monitoring the quality of service that they are providing. Once created, the "standard" SLAs may be used to monitor the service that is being provided to the customer. If in executing the standard SLA it is determined that the Service Provider is not providing the service that is specified by the SLA, the Service Provider is guaranteed that a valid method or technique was used in determining the quality of the service.

Generating Service Level Agreements and Service Level Contracts

As illustrated above, the service monitoring mechanism provides users with a standardized open interface that can be used to define SLAs and SLCs. In one embodiment, SLM Server 110 causes a graphical User Interface (GUI) to be displayed at client 116. In certain embodiments, the interface is a Wizard type of user interface that includes help features for aiding users in the creation and modification of SLAs and SLCs. Thus, by interacting with the displayed interface, a user can define SLAs and SLCs for monitoring the quality of service that is being provided.

FIGS. 3A–3E depict examples of user interface menus that can be displayed on client 116 to allow users to define, create and modify SLCs and their associated SLAs. As previously indicated, the SLCs contain general information, such as when the contract is in effect and whether the SLC is enabled. An SLA defines the set of targeted devices, the type of metrics that are to be gathered, and thresholds on those metrics.

In one embodiment, the service monitoring mechanism maintains a set of default values that are used to initialize the SLA and SLC menus. A user may then modify or change the values to create the SLAs and SLCs that are of interest to them.

Figure 3A:
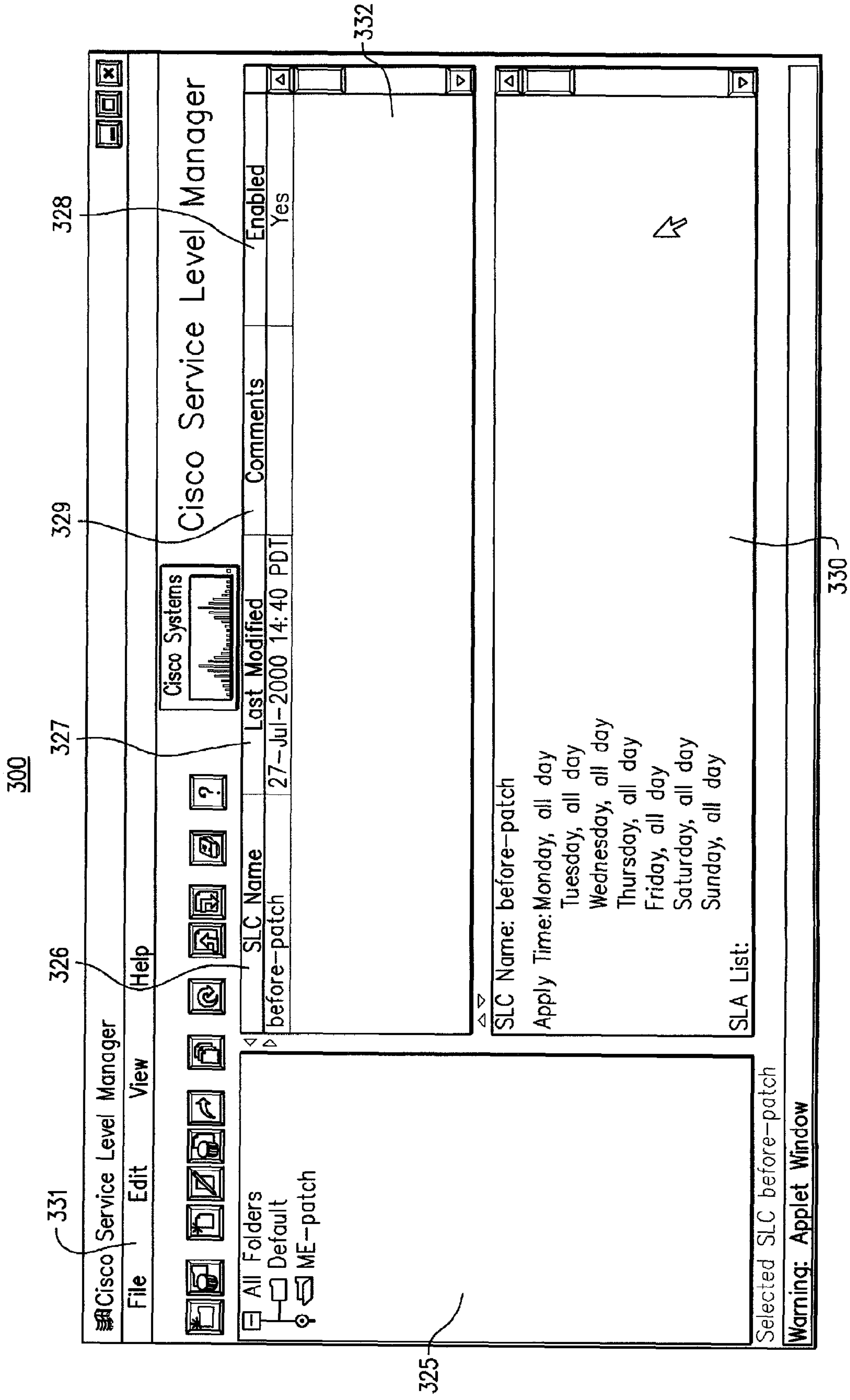
FIG. 3A illustrates an administrative menu for modifying an existing SLC or creating a new SLC.

FIG. 3A illustrates an example of an administrative menu 300. Menu 300 depicts a hierarchical folder view that allows users to modify an existing SLC or to create a new SLC. As depicted, menu 300 includes a folder name window 325 that shows the currently defined folders. Each folder may contain one or more SLCs. A user may right-click on a folder name and elect to create a new SLC within the selected folder. They may also create a new folder from the File menu. The folders allow users to visually organize the SLCs.

Menu 300 also contains a folder information window 332 that includes an SLC name header 326, a last modified header 327, an enabled header 328, and a comment header 329. The information contained under the SLC name header 326 shows the currently defined service level contracts by the user-defined names. Clicking on the SLC Name table heading will sort the names alphabetically. Single clicking on an SLC name will cause the lower frame to display SLC summary information for that SLC. Double clicking on an SLC name will take the user to a SLC modification screen, for example window 302 of FIG. 3B. In one embodiment, the SLC Names are unique across all folders.

The information contained under the last change header 327 indicates a date and time of when the particular SLC was last updated.

The information contained under the Enabled header 328 indicates whether the SLC is currently being monitored. Clicking on the heading will show the SLCs that are enabled at the top of the list, sorted alphabetically by name.

The information contained under the Comment header 329 shows the first 60 characters of the user comment that describes the SLC. This helps the user find a particular SLC without having to dig beyond this screen. Clicking on the heading will sort the SLCs alphabetically by the comment strings.

Also included in menu 300 is a SLC summary frame 330 that shows general information about the selected SLC. This is designed to allow the user to pick the SLC they are interested in without having to go to more detailed screens. In this example, the user has selected the SLC "before-patch" in folder information window 332 which caused information about the SLC to be displayed in summary frame 330. In certain embodiments, in response to a user selecting a particular SLC in folder information Menu 300 further includes a set of pull-down menus 331 (File, Edit, View and Help pull-down menus) that provide a user with a set of utilities for creating, editing and managing SLAs and SLCs. For example, the File pull-down menu includes both Import and Export options. The Import option prompts the user for an SLC XML-format file on the server and imports the information into the default folder. When importing an SLC, the contents of the SLC is verified to ensure that it can be properly executed (for example, that all devices are managed devices). Conversely, the Export option exports a selected SLC and all its SLAs to a file on the server file system in XML format.

Figure 3B:
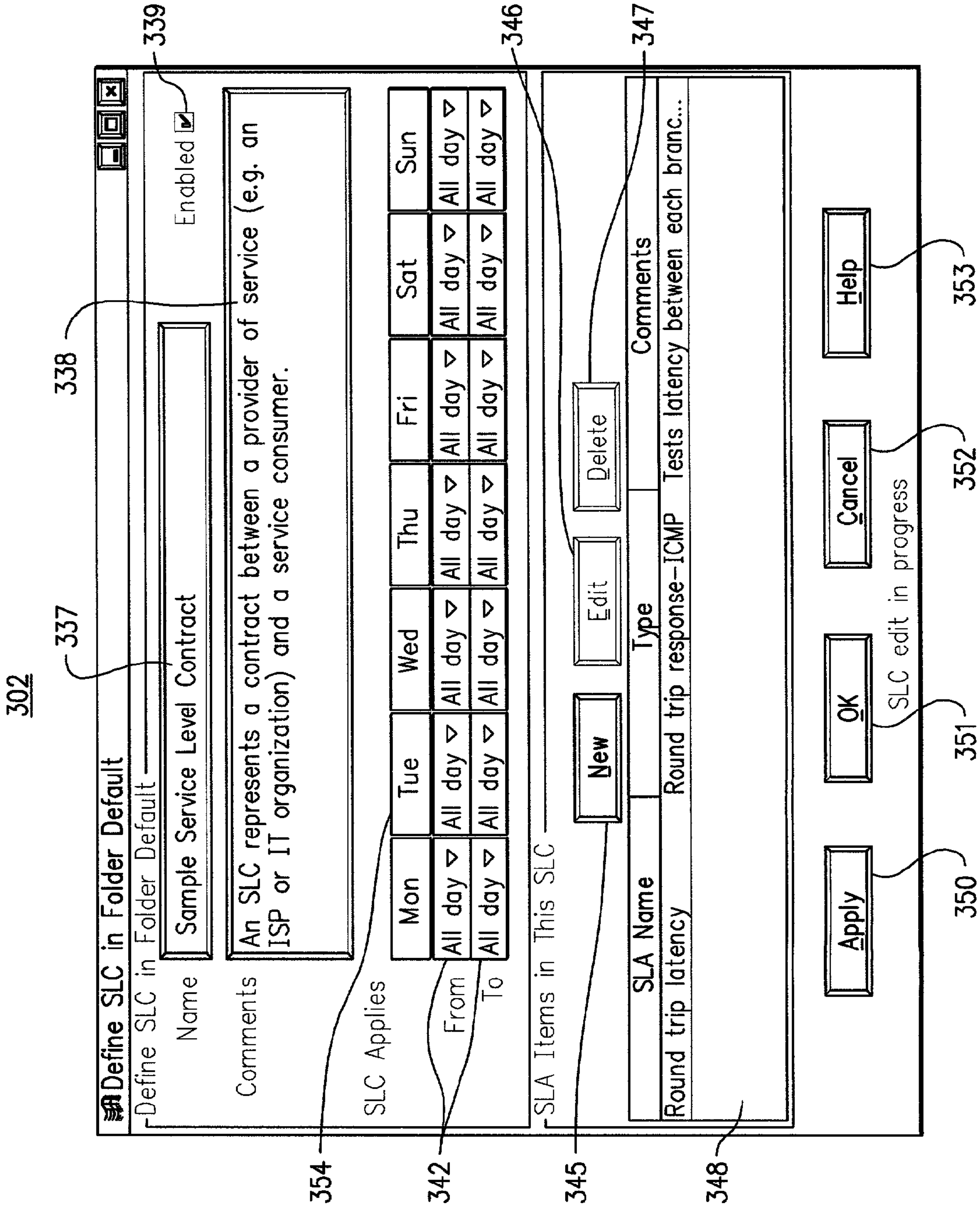
FIG. 3B illustrates an SLC Define window for creating or modifying an SLC.

FIG. 3B illustrates an example of a Define SLC window 302. The Define SLC window 302 allows a user to create or modify an SLC and is displayed in response to a user selecting the "Edit→Add" pull-down option in menu 300. Using this window, a user can set the time of day/week during which the SLC applies, and can also enable/disable the entire SLC. (See also the SLC.dtd in Appendix A).

As depicted, the SLC Define window 302 includes a Name box 337, a Comment box 338, an Enabled selector 339, an SLC Does Not Apply selector 341, a Time Range box 342, a Day Range box 354, a New button 345, an Edit button 346, a Delete button 347, an SLA description frame 348, and Apply, OK, Cancel and Help buttons 350,351,352, 353.

The Name box 337 is an editable text box containing the user-defined name of the SLC. The Comment box 338 allow descriptive text to be entered to help identify the purpose, applicability, contents, and other relevant information about SLC.

The Enabled checkbox 339 allows the user to turn the entire SLC on or off. Disabling an SLC turns off polling for all constituent SLAs.

The Time Range boxes 342 allow the user to select time ranges during which the thresholds apply or don't apply. Day Range box 354 allows a user to select one or more days for which the selected time ranges apply. For example, a user may choose the tests for a particular SLC to apply only from 7:00 am to 7:00 pm Monday-Friday. Various methods may be used to enforce the time ranges during which the thresholds either apply or don't apply. For example, in certain embodiments, the tests are scheduled to execute only within the selected time ranges. In another embodiment, tests are executed outside the selected time range but without flagging those tests whose thresholds are not met when executed outside the specified time range. In still other embodiments, statistical information is generated for only those tests performed within the specified time range.

The New button 345 is a menu button that allows the user to create a new type of SLA. A variety of different types of SLAs are available to the user. The SLA types include, but are not limited to, "Round-Trip-Response", "Network Services" and "Voice Over IP". By selecting the New button 345, the user is taken to the SLA creation screens for the selected SLA type.

The Edit button 346 takes user to the SLA editing screen for the selected SLA. The Delete button 347 deletes the selected SLA. In certain embodiments, the user is prompted for confirmation as to whether the SLA should be deleted.

The SLA name header 348 includes the user defined name of a previously defined SLA. Double clicking on a name will bring up the SLA editor. A right mouse click on an SLA name will allow the user to select either the edit or delete option for the SLA.

The Apply button 350 applies the current changes to the SLC and all its SLAs by sending the changes to the SLM Server 110 to update the database definition and the data collectors (SLM Agents 112,114). If there are errors, the user is given the opportunity to correct them, if possible. The menu will remain displayed after the changes have been applied so that the user can continue editing.

OK button 351 indicates that the user has finished editing. Any changes to this page or to the underlying SLA definitions will be applied in the SLM Server database and collectors (SLM Agents 112,114) when this button is clicked. In particular, in response to selecting the OK button 351, the GUI generates the appropriate SLA definition in XML (XML file) and then forwards the XML file to the SLM server for processing. (See also the SLC.dtd in Appendix A). After selecting the OK button 351, the screen is dismissed and the user is returned to the administrative menu 300 (FIG. 3A).

The Cancel button 352 discards all changes, including any to the SLAs. If the SLAs were modified, the user will be warned that those changes will be lost. The Help button 353 displays a help section for this page.

Adding a Round-Trip-Response (RTR) SLA to an SLC

Figure 3C:
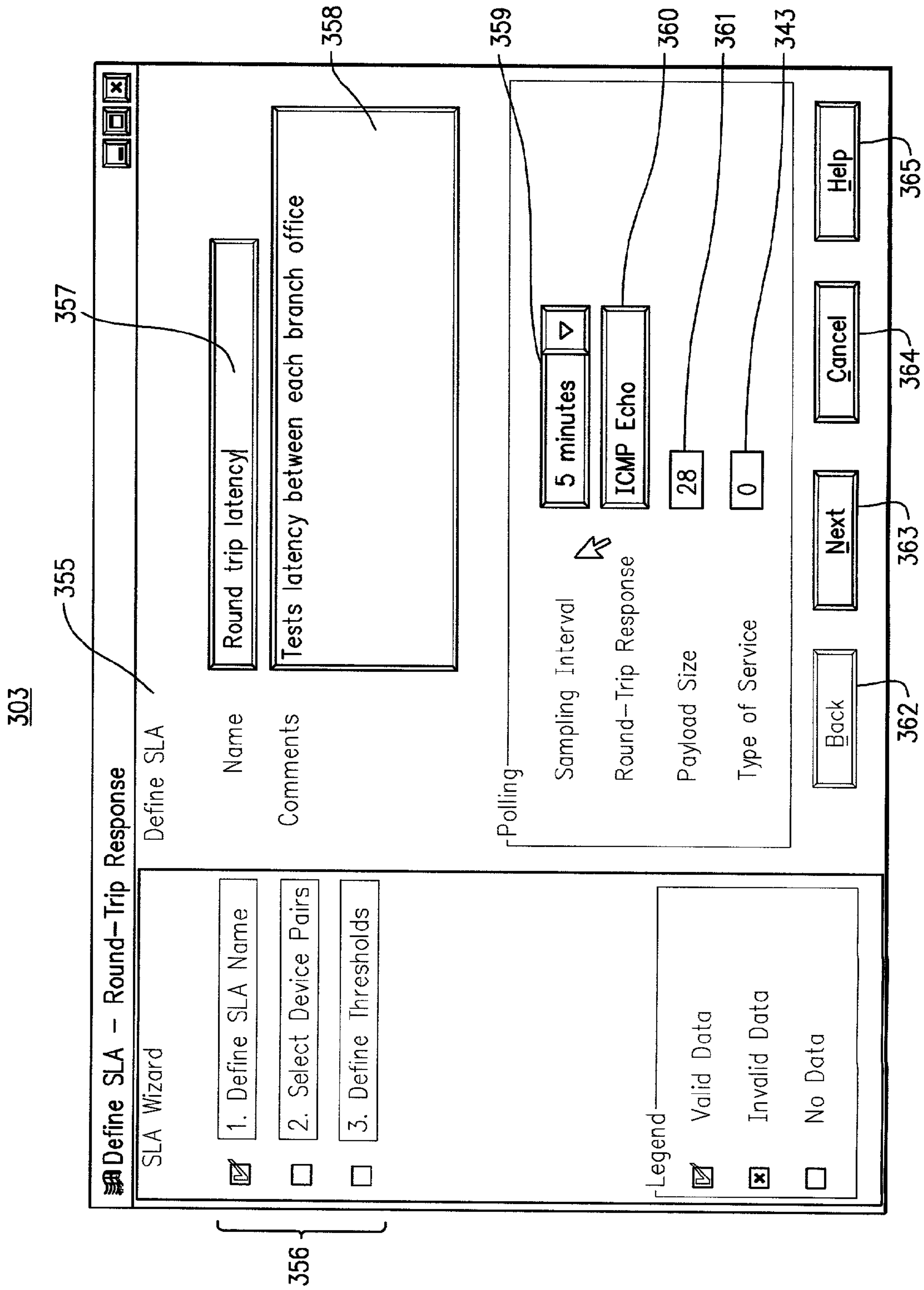
FIG. 3C illustrates an Add Round-Trip-Response window for adding a new ICMP SLA definitions.

FIG. 3C illustrates an Add Round-Trip-Response (RTR) window 303 that is displayed when a user selects the New button 345 (previously described in FIG. 3B), and then chooses to add a new ICMP SLA definition. An ICMP SLA measures the total time that it takes for a message to be sent from a device_A to a device_B and from device_B back to device_A. (See also the SLA element of the SLC.dtd in Appendix A).

As depicted, the Add RTR window 303 includes a Title Bar 355, a Checklist 356, an SLA Name box 357, a Comment box 358, a sampling interval box 359, a Probe Type box 360, a Payload Size box 361, a Type of Service Box, 343, and Back, Next, Cancel and Help buttons 362, 363,364,365.

The Title Bar 355 shows the current SLC name and the current operation that is currently selected. The Checklist 356 shows the steps the user will have perform to create an SLA. The SLA Name box 357 allows the user to enter descriptive text to uniquely identify this SLA within the SLC.

The Comment box 358 allows the user to enter comments specific to this SLA.

The sampling interval box 359 allows the user to select from a pre-defined set of polling intervals for RTR. In one embodiment, the intervals are defined so that at least 2 samples a taken per hour. How the samples are actually collected is dependent upon the sample type that is selected.

The Probe Type box 360 indicates the type of RTR probe that is to be sent. In one embodiment, the Probe Type box 360 allows the user to select from a pre-defined set of probe types, that may include but is not limited to ICMP Echo and UDP Echo probe types. In certain embodiments, ICMP Echo is used as a default probe type.

The Payload Size box 361 allows the user to select the size of the ICMP or UDP probes that are sent out via RTR for each sample set. The Type of Service box 343 allows the user to select the Differentiated Services Code Point appropriate for the IP packet.

The Back button 362 is not selectable in this screen since this is the first of three steps. The Cancel button 364 discards all changes and takes the user back to the SLC Define window 302 (FIG. 3B). The Help button 365 displays a help section for this page.

Figure 3D:
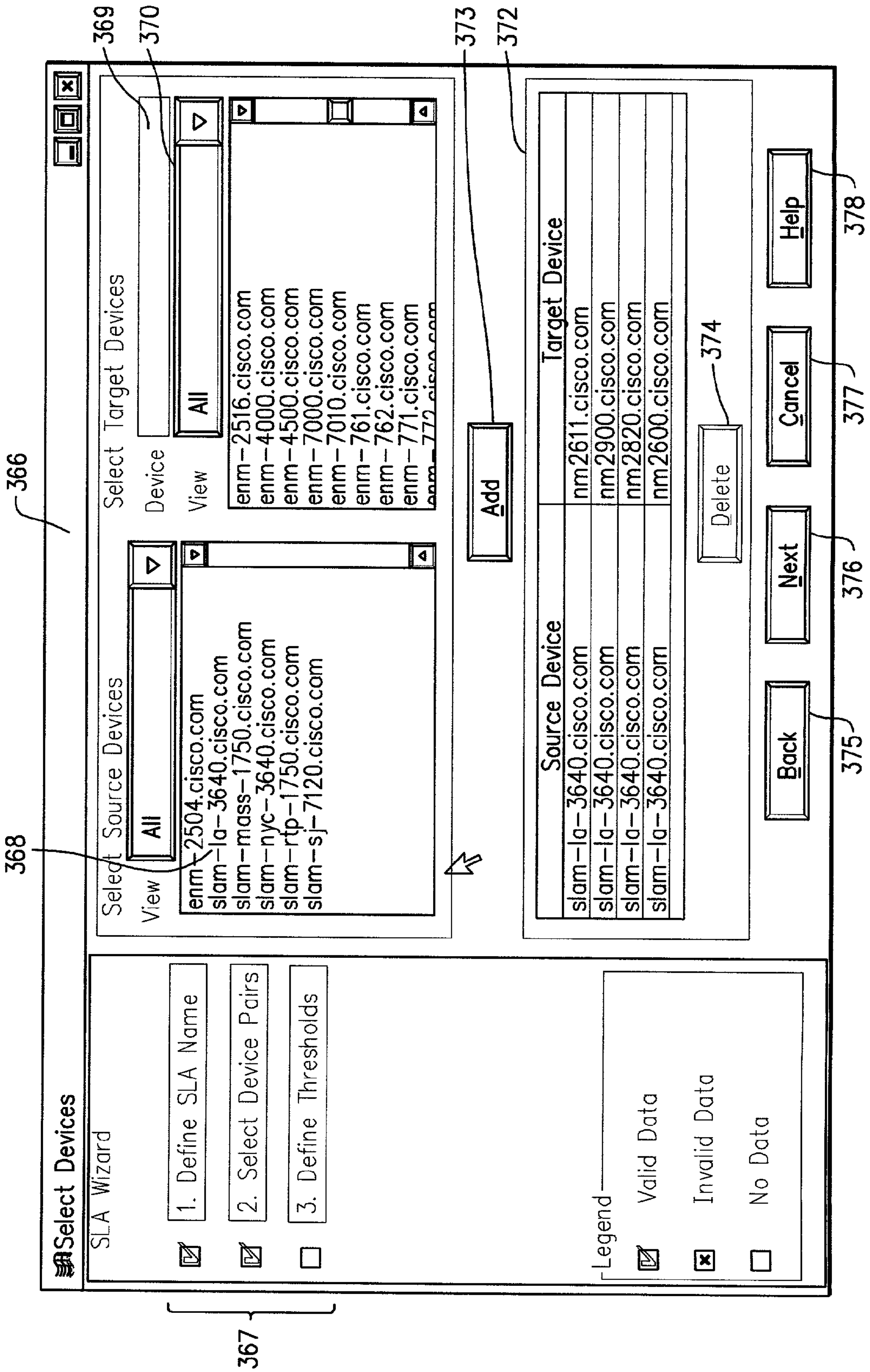
FIG. 3D illustrates a Device Selection window for creating SLA device pair lists.

By selecting the Next button 363, the user is presented with Device Selection window 304 as illustrated in FIG. 3D. Device Selection window 304 allows a user to create an (RTR) SLA device pair list. (See also the DeviceSpec element for the UDPMetric.dtd, ICMPMetric.dtd, HTTPMetric.dtd and VoIPMetric.dtd in Appendix A).

As depicted, the Device Selection window 304 includes a Title Bar 366, a Checklist 367, a Source RTR Device selection box 368, a Destination Device text box 369, a Destination View choice box 370, a Destination Device selection box 371, Device Pair table 372, and Add, Delete, Back, Next, Cancel and Help buttons 373,374,375,376,377, 378 respectively.

The Title Bar 366 indicates the current SLC name as well as the current SLA operation being performed. Checklist 367 indicates that the user has completed step "1" and is now defining step "2".

The Source RTR Device selection box 368 allows a user to select one or more source devices. These devices are the ones on which an RTR poll will be set up. In one embodiment, the devices are required to support the Service Assurance Agent (SAA), the specific MIB referred to as the RTTMON MIB. The RTTMON MIB is commercially available from Cisco Systems, Inc. In certain embodiments, the SLM Server generates the list of available devices from which the user may select.

The Destination Device text box 369 allows the user to enter a hostname or IP address manually so as to select any device on the network, including but not limited to workstations, PC's, and other similar devices.

The Destination View choice box 370 allows the user to update the Source RTR Device selection box 368 with the list of devices in the selected view. In one embodiment, the views are base on the contents of an RME inventory The Destination Device selection box 371 provides a list of devices from the RME inventory. The user may select one or more entries from the list.

The Device Pair table 372 shows all the pairs the user has selected.

The Add button 373 matches-up the source(s) to the destination(s) to create a one-to-one device pair list. That is, each source device will be matched up with all the destination devices. The resulting pairs will be shown in the Device Pair table 372. If the Destination device is from the Destination Device text box 369, the IP address will be validated when the user hits the Add button 373. The Delete button 374 allows a user to delete one or more pairs from the Device Pair table 372.

The Back button 375 returns the user back the to the Add Round-Trip-Response (RTR) window 303 (step 1 of this process) depicted in FIG. 3C.

The Cancel button 377 displays a warning that all changes to the SLA will be lost. If the user selects "Ok" from the warning dialog, the system discards any SLA changes made so far and takes the user back to the SLC Define window 302 depicted in FIG. 3B. The Help button 378 displays a help section for this page.

Figure 3E:
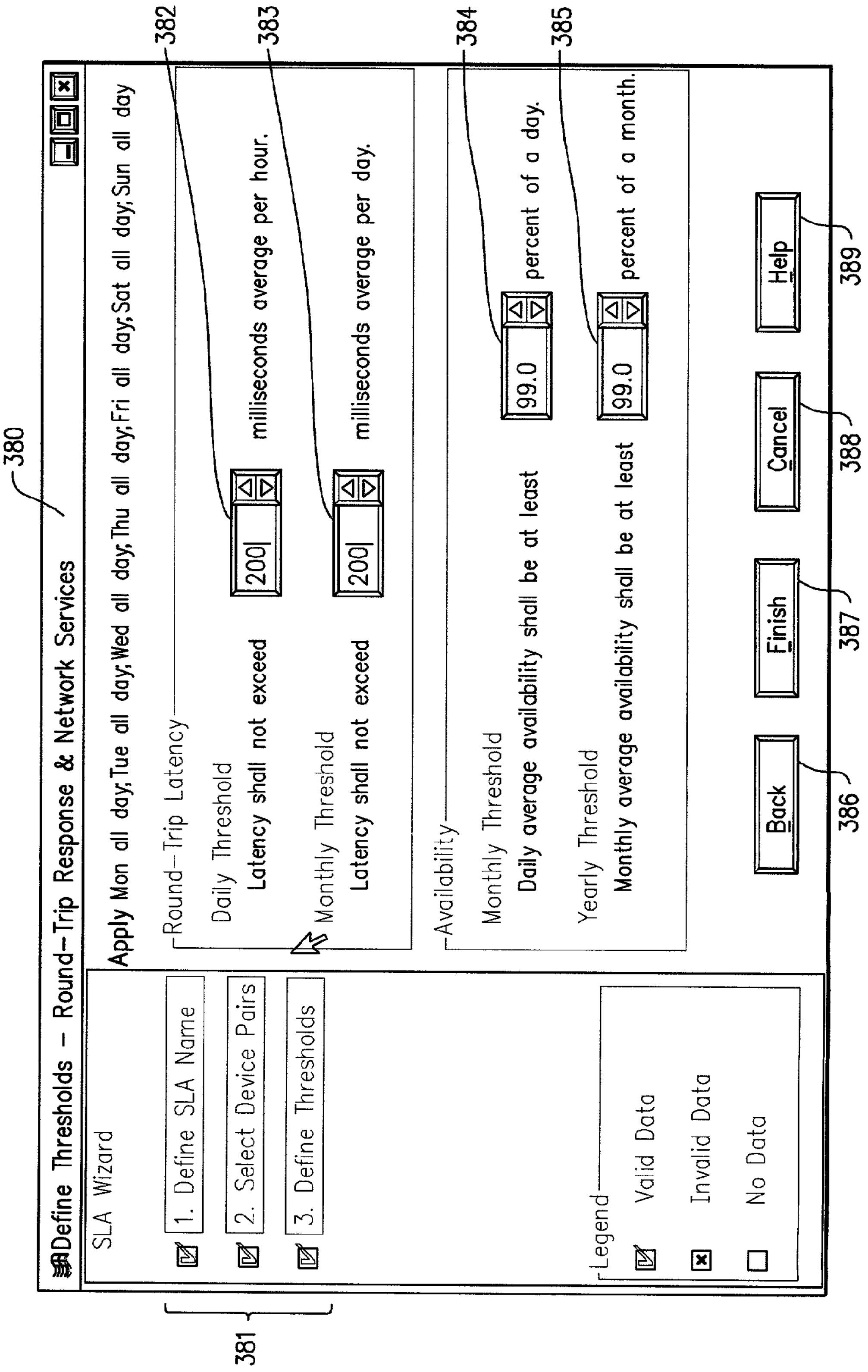
FIG. 3E illustrates a Set Threshold window for entering a set of threshold values for which the round-trip latency should not exceed.

By selecting the Next button 376, the user is presented with a Set Threshold window 305 as illustrated in FIG. 3E. Set Threshold window 305 allows a user to enter a set of threshold values for which the round-trip latency should not exceed. (See also the ICMPThreshold element of the UPDMetric.dtd and the UDPThreshold element of the ICMPMetric.dtd in Appendix A)

As depicted, the Set Threshold window 305 includes a Title Bar 380, a Checklist 381, a Latency Daily Threshold box 382, a Latency Monthly Threshold box 383, an Availability Daily Threshold box 384, an Availability Monthly Threshold box 385, and Back, Finish, Cancel and Help buttons 386,387,388,389 respectively.

The Title Bar 380 shows the current SLC and the operation being performed on the SLA. The Checklist 381 indicates that the user has completed steps "1" and "2", and is currently on step "3".

The Latency Daily Threshold box 382 allows the user to set a daily threshold value such that if the RTR values ever exceed the daily threshold value, the SLA will show an exception in the reports.

The Latency Monthly Threshold box 383 allows the user to define a monthly threshold value such that if the RTR values ever exceed the monthly threshold value, the SLA will show an exception in the reports. For example, the user may define an average Latency Daily Threshold of 20 ms per day (averaged each hour) and an average Latency Monthly Threshold of 10 ms per month (averaged each day). According to one embodiment, the higher values are averaged out over time, such that the network could have one bad day without violating the monthly threshold. In certain embodiments, the averages are only for the peak SLC periods, for example, during the times in which the SLC applies.

The Availability Daily Threshold box 384 allows the user to set a daily availability threshold value such that if communication between a device pair is not available for at least the daily availability threshold value, the SLA will show an exception in the reports.

The Availability Monthly Threshold box 385 allows the user to set a monthly availability threshold value such that if communication between a device pair is not available for at least the monthly availability threshold value, the SLA will show an exception in the reports.

The Back button 386 returns the user back the to the Device Selection window 304 (step 2 of this process) depicted in FIG. 3D.

The Finish button 387 validates the information entered in the Set Threshold window 305 and updates the client XML definition with the SLA changes. If there are no errors, the system returns to the SLC Define window 302 depicted in FIG. 3B.

Otherwise, the error is displayed and the user is given the opportunity to correct the problem (if possible).

The Cancel button 388 displays a warning that all changes to the SLA will be lost. If the user selects "Ok" from the warning dialog, the system discards any SLA changes made so far and takes the user back to the SLC Define window 302 depicted in FIG. 3B. The Help button 389 displays a help section for this page.

The following illustrates an example of the use of XML code for defining a sample SLC:

```
<?xml version="1.0"   encoding="UTF-8"?>
<!DOCTYPE Slc SYSTEM
"http://slm_server:1741/slam/DTD/SLC.dtd">
<Slc Handle="62" Enabled="true" >
    <Name>Example SLC</Name>
    <Comment>This is a sample service level contract</Comment>
    <Sla Handle="72" >
        <Name>Example ICMP SLA</Name>
        <Comment>Sample SLA demonstrating ICMP</Comment>
        <LastModifiedTime>28-Nov-2000 01:22:04
GMT</LastModifiedTime>
    <ICMPMetric SamplingInterval="5" PayloadSize="28"
TOS="0">
            <ICMPThreshold>
                <AvgHourlyLatency>200</AvgHourlyLatency>
                <AvgDailyLatency>200</AvgDailyLatency>
                <DailyAvailability>99.0</DailyAvailability>
                <MonthlyAvailability>99.0</MonthlyAvailability>
            </ICMPThreshold>
```

-continued

```
            <ICMPDeviceSpec>
                <SourceDevice>slamdev-sf-1720-
2.cisco.com</SourceDevice>
                <TargetDevice>www.cisco.com</TargetDevice>
                <CreateTime>28-Nov-2000 01:27:09
GMT</CreateTime>
            </ICMPDeviceSpec>
        </ICMPMetric>
    </Sla>
    <Sla Handle="76">
        <Name>Sample HTTP SLA</Name>
        <Comment>Sample SLA demonstrating HTTP</Comment>
        <LastModifiedTime>28-Nov-2000 01:22:04
GMT</LastModifiedTime>
        <HTTPMetric Port="1741" SamplingInterval="1"
CacheEnable="false" TOS="0" Timeout="5000">
            <HTTPThreshold>
                <AvgHourlyLatency>5000</AvgHourlyLatency>
                <AvgDailyLatency>5000</AvgDailyLatency>
            </HTTPThreshold>
            <HTTPDeviceSpec>
                <SourceDevice>slamdev-sf-
1720.cisco.com</SourceDevice>
                <TargetDevice>slam-u10-2.cisco.com</TargetDevice>
                <CreateTime>28-Nov-2000 01:27:09
GMT</CreateTime>
            </HTTPDeviceSpec>
        </HTTPMetric>
    </Sla>
    <Sla Handle="82">
        <Name>Sample Jitter SLA</Name>
        <Comment>Sample SLA demonstrating the Voice Over IP
probe</Comment>
        <LastModifiedTime>28-Nov-2000 01:22:04
GMT</LastModifiedTime>
        <VoIPMetric SamplingInterval="1" PacketsPerSample="10"
InterPacketInterval="10" PayloadSize="32"
EnableControl= "true" TOS="0" SourcePort="0"
TargetPort="9020" >
            <VoIPThreshold>
                <Jitter>30</Jitter>
                <RoundTripLatency>150</RoundTripLatency>
                <PacketLoss>2.0</PacketLoss>
            </VoIPThreshold>
            <VoIPDeviceSpec>
                <SourceDevice>slamdev-sf-1720-
2.cisco.com</SourceDevice>
                <TargetDevice>slamdev-sf-
1720.cisco.com</TargetDevice>
                <CreateTime>28-Nov-2000 01:22:04
GMT</CreateTime>
            </VoIPDeviceSpec>
        </VoIPMetric>
    </Sla>
    <ApplyTime Zone="LOCAL">
        <ApplyMon>
            <FromTime>0</FromTime>
            <ToTime>24</ToTime>
        </ApplyMon>
        <ApplyTue>
            <FromTime>0</FromTime>
            <ToTime>24</ToTime>
        </ApplyTue>
        <ApplyWed>
            <FromTime>0</FromTime>
            <ToTime>24</ToTime>
        </ApplyWed>
        <ApplyThu>
            <FromTime>0</FromTime>
            <ToTime>24</ToTime>
        </ApplyThu>
        <ApplyFri>
            <FromTime>0</FromTime>
            <ToTime>24</ToTime>
        </ApplyFri>
        <ApplySat>
            <FromTime>6</FromTime>
            <ToTime>22</ToTime>
        </ApplySat>
```

-continued

<ApplySun>
<FromTime>0</FromTime>
<ToTime>0</ToTime>
</ApplySun>
</ApplyTime>
<LastModifiedTime>28-Nov-2000 01:18:33
GMT</LastModifiedTime>
</Slc>

Generating Reports

The service monitoring mechanism provides a report utility that allows a user to interactively view report information based on the results of previously defined SLAs and SLCs. According to one embodiment, the report utility allows users to select a time period and to drill down from a summary list of all SLCs, with increasing levels of detail, to device-pair SLA reports. The reports can be generated as HTML documents which are accessible using a browser application that is associated with a client, such as client 116.

FIGS. 5A–5E depict examples of several types of reports that can be generated and displayed on client 116. In one embodiment, report information files are presented to the user in a tree like structure that allows the user to quickly identify and retrieve the report information that is of interest to them. Described below are specific examples which illustrate several types of reports that may be retrieved by a user. These specific report types are provided for explanation purposes only, and as such, should not be seen as a limitation as to the type of information that may be provided to a user.

Figure 5A:
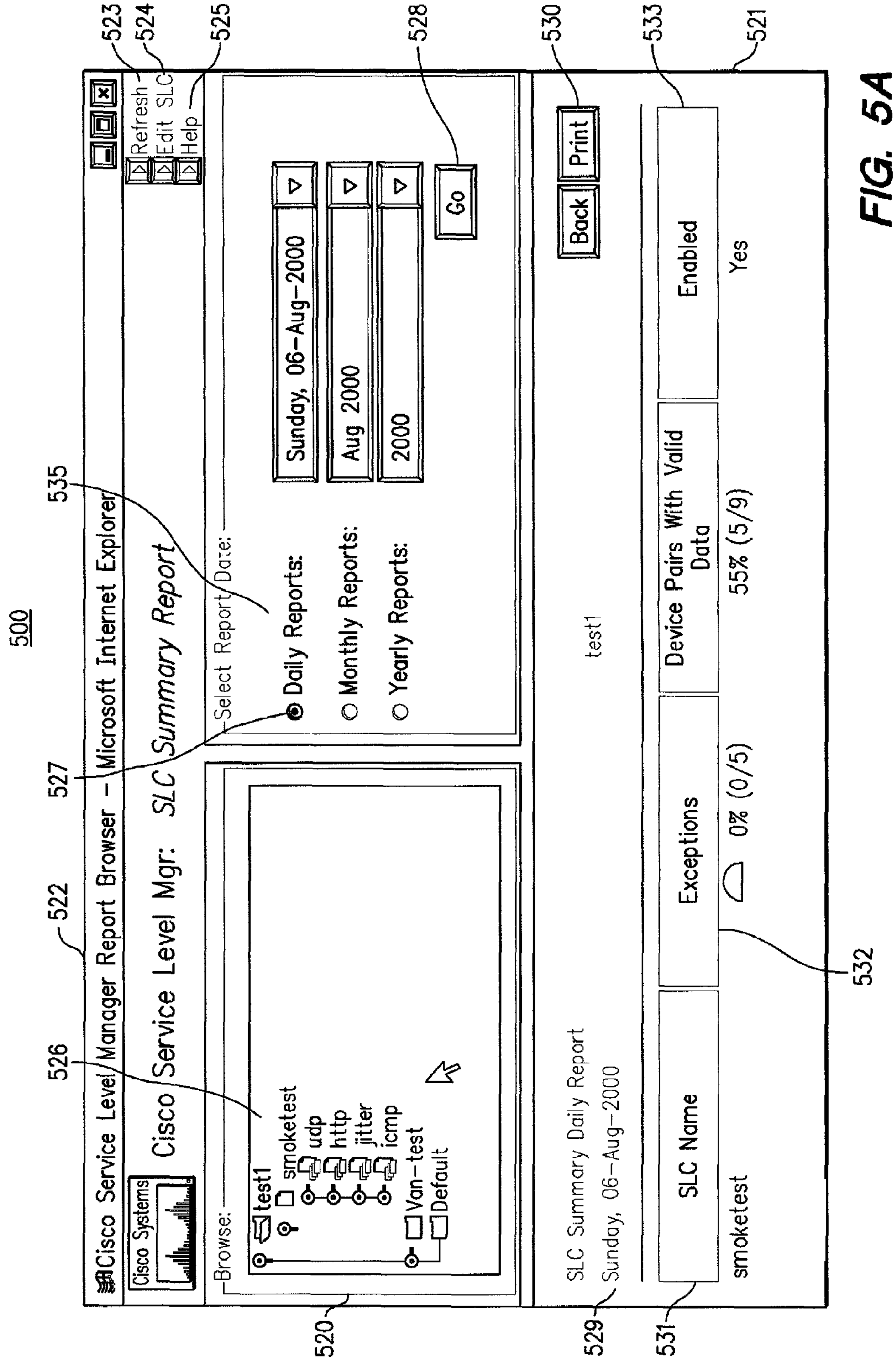
FIG. 5A illustrates an example of a partial top-level SLC Summary Report.

FIG. 5A includes a partial Top-Level SLC Summary Report 500. In one embodiment, the Top-Level SLC Summary report 500 is generated using border-less frames. As depicted, Top-Level SLC Summary report 500 includes a Top Control Frame 520, a Bottom Display Frame 521, a Heading 522, a Refresh control 523, an Edit control 524, a Help Control 525, a Find Selector window 526, a Report Type selector 527, a Go Button 528, a Report Frame Heading 529, a Print button 530, an SLC Name column 531, an SLA Exception Column 532, and an Enabled Column 533.

Top Control Frame 520 is a report browser that allows users to select SLC and SLA reports from among a set of available Folders. By clicking on a folder name in Find Selector window 526, the SLC summary information for that folder is presented in the Bottom Display Frame 521.

The Bottom Display Frame 521 displays a report based on what was selected in the Top Control Frame 520. In one embodiment, the service monitoring mechanism generates four types of reports: an SLC Summary report that shows information about all the SLCs in a folder; an SLC Details report that shows information about a particular SLC; an SLA Summary report that shows information about all the device pairs in an SLA; and an SLA Details report that shows specific device pair reports for the devices that are being monitored in the SLA.

The Heading 522 indicates that the user is in the report browser and is at the SLC Summary report level.

The Refresh control 523 reloads the tree control from the SLM Server 110 and resets the window entries to their default values.

The Edit control 524 causes an SLC Administrative editing window to be displayed to the user. In one embodiment, if the user does not have the correct privileges to run the administration window the elements within the window are automatically grayed out.

The Help Control 525 causes a help menu to be displayed for the particular screen.

The Find Selector window 526 displays a hierarchical representation of the available Folders, SLCs, SLAs, and Device Pairs. What a user selects in this window determines what report is retrieved and displayed in the Bottom Display Frame 521.

The Report Type selectors 527 allows a user to select either Daily, Monthly or Yearly reports to be displayed. In one embodiment, the Report Type selectors 527 include a choice box 535 for selecting a specific time period for a particular report.

In response to a user selecting the Go Button 528, the report utility uses the information selected in the Top Control Frame 520 to retrieve the desired report, and to display a resulting HTML page in the Bottom Display Frame 521. In one embodiment, the Go Button 528 is automatically grayed out until the user changes the time or report context (in other words, a non-gray Go Button 528 indicates that the user needs to hit Go Button 528 for the lower frame contents to match the currently selected time and report context displayed in Top Control Frame 520).

The Report Frame Heading 529 indicates the context of the current frame. This is important since the upper context is only committed when the user hits the Go Button 528, and also because only the Bottom Display Frame 521 is printed if the user hits the Print button 530, which sends the contents of the lower frame HTML page to the browser print function.

The SLC Name column 531 displays the user-defined name of the SLC. In one embodiment, if the user elects "Exceptions only" in the Top Control Frame 520, then only SLCs that have SLAs with exceptions are shown.

The SLA Exception Column 532 indicates a percentage of exceptions that occurred in the selected SLC. In one embodiment, the SLA Exception Column 532 indicates the number of device pairs in the SLC that had any kind of exception. Thus, even if a device pair had violations for several thresholds, that device pair will only be counted once in the exceptions count. For example, if SLA "A" has ten device pairs with three exceptions, and SLA "B" has twenty device pairs with two exceptions, this report would show exceptions as "17% (5/30)".

In one embodiment, a set of pre-defined icons are used to graphically distinguish the severity of the exceptions. For example, the five pre-defined icons: 0%, 1–24%, 25–49%, 50–74%, 75–100%, may be used to indicate the percentage of device pairs that incurred an exception. In certain embodiments, if a single device pair is listed in more than one SLA within an SLC, that device pair will be counted for each occurrence.

The Enabled Column 533 indicates whether the SLC is enabled or not. For example, a check mark may indicate that the SLC is enabled while a dash mark indicates that the SLC is not enabled.

Figure 5B:
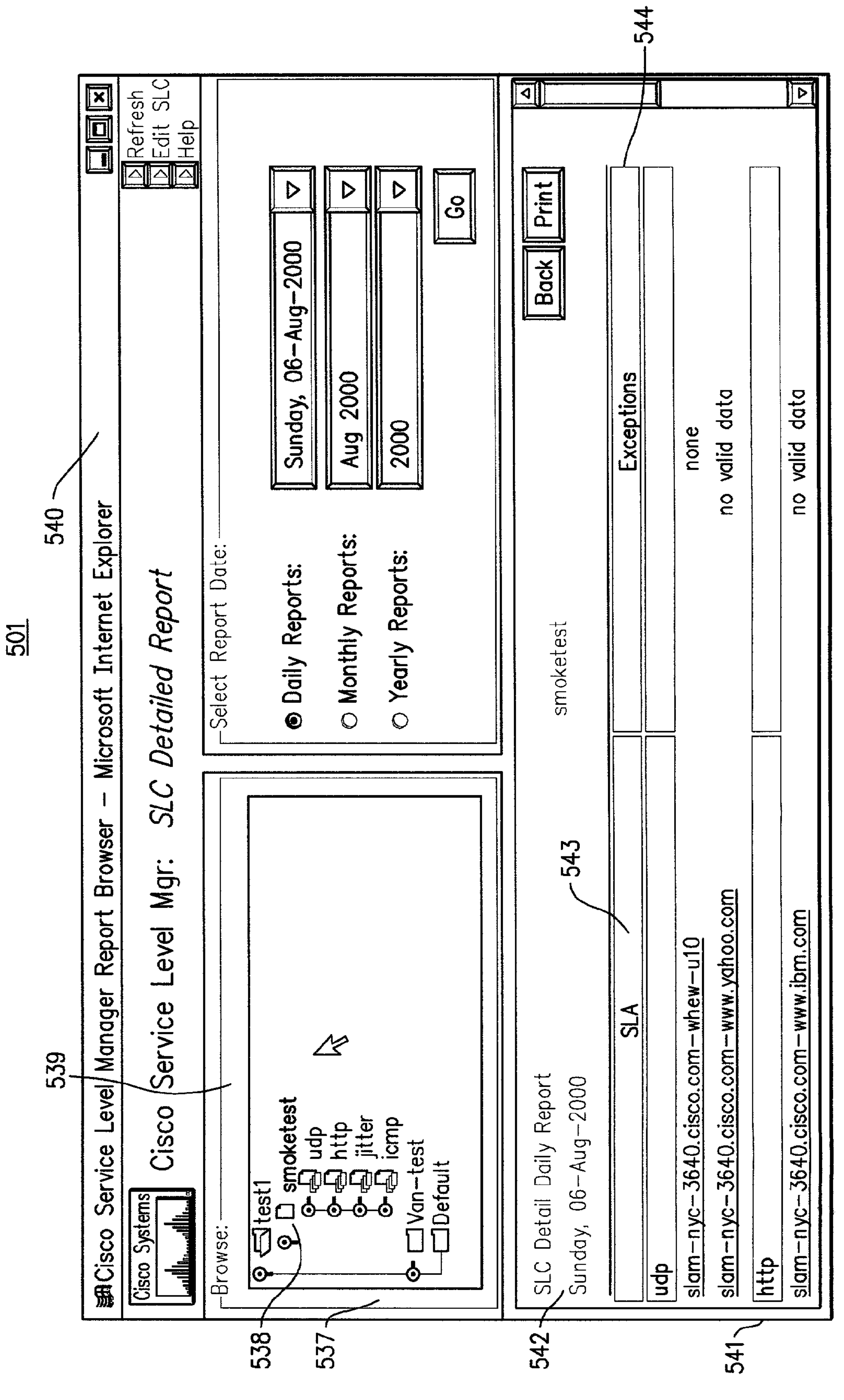
FIG. 5B illustrates an example of an SLC Detailed Report.

FIG. 5B illustrates an SLC Detailed Report window 501 that may be used to browse the SLAs associated with a specific SLC. The SLC Detailed Report window 501 includes a Top Control Frame 537 that is similar to the Top Control Frame 520 previously described in FIG. 5A. However, in this example, the user has selected a specific SLC 538 in Find Selector window 539. In response to selecting SLC 538, Heading 540 has been updated to indicate that the user is viewing specific SLC Detailed information.

As depicted, the SLC Detailed Report window 501 includes a Bottom Display Frame 541 that includes a Report Frame Heading 542, an SLA Name column 543 and an Exceptions column 544.

The Report Frame Heading 542 shows the date as well as both the folder name and the SLC name. It also indicates the context of the page in the reporting hierarchy.

The SLA Name column 543 shows both the SLA name, and the fully qualified names of the device pairs enclosed in that SLA. In one embodiment, if the user elected "Exceptions only" in the upper frame, then only SLAs that have exceptions are displayed. In certain embodiments, clicking on the SLA Name column header will cause the information to be sorted alphabetically based on the SLA names.

The Exceptions column 544 lists the types of exceptions that have occurred (if any). Clicking on the Exceptions column header causes the information to be sorted alphabetically based on the exception type.

Figure 5C:
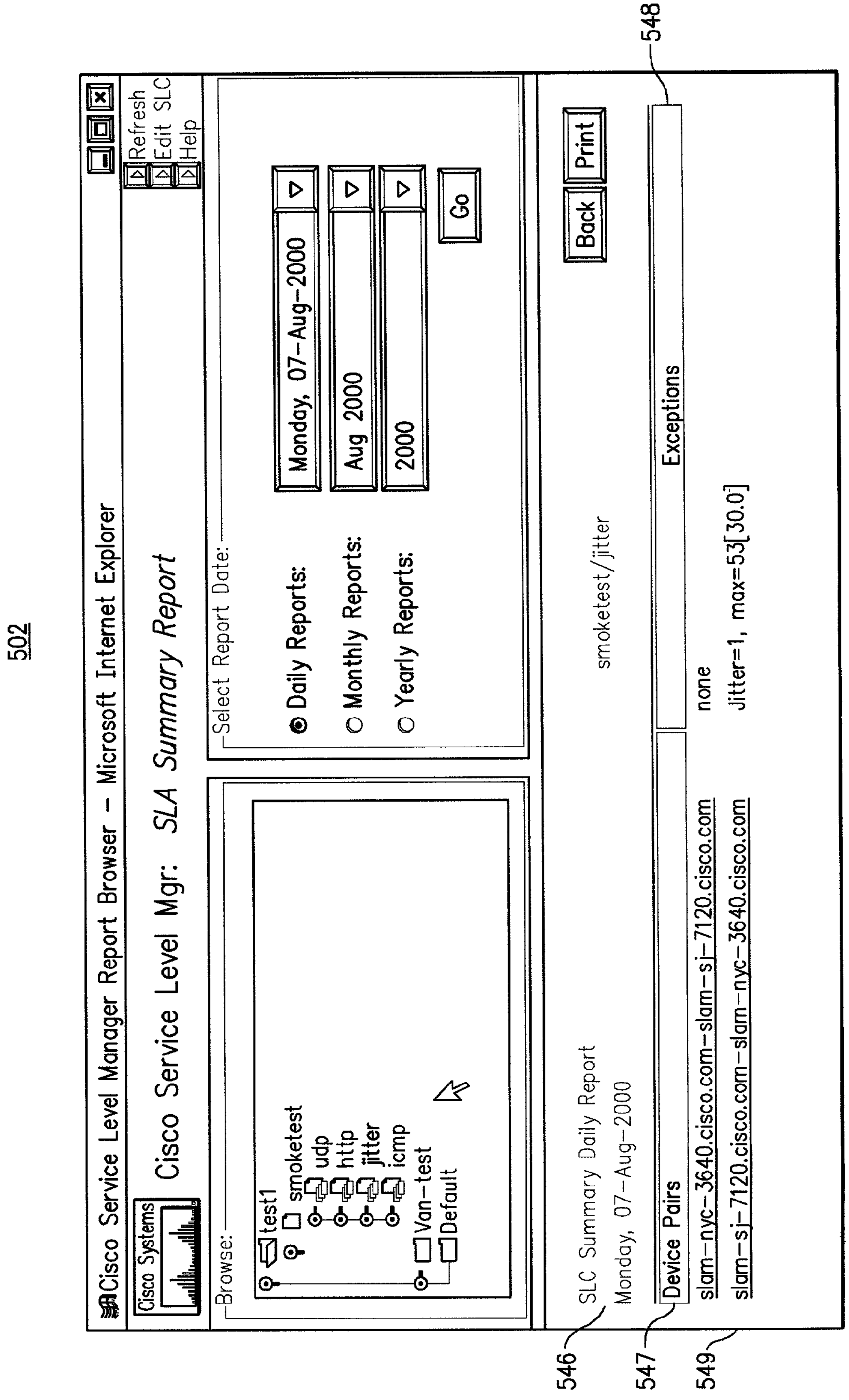
FIG. 5C illustrates an example of a partial SLA Summary Report.

FIG. 5C illustrates a partial SLA Summary Report window 502, which is shown if the user highlights an enclosing SLA folder with multiple device pairs. The SLA Summary Report window 502 includes a Bottom Display Frame 549 that includes a Summary Report Frame Heading 546, a Device Pairs column 547 and an Exceptions column 548.

The Summary Report Frame Heading 546 shows the date as well as the folder name, the SLC name, and the SLA name for the selected SLA. It also indicates the context of the page in the reporting hierarchy.

The Device Pairs column 547 shows the fully qualified name of the device pairs enclosed in the selected SLA. In one embodiment, if the user elected "Exceptions only" in the upper frame, then only device pairs with exceptions would be shown. By clicking the Device Pairs column header the user can cause the device pair names to be sorted alphabetically.

The Exceptions column 548 lists the types of exceptions that have occurred (if any). Clicking on the Exceptions column header causes the information to be sorted alphabetically based on the exception type.

Figure 5D:
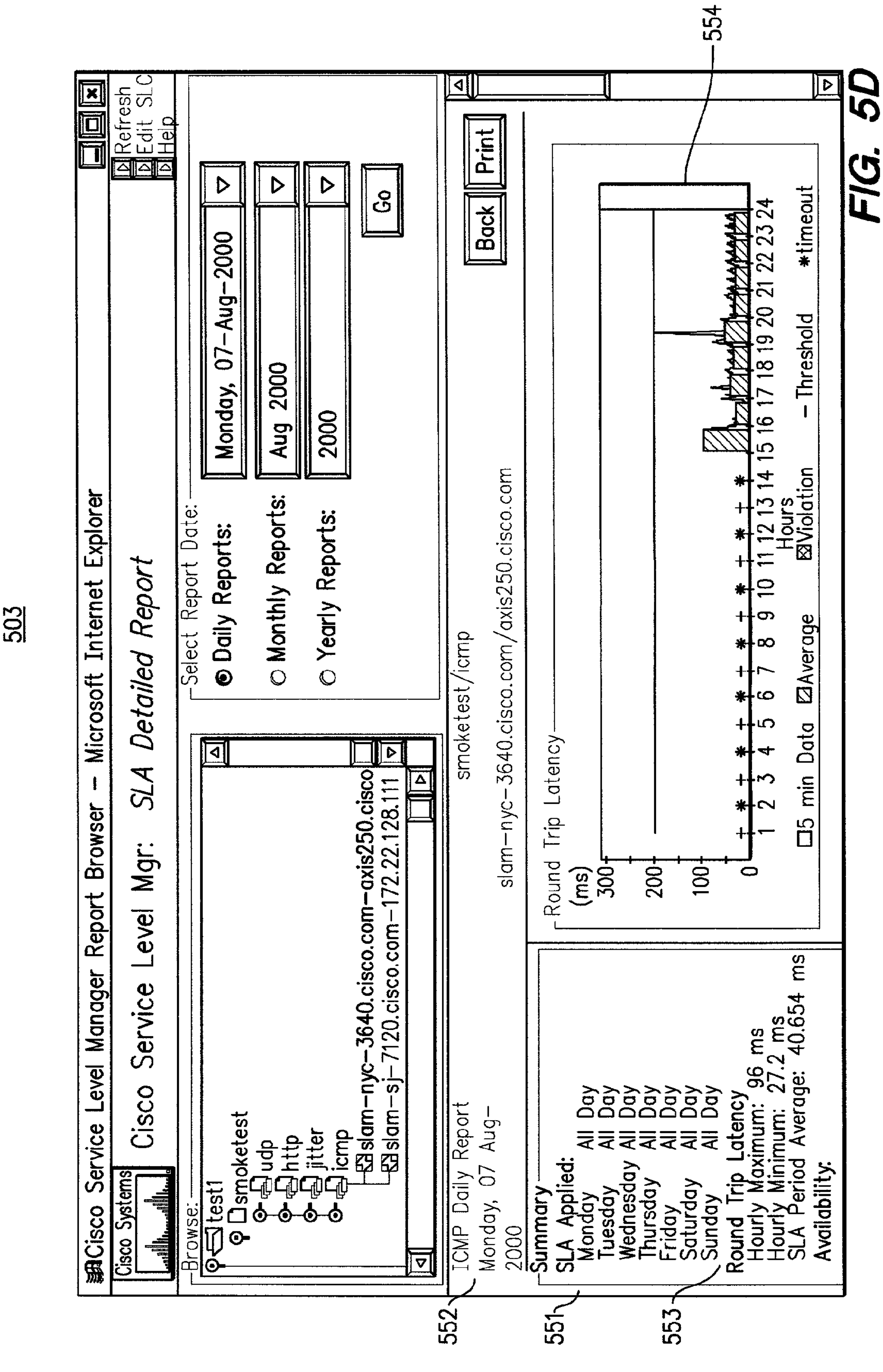
FIG. 5D illustrates an example of a partial Daily Round Trip Delay SLA Detailed Report.

FIG. 5D illustrates a partial Daily Round Trip Delay SLA Detailed Report window 503, which in one embodiment, is automatically displayed if the user selects a specific device pair for an SLA, or an SLA that includes only a single device pair. The Round Trip Delay SLA Detailed Report window 503 includes a Bottom Display Frame 551 that includes a Report Frame Heading 552, a Summary Frame 553, a Round Trip Latency Graph 554 and an Availability Graph 555.

The Report Frame Heading 552 shows the date, the folder name, the SLC name, the SLA name, and the name of the device pair that was selected for the SLA.

The Summary Frame 553 lists the actual (average) threshold values for the device pair for the selected reporting period.

The Round Trip Latency Graph 554 shows the actual data versus the threshold in milliseconds. In this example, the off-peak time periods are represented by shaded hour indicators. The maximum and minimum hourly average latency values, which correspond to the biggest and smallest bars, are shown on the graph, and are also listed in the Summary Frame 553. The raw data line corresponds to a particular sample period, the data of which is stored in a database. In general, the raw data is only stored for a short period of time, such as 48 hours, so that after expiration of the time period, the user is presented with a graph in which only the bars are displayed. In this example, the bars represent hourly averages of the collected data.

The Availability Graph 555 shows the actual data versus the threshold as a percentage. Here again, the off-peak time periods are represented by shaded hour indicators. Down links versus down devices are shown in different colors or shades on the graph.

Figure 5E:
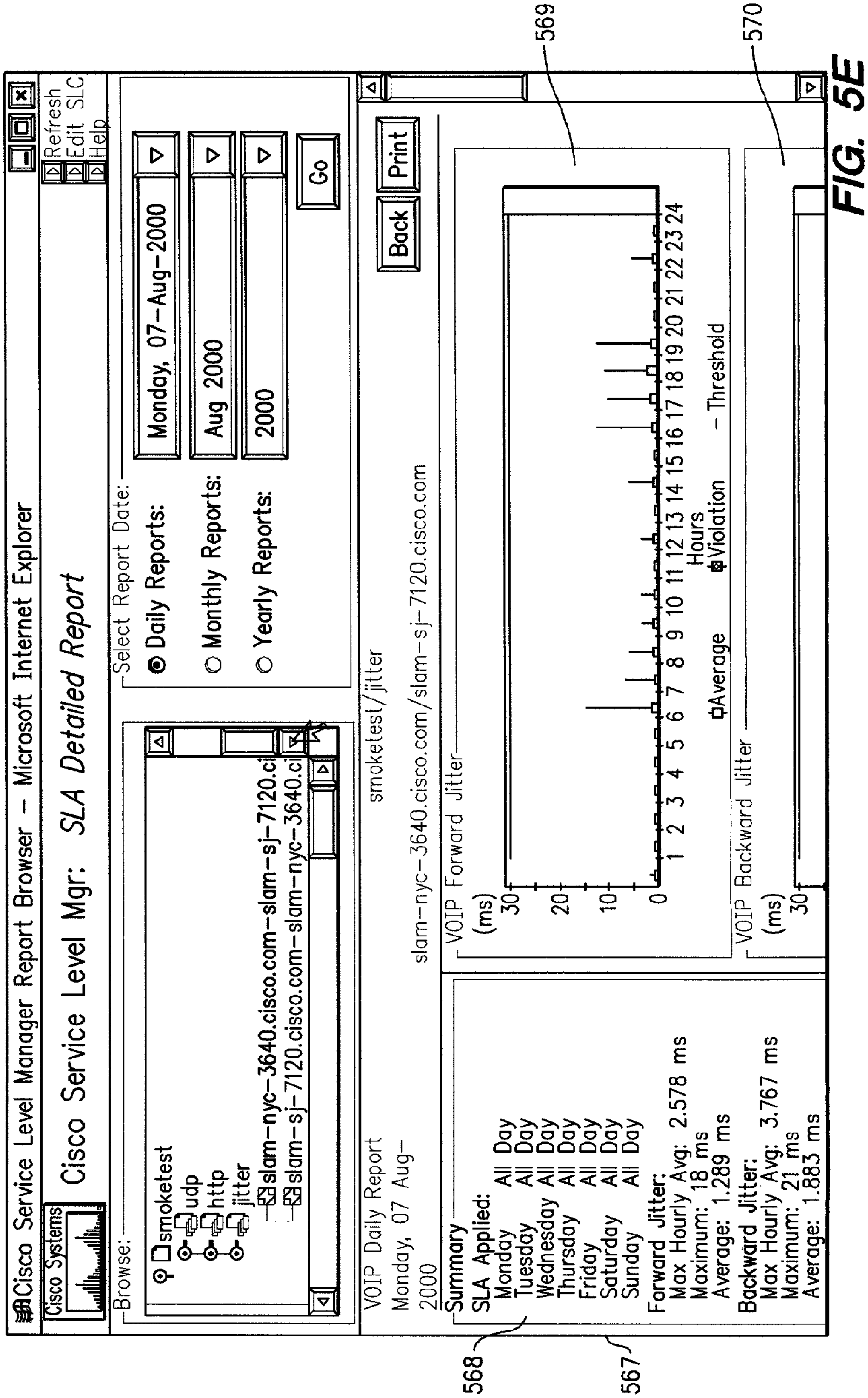
FIG. 5E illustrates an example of a partial Daily Voice Over IP SLA Detailed Report.

FIG. 5E illustrates an example of a partial Daily Voice Over IP SLA Detailed Report window 506 which includes a Bottom Display Frame 567. In this example, Bottom Display Frame 567 includes a Summary Frame 568, a Forward Jitter Graph 569, a Backward Jitter Graph 570, a Round Trip Latency Graph 571, a Forward Loss Graph 572 and a Backward Loss Graph 573.

Summary Frame 568 includes a set of metric data (SLA Applies, Forward Jitter, Backward Jitter, Round Trip Latency, Forward Packet Loss and Backward Packet Loss data) that has been collected for the selected device pair. The Forward Jitter is the jitter measurement from Source to Destination. The bar chart uses "candles" in which the body of the candle denotes the average positive and average negative jitter for each hour, and the "wick" denotes maximum positive and maximum (absolute) negative jitter for each hour. The "Max Hourly Avg" corresponds to the largest positive candle body in the time period, and the "Min Hourly Avg" corresponds to the largest (absolute) negative candle body in the period. The Maximum is the largest positive "wick", and the "Minimum" is the largest (absolute) negative "wick". The Backward Jitter is the jitter measurement from Destination to Source. The components are the same as described for Forward Jitter, but use the DS (destination-source) values from the Jitter Statistics table.

The Round Trip Latency is the total round trip time divided by the number of samples each hour. The "Maximum Hourly" corresponds to the largest bar while the "Minimum Hourly" corresponds to the smallest bar in the period. The "SLA Period Average" is the average of all the bars shown in the period.

The Forward Packet Loss is from the "Source to Destination" loss measurements in the Jitter Statistics table. The "Maximum Hourly" corresponds to the largest bar in the graph. The "Minimum Hourly" corresponds to the smallest bar in the graph. The "SLA Period Average" is the average of all the bars shown for the period. The Backward Packet Loss is from the "Destination to Source" loss measurements in the Jitter Statistics table. The values are similar to those shown for Forward Loss.

Forward Jitter Graph 569, Backward Jitter Graph 570, Round Trip Latency Graph 571, Forward Loss Graph 572 and Backward Loss Graph 573 are graphs depicting, on hourly intervals, the information described in Summary Frame 568.

Hardware Configuration Example

Figure 6:
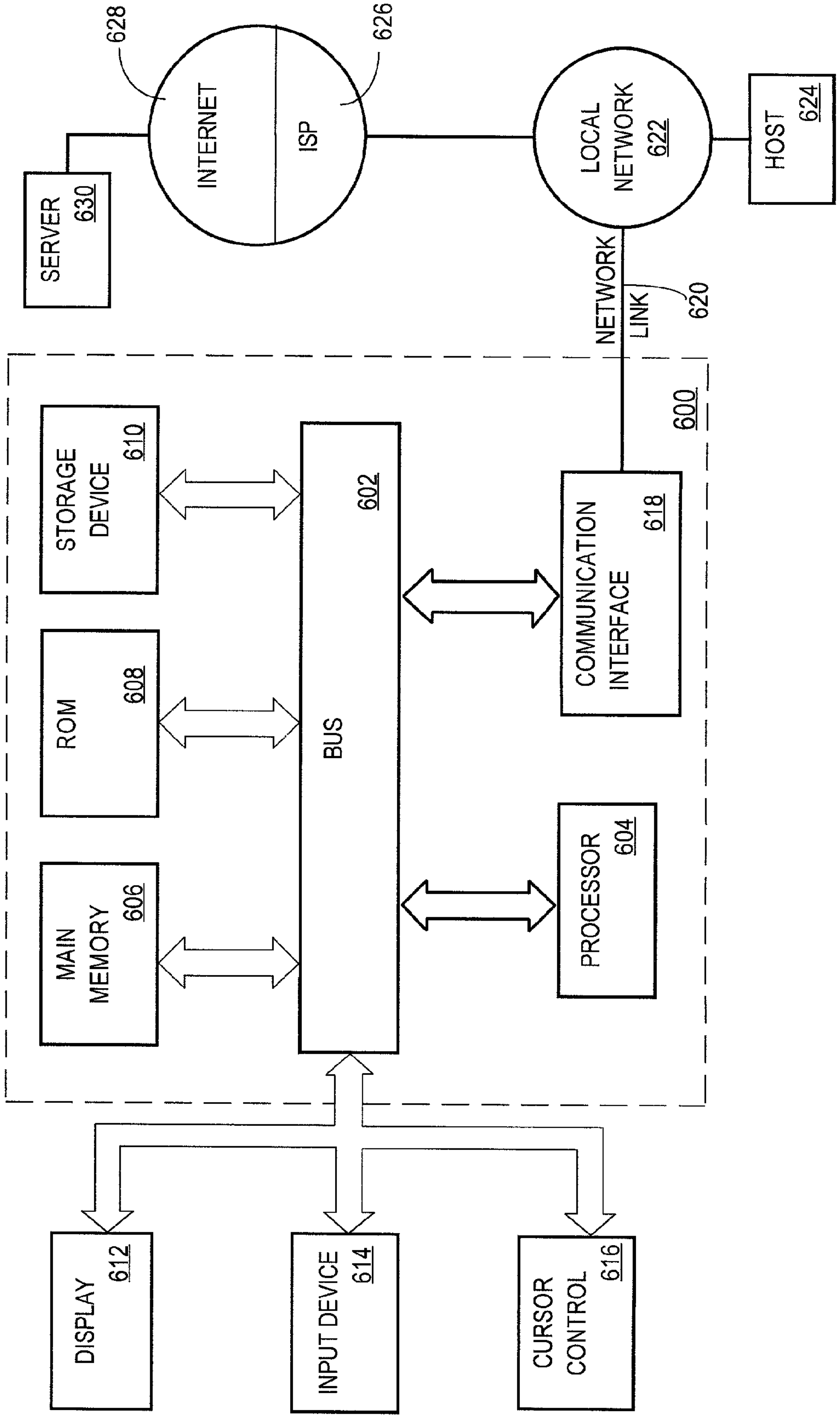
FIG. 6 is a block diagram of a computer system hardware arrangement that can be used to implement certain aspects of the invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for providing a service monitoring mechanism for monitoring Service Level Agreements (SLAs) and Service Level Contracts (SLCs) is provided. According to one embodiment of the invention, the service monitoring mechanism is provided in part by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for providing on-line standardized contract configurations for monitoring Service Level Agreements (SLAs) and Service Level Contracts (SLCs) as described herein.

The received code may be executed by processor 604 as it is received, and/or stored in storage device 610, or other non-volatile storage for later execution. In this manner, computer system 600 may obtain application code in the form of a carrier wave.

Alternatives, Extensions

The service monitoring mechanism that is described herein provides for time-based monitoring of Service Level Agreements (SLAs) and Service Level Contracts (SLCs).

In describing certain embodiments of the invention, several drawing figures have been used for explanation purposes. However, the invention is not limited to any particular context as shown in drawing figures, and the spirit and scope of the invention include other contexts and applications in which the distributed authorization model described herein is available to other mechanisms, methods, programs, and processes. For example, although FIG. 1 includes a single client 116 communicating to a single SLM Server 110, embodiments of the inventions not are limited to any particular number of components or component types. In addition, although examples have been provided using the XML language, embodiments of the invention are not limited to any particular language. For example, other languages such as Simple Object Access Protocol (SOAP) language may potentially be used to define DTDs for providing an open standard interface for monitoring and managing SLAs and SLCs. Thus, the specification and drawings are, accordingly, to be regarded in an illustrative rather than a restrictive sense.

In addition, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

APPENDIX

Copyright © 1998 Cisco Systems, Inc.

| | Definitions |
|---|---|
| Availability | The percentage of time that a device or link is operational. |
| DNS | Domain Name Service. |
| DTD | Document Type Definition. Syntax used to define an XML schema. |
| IOS | Cisco Internetworking Operating System |
| Jitter | Variability between packet delivery times, used as a measure of voice data quality. |
| Latency | The amount of time it takes for packets to travel from one device to another. |
| MTBF | Mean Time Between Failure. This is the average length of time that a device or link is operational. |
| MTTR | Mean Time To Repair. This is the average length of time that a device or link is NOT operational. |
| RME | Resource Managers Essentials |
| SAA | Service Assurance Agent. An IOS feature that measures Round Trip Response time (RTR). SAA provides different probes for measuring various types of response (e.g. HTTP, DNS, Echo, Jitter) |
| SAA Device | A network device that supports the SAA feature set. |
| SLM/SLAM | Service Level Manager |
| SLA | Service Level Agreement. The specific metric and threshold to which a service provided has agreed to meet. |
| SLC | Service Level Contract. This is the agreed upon set of SLAs which the service provider has agreed to meet with their customer. |
| SNMP | Simple Network Management Protocol |
| Syslog | Standard system error and informational logging mechanism |
| TOS | Type Of Service. This is a special field in IP packet headers that indicate the route type (e.g. speed versus cost) to use when forwarding the packet. See RFC 1349 |
| URL-encoded | Strings that are passed as data via HTTP URLs must be encoded to prevent any embedded special characters from being interpreted as part of the URL. This means that spaces are replaced by the "+" character, and special characters such as "&" are replaced by % followed by the hexadecimal equivalent of the ASCII character. For example, the string Jack & Jill would become Jack+%26+Jill |
| XML | Extensible Markup Language |

1. SLM Server Login

SLM server uses the CMF security and authentication framework, which is based on session cookies, to validate remote requests. Remote applications need to login and be authenticated by the SLM server before they can access SLM services. The login process is described below.

1.1. Authentication Servlet URL:

http://SLM_SERVER:PORT/CSCOnm/servlet/com-.cisco.nm.cmf.servlet.CsAuthServlet Where "SLM_SERVER" is the host name of the machine on which SLM is installed, and PORT is either 80 (on Unix hosts) or 1741 on PCs or other hosts on which 80 is already in use.

1.2. Servlet Parameters

The table below outlines the Servlet parameters used to login to and logout from SLM Server.

| Request | | Response |
|---|---|---|
| Command | Parameters | Returned Value |
| cmd=authUser | name=userName pwd=password | true:X ,where X is the privileges code or false |
| cmd=logout | | true |

The password needs to be encoded using BASE64 encoding. For more information about BASE64 encoding, see RFC1521. As an example, to login to the SLM server called "MyServer" with the user name "admin" and password "admin" (encoded as YWRtaW4=), the following HTTP request needs to be sent:

http://myserver/CSCOnm/servlet/com.cisco.nm.cmf.servlet.CsAuthServlet?cmd=authUser&name=admin&pwd=YWRtaW4=

If the authentication is successful, the servlet will return a session cookie, which will be used to validate subsequent requests made by the application. Sessions cookies are handled by the browser and are transparent to the application. An authenticated session remains valid until a logout request is made or a timeout occurs.

Currently, the SLM server requires only the minimum user role (mask 0) to allow access to SLM services.

Note that it may take a few seconds for the session cookie authorization to complete before further commands can be issued. See Chapter 11 for example code that can be used to communicate with the servlet.

2. Folders and Folder Lists

Folders are a user interface convention in SLM that allows users to organize their SLCs. Folders are also useful for third-party application vendors who want to store SLCs in a standard folder (perhaps for branding purposes). Folder services are based upon the following objects:

FolderList: A list of the folders that currently exist on the SLM server.

Folder: A Folder has a name and a list of the names of the SLCs contained in the folder.

The following sections will cover the supported operations for Folders, the servlet API for operating on Folders and the object attributes of Folders. The formal DTDs for Folders will be presented at the end of the chapter. SLC operations will be addressed separately in the next chapter.

2.1. Servlet API for Folders 2.1.1. Servlet URL http://SLM_SERVER:PORT/CSCOnm/servlet/com-.cisco.nm.slam.admin.servlet. AdminServlet Where "SLM_SERVER" is the host name and "PORT" is the port number (if applicable) of the machine on which the SLM server is installed.

2.1.2. Servlet Parameters

The table below outlines the Folder operations and parameters supported by the Admin Servlet. The request's POST parameters would be structured as follows:

class=Folder & cmd=command & param=value

Folder Operations

| REQUEST | | RESPONSE |
|---|---|---|
| Command | Parameters | Return Value (if successful) |
| Enumerate | | An XML buffer that confonns to the Folder-List DTD and contains a list of the current Folder names and the names and handles of SLCs contained the Folders. A FolderList containing 2 folders would have the following form:<br><FolderList><br><Folder Handle=9876><br>. . . Contents of Folder 1 . . .<br></Folder><br></Folder Handle=1234><br>. . . Contents of Folder 2 . . .<br></Folder><br></FolderList> |
| Add | name = folderName | <SlamAdminResult><br>"folderID"<br></SlamAdminResult> |
| Delete | folderhandle = folderID | Note: a folder can not be deleted unless it is empty.<br><SlamAdminResult><br>"Success"<br></SlamAdminResult> |
| Get | folderhandle = folderID | An XML buffer that conforms to the Folder-List DTD and contains only the requested Folder handle and its associated SLCs. |
| Modify | folderhandle = folderID<br>name = folderName | This command changes the name of the folder referenced by the folderID handle. On success, the following result is returned:<br><SlamAdminResult><br>"Success"<br></SlamAdminResult> |
| MoveSLC | folderhandle = folderID<br>slchandle = SLC_ID | This command moves an SLC to the folder referenced by the folderID handle on the SLM administration server. On success, the following result is returned:<br><SlamAdminResult><br>"Success"<br></SlamAdminResult> |

2.2 FolderList and Folder Schema

A FolderList contains a list of the Folders that are defined on the SLM server, and the list of SLCs that are defined in each folder. A folder list has the following components:

FolderList (Folder)

Folder (Name, Handle, SlcList)

| Component | Description | Required | Quantity |
|---|---|---|---|
| FolderList | An XML list of one or more Folder objects | Yes | 1 or more |
| Folder | An XML object used to encapsulate a group of SLCs. There is always at least one Folder defined on the SLM Server, although it may be empty. | Yes | 1 or more |
| Name | The name of the folder. The name must be unique, and cannot exceed 20 characters in length. | Yes | 1 |
| Handle | This is an integer value used as an internal identifier for the Folder. The number is assigned by the SLM server. Clients must use this handle when performing other operations such as folder deletion. This is used for the "id" Command parameter when operating on a Folder. | Yes | 1 |
| SlcList | The list of SLCs contained in the Folder. If the folder contains no SLCs, the SLCList will be empty. SLCLists are described below. | Yes | 1 |

2.2.1. SlcList and Slc as part of a Folder

An SlcList contains a list of the names and handles of the SLCs which are stored in a particular folder. An SlcList has the following components:

SlcList (Slc)

Slc (Name, LastModifiedTime, Handle)

| Component | Description | Required | Quantity |
|---|---|---|---|
| Slc | An SLC contained in the SLC List. | No | 0 or more |
| Name | The name of the SLC. The name must be unique on the SLM server, and cannot exceed 40 characters in length. | Yes | 1 |
| LastModifiedTime | A date stamp of when the SLC was last changed. The stamp is of the form: MM-DD-YYYY hh:mm:ss ZZZ For example, 10-25-1999 04:23:01 GMT | Yes | 1 |
| Handle | This is an integer value used as an internal identifier for the SLC. The SLM server assigns this number. Clients must use this handle when performing other operations by specifying this handle in the "handle" command parameter. | Yes | 1 |

3. Inventory Services

The Inventory API can be used to retrieve a list of devices that are being managed by the RME product, and are therefore available for use by SLM. Inventory services are accessed via the "Inventory" request class. This interface can be used to determine if particular devices are supported prior to creating SLAs for those devices.

3.1. Servlet API for Inventory 3.1.1. Servlet URL http://SLM_SERVER:PORT/CSCOnm/servlet/com-.cisco.nm.slam.admin.servlet. AdminServlet Where "SLM_SERVER" is the host name and "PORT" is the port number (if applicable) of the machine on which the SLM server is installed.

3.1.2. Servlet Parameters

The table below outlines the Folder operations and parameters supported by the Admin Servlet. The request's POST parameters would be structured as follows:

class=Inventory & cmd=Command & Parameter=Value

| Inventory Operations | | |
|---|---|---|
| REQUEST | | RESPONSE |
| Command | Parameters | Return Value (if successful) |
| GetDevices | Type=Device_Type The possible types are listed in the Device Type table below. If omitted, the names of all devices managed by RME will be returned.<br>View = <View_ID> You can also retrieve devices based upon a view id. Use the GetViews command to retrieve the available Views. Specifying both Type and View will result in the returned list containing devices that match both values. (i.e., the intersection of the two lists). | An XML buffer that DeviceList DTD and contains a list of the device names. A DeviceList containing 2 device would have the following form:<br><DeviceList type = Device_Type><br><Device> Fully_Qualified_Hostname1 </><br><Device> Fully_Qualified_Hostname2 </><br></DeviceList> |
| GetSAADevices | View = <View_ID> you can also retrieve devices based upon a view id. Use the GetViews command to retrieve the available Views. | An XML buffer that conforms to the SAA-DeviceList DTD and contains a list of the device names and the supported SAA probe type(s). A DeviceList containing 2 device would have the following form:<br><SAADeviceList><br><SAADevice types= "ICMP,UDP" >Hostname1</><br><SAADevice types="ICMP, UDP,DNS,HTTP"> Hostname2 </><br></SAADeviceList> |
| GetViews | None | An XML buffer that conforms to the Device View-List DTD and contains a list of the static and dynamic device views in the RME inventory. This is used to retrieve just those devices that match some pre-defined set of criteria.<br><DeviceViewList><br><View Id=1> "All Catalysts" </View><br><View Id=2> "All 4000 Routers" </View><br><View Id=3> "All North American Devices"</View><br><View Id=4> "All Japan Devices" </View><br></DeviceViewList> |

3.2. DeviceList Schema

A DeviceList contains a list of all the Devices that are managed by the RME Inventory and match the query. A DeviceList has the following components:

DeviceList (Type, View, Device)

| Component | Description | Required | Quantity |
|---|---|---|---|
| Type | The type of Devices listed. The possible types are described in the Device Type table below. | Yes | 1 |
| View | A View ID, if such and ID was used to generate the DeviceList. | No | 0 or 1 |
| Device | The fully qualified name of a device, if the hostname was not entered into the RME inventory, or if the device has no hostname defined, the IP address will be used. if no devices match the type, this list may be empty. | No | 0 or more |

| Device_Type can be any of the following: | |
|---|---|
| Device Type | Description |
| ICMP | Source Devices that support ICMP Probe |
| UDP | Source Devices that support UDP Probe |
| DNS | Source Devices that support DNS Probe |
| HTTP | Source Devices that support HTTP Probe |
| VoIP | Source/Target Devices that support Jitter Probe |
| All | All managed devices in inventory |

3.3. SAADeviceList Schema

A SAADeviceList contains a list of all the SAA Devices that are managed by the RME Inventory and match the query. A DeviceList has the following components:

SAADeviceList (View, SAADevice)

SAADevice(Types)

| Component | Description | Required | Quantity |
|---|---|---|---|
| View | A View ID, if such and ID was used to generate the SAADevice-List. | No | 0 or 1 |
| SAADevice | The fully qualified name of a SAA device, if the hostname was not entered into the RME inventory, or if the device has no host-name defined, the IP address will be used. if no devices match the type, this list may be empty. | No | 0 or more |
| Types | The CSV list of SAA probe type(s) supported by the SAA device. See the Device Type table above for the list of SAA probe types. | Yes | 1 or more per device |

3.4.

4. Data Export Services

The Data Export API can be used to retrieve data from the SLM Server for existing SLCs/SLAs. The SLC handle (slcid) and SLA handle (slaid) are returned when an SLC/SLA is created. Alternatively, you can use the Folder API to retrieve the SLC identifier, and then use that handle to get the specific SLC XML, which will contain the component SLAs and their IDs. The SLM Data Export can be accessed by calling SlamDataExportServlet. A username and password must be set in the authentication cookie prior to using any SLM servlet.

Servlet API for Data Export 4.1.1. Servlet URL http://SLM_SERVER:PORT/CSCOnm/servlet/com-.cisco.nm.slam.report.servlet. SlamDataExportServlet Where "SLM_SERVER" is the host name and "PORT" is the port number (if applicable) of the machine on which the SLM server is installed.

Export Operation Parameters

| Request Parameter | Description | Required |
|---|---|---|
| Slcid | Numeric SLC Identifier | Yes |
| Slaid | Numeric SLA Identifier | Yes |
| Srcdev | The fully qualified name of the source device, if not specified, data for all source devices in the SLA will be returned. | No |
| Destdev | The fully qualified name of the destination device, if not specified, data for all destination devices in the SLA will be returned. | No |
| Start | The start time and date for the portion of the table to export. The format is dd-MMM-yyyy:hh:mm E.g., 08-Sep-1999:15:03 Data from the table recorded on or after that date and time will be exported. If not specified, the start date will be the earliest date at which data was collected. The time is relative to UTC. | No |
| End | The end time and date for the portion of the table to export. The format is the same as for the start time. Data recorded from the start time up to before the end time will be exported. if the end time is omitted, all data from the start time to the latest data available in the table will be exported, subject to practical file size limitations. The time is relative to UTC. | No |
| Type | The type of data to be exported. Possible values are shown in the Type table below, if omitted, Hourly values for all Types applicable to the SLA will be returned, if the Type value selected in the request does not match the type of the requested SLA, an error will be returned. | No |

The following table shows the possible Type field values:

| Type Name | Description |
|---|---|
| DNSLatencyMin | Latency values for DNS probes. This Type will return the 5-Minute values, or the smallest available time interval if probes were collected at greater than 5-Minute intervals, If more than one probe was collected in a 5-Minute period, the Minimum, Maximum, and Average values will be returned. Otherwise, the value will be returned as the Average. |
| DNSLatencyHourly | Latency values for DNS probes. Includes Min, Max, and Average values for each One-Hour time period. |
| ICMPLatencyMin | Latency values for ICMP probes. This Type will return the 5-Minute values, or the smallest available time interval if probes were collected at greater than 5-Minute intervals. If more than one probe was collected in a 5-Minute period, the Minimum, Maximum, and Average values will be returned. Otherwise, the value will be returned as the Average. |
| ICMPLatencyHourly | Latency values for ICMP probes. Includes Min, Max, and Average values for each One-Hour time period. |
| HTTPLatencyHourly | Latency values for HTTP probes. Includes Min, Max, and Average values for each One-Hour time period. HTTP results include the time taken for DNS lookup, TCP Connect, and the HTTP Transaction as separate values. |
| VoIPHourly | One-Hour values for VoIP probes. This includes Minimum, Maximum, and Average values for each of the data types returned in a Jitter probe. |
| UDPLatencyMin | Latency values for UDP probes. This Type will return the 5-Minute values, or the smallest available time interval if probes were collected at greater than 5-Minute intervals. If more than one probe was collected in a 5-Minute period, the Minimum, Maximum, and Average values will be returned. Otherwise, the value will be returned as the Average. |
| UDPLatencyHourly | Latency values for UDP probes. Includes Min, Max, and Average values for each One-Hour time period. |
| DNSAvailabilityHourly | Availability values for DNS probes. Includes Device Down and Link Down values for each One-Hour time period, expressed as a decimal value from 0.0 to 100.0 (0% to 100%) down time per period. |
| ICMPAvailabilityHourly | Availability values for ICMP probes. Includes Device Down and Link Down values for each One-Hour time period, expressed as a decimal value from 0.0 to 100.0 (0% to 100%) down time per period. |
| UDPAvailabilityHourly | Availability values for UDP probes. Includes Device Down and Link Down values for each One-Hour time period, expressed as a decimal value from 0.0 to 100.0 (0% to 100%) down time per period. |
| Hourly | Exports all hourly data. For ICMP, DNS, and UDP, both hourly latency and hourly availability are exported. For HTTP, hourly HTTP, data are exported. For VoIP, hourly VoIP data are exported. |

Hourly values are calculated by taking the Minimum, Maximum, and Average values for all samples that were recorded for each hour.

Availability is calculated as a percentage of time for each hour that the device or link was down.

4.2. Export Result Schema

The SlamDataExportServlet will output the result to the browser, with the content type set to be "text/html". The output will be in XML format.

The servlet will return all of the data from the specified start time, up to the end time. If the end time is omitted, the values will be returned up to the end of the available data. Note that if an error occurs during the export process, for example a dropped database or network connection, the data output may be truncated.

The data export returns the data in a common format with standard information at the head of the data set. This information has the following components:

Results (SlcHandle, SlaHandle, (ICMPResult|UDPResult|DNSResult|HTTPResult|VoIPResult))

ICMPLatency, VoIP, etc, refers to the additional DTD that is included depending on the type of data being returned. These values are described later in this chapter. If more than one device pair is found to match the query, multiple data sets may be returned.

| Component | Description | Required | Quantity |
|---|---|---|---|
| SlcHandle | The numeric identifier for the requested SLC. | Yes | 1 |
| SlaHandle | The numeric identifier for the requested SLA contained within the SLC. | Yes | 1 |

An SlmResults element has the following format:

```
<SlmResults
                    slcHandle="slc_Id_number"
                    slaHandle="sla_Id_number" >
                    . . . Specific type of data set
here . . .
</SlmResults>
```

The specific data set types are described in the following sections.

4.2.1. ICMPResult, UDPResult, DNSResult

The format for ICMP, UDP, and DNS Results are nearly identical. The results in each case consist of two possible data sets: Latency and Availability. If no type was specified in the request, hourly data for both sets will be returned.

ICMP Results have the following Components:

ICMPResult SourceDevice, TargetDevice (Latency, Availability)

UDP Results have the following Components:

UDPResult SourceDevice, TargetDevice (Latency, Availability)

DNS Results have the following Components:

DNSResult SourceDevice, TargetDevice (Latency, Availability)

| Component | Description | Required | Quantity |
|---|---|---|---|
| SourceDevice | The fully qualified host name of the source device. | Yes | 1 |
| TargetDevice | The fully qualified host name of the destination device. | Yes | 1 |
| Latency | This represents one row of latency data from the database. All the data in this set is from the same time period for the given Source and Target devices. The Latency row format is described below. | No | 0 or more |
| Availability | This represents one row of availability data from the database. All the data in this set is from the same time period for the given Source and Target devices. The Availability row format is described below. | No | 0 or more |

A sample ICMP Result might look as follows:

```
<ICMPResult SourceDevice="source_device_name"
TargetDevice="target_device_name">
    . . . Latency results . . .
    . . . Availability results . . .
</ICMPResult>
```

4.2.1.1.

4.2.1.2. Latency

The Latency export data format applies to general Latency data. This includes ICMP, UDP, and DNS probes. Latency results have the following Components:

Latency (Date, Min, Max, Avg, NumSuccessfulSamples, NumUnsuccessfulSamples, Status, StatusDesc)

| Component | Description | MIB Values Used | Required | Quantity |
|---|---|---|---|---|
| Date | The date stamp at the beginning of which the data was collected. This is a date string of the form dd-MMM-yyyy:hh:mm E.g., 08-Sep-1999:15:03 | N/A | Yes | 1 |
| Min | The minimum latency value in miliseconds for all samples in the given time period. If there is no data in that time period, this may be blank. | Minimum of rttMonhistory-Collection-SampleTime divided by the number of samples | No | 0 or 1 |
| Max | The maximum latency value in miliseconds for the given time period. May be the same as Minimum if only one sample was recorded. | Maximum of rttMonhistory-Collection-SampleTime divided by the number of samples | No | 0 or 1 |
| Avg | The average of the latency values in miliseconds for the given time period. May be the same as Minimum and Maximum if only one sample was recorded. | Average of rttMonhistory-Collection-SampleTime divided by the number of samples | Yes | 1 |
| Num Successful Samples | The number of successful operations used to calculate Min, Max, and Avg values. | N/A | Yes | 1 |
| Num Unsuccessful Samples | The number of unsuccessful operations. | N/A | Yes | 1 |
| Status | The completion status of the SAA operations. See the following table for the list of possible status. | RttResponse-Sense | Yes | 1 |
| StatusDesc | Additional description of the completion status. | RttResponse-Sense | No | 0 or 1 |

The following table shows the possible completion status:

| | |
|---|---|
| ok - | a valid completion occurred and timed successfully |
| disconnected - | the operation did not occur because the connection to the target was lost |
| overThreshold - | a valid completion was received but the completion time exceeded a threshold value |
| timeout - | an operation timed out; no completion time recorded |
| busy - | the operation did not occur because a previous operation is still outstanding |
| notConnected - | the operation did not occur because no connection (session) exists with the target |
| dropped - | the operation did not occur due to lack of internal resource |
| sequenceError - | a completed operation did not contain the correct sequence id; no completion time recorded |
| verifyError - | a completed operation was received, but the data it contained did not match the expected data; no completion time recorded |
| applicationSpecific - | the application generating the operation had a specific error |
| dnsServerTimeout - | DNS Server Timeout |
| tcpConnectTimeout - | TCP Connect Timeout |
| httpTransactionTimeout - | HTTP Transaction Timeout |
| dnsQueryError - | DNS Query error (because of unknown address, etc.) |
| httpError - | HTTP Response StatusCode is not OK (200) |
| error - | Socket failures or some other errors not relavant to the actual probe |
| multipleErrors - | more than one error conditions occurred |

A sample Latency row might look as follows:

```
<Latency Date="timestamp_string" Min="min_value"
Max="max_value"
                    Avg="average_value"
NumSuccessfulSamples="number"
          NumUnsuccessfulSamples="number"
status="completion_status" > </>
```

4.2.2.

4.2.2.1 Availability

The Availability export data format applies to general Availability data. This includes ICMP, UDP, and DNS probes. Availability rows have the following Components:

Availability (Date, DeviceDown, LinkDown)

| Component | Description | MIB Values Used | Req'd | Quantity |
|---|---|---|---|---|
| Date | The date stamp at the beginning of which the data was collected. This is a date string of the form dd-MMM-yyyy: hh:mm:ss ZZZ E.g., 08-Sep-1999:15: 03:02 GMT | N/A | Yes | 1 |
| DeviceDown | The Device Down data for this row expressed as a percentage value from 0.0 (0%) to 100.0 (100%). Implicitly, if the device is down its outgoing link is also down. However, this is not counted in the link downtime to avoid double-counting. | Lack of response is verified against sysUpTime and Reload events to distinguish between being unable to get to the device versus the device itself being down. | Yes | 1 |
| LinkDown | The Link Down data for this row, expressed as a percentage value from 0.0 (0%) to 100.0 (100%). | RttMonHistoryCollectionSense If the value is disconnected(2), timeout(4) or notConnected(6), the link is considered to be down. | Yes | 1 |

An Availability row has the following format:

```
<Availability Date="timestamp_string"
DeviceDown="%_value_of_device_downtime"
LinkDown="%_value_of_link_downtime"> </>
```

4.2.3. HTTPResult

The HTTP Result contains Latency data that only applies to the special information available from HTTP probes. The XML export has the following Components:

HTTPResult (SourceDevice, TargetDevice, HTTPLatency)

HTTPLatency (Date, NumSuccessfulSamples, NumUnsuccessfulSamples, Status, StatusDesc, DNS, Connect, Transact, Total, ResponseSize)

DNS (min, max, avg)

Connect (min, max, avg)

Transact (min, max, avg)

Total (min, max, avg)

ResponseSize(min, max, avg)

| Component | Description | MIB Values Used | Req'd | Quantity |
|---|---|---|---|---|
| SourceDevice | The fully qualified host name of the source device. | N/A | Yes | 1 |
| TargetDevice | The fully qualified host name of the destination device. | N/A | Yes | 1 |
| HTTPLatency | This represents one row of HTTP Latency data from the database. That is, all the data in this set is from the same time period. | N/A | Yes | 1 or More |
| Date | The date stamp at the beginning of which the data was collected. | N/A | Yes | 1 |

-continued

| Component | Description | MIB Values Used | Req'd | Quantity |
|---|---|---|---|---|
| | This is a date string of the form dd-MMM-yyyy:hh:mm E.g., 08-Sep-1999:15:03 | | | |
| Num Successful Samples | The number of successful operations used to calculate Min, Max, and Avg values. | N/A | Yes | 1 |
| Num Unsuccessful Samples | The number of unsuccessful operations. | N/A | Yes | 1 |
| Status | The completion status of the SAA operations. See the following table for the list of possible status. | RttMonHTTP-Stats . . . | Yes | 1 |
| StatusDesc | Additional description of the completion status. | RttMonHTTP-Stats . . . | No | 0 or 1 |
| Dns | The DNS data, in milliseconds, for row. This contains minimum, maximum, and average values of the samples collected during this time period. Each of these values has an element tag. | Min, Max, and Average for time period from rttMon-HTTPStats-DNSRTTSum Only the Avg value is required. For hourly data, Min, Max, and Average have the same value. | Yes | 1 |
| Connect | The Connect time data, in milliseconds, for this row. This contains minimum, maximum, and average values of the samples collected during this time period. Each of these values has an element tag. | Min, Max, and Average for time period from rttMon-HTTPStats-ConnectRTT-Sum Only the Avg value is required. For hourly data, Min, Max, and Average have the same value. | Yes | 1 |
| Transact | The HTTP Transaction time data, in milliseconds, for this row. This contains minimum, maximum, and average values of the samples collected during this time period. Each of these values has an element tag. | Min, Max, and Average for time period from rttMon-HTTPStats-TCPTransact-ionRTTSSum Only the Avg value is required. For hourly data, Min, Max, and Average have the same value. | Yes | 1 |
| Total | The total time in miliseconds for the transaction. This is the sum of the transaction, connect, and DNS lookup times. | Min, Max, and Average for time period from rttMon-HTTPStats-RTTSum Only the Avg value is required. | Yes | 1 |

-continued

| Component | Description | MIB Values Used | Req'd | Quantity |
|---|---|---|---|---|
| ResponseSize | The size (in octets) of the body of the HTTP response. | Min, Max, and Average for time period from rttMon-HTTPStats-MessageBody-OctetSum Only the Avg value is required. | Yes | 1 |

The following table shows several examples of possible completion status for HTTP probes:

| | |
|---|---|
| ok - | a valid completion occurred and timed successfully |
| DNSServerTimeout - | requests could not connect to the DNS Server. |
| TCPConnectTimeout - | requests could not donnect to the HTTP Server. |
| TransactionTimeout - | requests timed out during HTTP transaction. |
| DNSQueryError - | requests had DNS Query errors. |
| HTTPError - | requests had HTTP errors while downloading the base page |
| error - | HTTP operation could not be initiated because an internal error. |
| busies - | HTTP operation could not be initiated because a previous HTTP operation has not been completed. |
| multipleErrors - | more than one error conditions occurred |

A sample HTTP Result element will have the following format

```
<HTTPResult   SourceDevice="fully_qualified_hostname"
              TargetDevice="fully_qualified_hostname" >
        <HTTPLatency
Date="timestamp_string" NumSuccessfulSamples="number"
     NumUnsuccessfulSamples="number" Status="status" >
             <DNS
          min="min_dns_value"
          max="max_dns_value"
          avg="average_dns_value">
             </>
             <Connect
          min="min_connect_value"
          max="max_connect_value"
          avg="average_connect_value" >
             </>
             <Transact
          min="min_transaction_value"
          max="max_transaction_value"
          avg="average_transaction_value" >
             </>
             <Total
          min="min_total_value"
          max="max_total_value"
          avg="average_total_value" >
             </>
             <ResponseSize
          min="min_response_size_value"
          max="max_response_size_value"
          avg="average_response_size_value" >
             </>
          </HTTPLatency>
<HTTPResult>
```

4.2.4. VoIPResult

The VoIP data export has the following components:

VoIPResult (Row)

Row (Date, NumSuccessfulSamples, NumUnsuccessfulSamples, Status, StatusDesc, FwdJitter, BwdJitter, JLatency, FwdLoss, BwdLoss)

FwdJitter (min, max, avg)

BwdJitter (min, max, avg)

JLatency (min, max, avg)

FwdLoss (min, max, avg)

BwdLoss (min, max, avg)

| Component | Description | MIB Values Used | Req'd | Quantity |
|---|---|---|---|---|
| Row | This represents one row of VoIP data from the database. That is, all the data in this set is from the same time period. | N/A | Yes | 1 or More |
| Date | The date stamp at the beginning of which the data was collected. This is a date string of the form dd-MMM-yyyy:hh:mm E.g., 08-Sep-1999:15:03 | N/A | Yes | 1 |
| Num Successful Samples | The number of successful operations used to calculate Min, Max, and Avg values. | N/A | Yes | 1 |
| Num Unsuccessful Samples | The number of unsuccessful operations. | N/A | Yes | 1 |
| Status | The completion status of the SAA operations. See the following table for the list of possible status. | JitterStats . . . | Yes | 1 |
| StatusDesc | Additional description of the completion status. | JitterStats . . . | No | 0 or 1 |
| JLatency | The Latency data for this row. Min, max, and average values are reported in miliseconds. | Min, Max, and Average values for time period collected from rttMonJitterStatsRTTSum/rttMonJitterStatsNumOfRTT. For hourly data, Min, Max, and Avg have the same value. | Yes | 1 |
| FwdLoss | The Forward Packet Loss data for this row. Forward Loss is collected on traffic going from the Source device to the Destination device. Min, max, and average values are reported. | Min, max, and average values from the time period collected for: RttMonJitterStatsPacketLoss SD / (rttMonMonJitterStatsPacketLoss SD + rttMonJitterStatsNumOfRtt) × 100 Loss is ex- | Yes | 1 |

-continued

| Component | Description | MIB Values Used | Req'd | Quantity |
|---|---|---|---|---|
| | | pressed as a percentage. For hourly data, Min, Max, and Avg have the same value. | | |
| BwdLoss | The Backward Packet Loss data for this row. Backward loss is collected on traffic going from the Destination device to the Source device. Min, max, and average values are reported. | Min, max, and average values from the time period collected for: RttMonJitterStatsPacketLoss DS / (rttMonJitterStatsPacketLoss DS + rttMonJitterStatsNumOfRtt) × 100 Loss is expressed as a percentage. For hourly data, Min, Max, and Avg have the same value. | Yes | 1 |

The following table shows the possible completion status for VoIP probes:

| | |
|---|---|
| ok - | a valid completion occurred and timed successfully |
| PacketOutOfSequence - | packets arrived out of sequence. |
| PacketMIA - | lost packets for which we cannot determine the direction. |
| PacketLateArrival - | packets arrived after the timeout. |
| error - | operation could not be initiated because an internal error. |
| busies - | operation could not be initiated because a previous operation has not been completed. |
| multipleErrors - | more than one error conditions occured |

A sample VoIP element will have the following format:

```
<VoIPResult>
    <Row date="timestamp_string" NumSuccessfulSamples="number"
    NumUnsuccessfulSamples="number" status="status" >
            <FwdJitter
        min="forward_jitter_min_value"
        max="forward_jitter_max_value"
        avg="forward_jitter_average_value" >
            </>
            <BwdJitter
        min="backward_jitter_min_value"
        max="backward_jitter_max_value"
        avg="backward_jitter_average_value" >
            </>
            <JLatency
        min="latency_min_value"
        max="latency_max_value"
        avg="latency_average_value" >
            </>
            <FwdLoss
```

-continued

```
        min="forward__min__packet__loss__value"
        max="forward__max__packet__loss__value"
        avg="forward__average__packet__loss__value" >
            </>
            <BwdLoss
        min="backward__min__packet__losss__value"
        max="backward__max__packet__loss__value"
        avg="backward__average__packet__loss__value" >
            </>
        </Row>
</VoIPResult>
```

5. Report Navigator Cross-Launch

It is possible to launch the SLM Report Navigator from outside the RME application. One must first set up an authentication cookie as described in 1. After the cookie is established, launch the Navigator by calling the following URL:

http://SLM_SERVER:PORT/slam/jsp/slamReportBrowser.jsp

Where "SLM_SERVER" is the host name and "PORT" is the port number (if applicable) of the machine on which the SLM server is installed.

6. View Management Engine (Data Collector) Status

The following URL can be used to view the status of the distributed Management Engine(s) that collect data for the SLM server. One must first set up an authentication cookie as described in 1. After the cookie is established, launch the Status page by calling the following URL:

http://SLM_SERVER:PORT/slam/jsp/magStatus.jsp

Where "SLM_SERVER" is the host name and "PORT" is the port number (if applicable) of the machine on which the SLM server is installed.

7. Putting it all Together

In this chapter we will assemble the services described in the previous chapters into one comprehensive example.

7.1. Using Cookies

The code below shows how a Java application might communicate with the SLM server:

```
/* Copyright © 1999 Cisco Systems, Inc. All rights reserved */
import java.io.*;
import java.net.*;
/**
 * Class to access SLM Folder/SLC through HTTP Post w/ session cookies.
 * Does the following:
 * + Login to CMF Authentication Servlet from a stand-alone app
 * + Get the session cookie
 * + Use the session cookie in the HTTP requests to Slam servlet
 * + Logout
 */
public class slam
{
    protected String __urlString, __logout, __login;
    protected static final int BUF__SIZE = 2000;
    /* Constructor */
    public slam(String hostURL)
    {   __urlString = hostURL + "/CSCOnm/servlet/com.cisco.nm.slam.admin.servlet.AdminServlet";
        __login = hostURL + "/CSCOnm/servlet/com.cisco.nm.cmf.servlet.CsAuthServlet?
        cmd=authUser&name=admin&pwd=YWRtaW4=";
        __logout = hostURL + "/CSCOnm/servlet/com.cisco.nm.cmf.servlet.CsAuthServlet?
        cmd=logout";
        System.out.println("Servlet URL: " + __urlString);
    }
    /* Do a HTTP GET request */
    public String doGet(String urlString)
    {
        DataInputStream in = null;
        try
        {   URL url = new URL(urlString);
                URLConnection conn = url.openConnection( );
            conn.setUseCaches(false);
            conn.setDefaultUseCaches(false);
            conn.setRequestProperty("Content-Type", "application/x-www-form-urlencoded");
            in = new DataInputStream(new BufferedInputStream(conn.getInputStream( )));
            String res = in.readLine( );
            in.close( );
            return res;
        }
        catch (Exception excp)
        {   excp.printStackTrace( );
            return null;
        }
    }
    /* Do a HTTP POST request */
    public String doPost(String sessionID, String clas, String cmd, String param, String data)
    {
        String          result;
        StringBuffer    buf;
        BufferedReader  in = null;
        PrintWriter     out= null;
```

-continued

```
        try
        {     URL url = new URL(_urlString);
                    HttpURLConnection conn = (HttpURLConnection) url.openConnection( );
              conn.setRequestMethod("POST");
              conn.setDoOutput(true);
              conn.setDoInput(true);
              conn.setUseCaches(false);
              conn.setDefaultUseCaches(false);
              conn.setRequestProperty("Content-Type", "application/x-www-form-urlencoded");
              conn.setRequestProperty("COOKIE", "jrunsessionid=" + sessionID);
              // send request's body
              out = new PrintWriter(conn.getOutputStream( ), true);
              String req = "class=" + clas + "&" + "cmd=" + cmd;
              if(param!=null)
                    req += "&"+param;
              if(data!=null)
                    req += "&data=" + URLEncoder.encode(data);
              out.print(req);
              out.flush( );
              out.close( );
              System.out.println("POST Request sent: " + req);
              // receive response (XML)
              in = new BufferedReader(new InputStreamReader(conn.getInputStream( )));
              buf = new StringBuffer(BUF_SIZE);
              while((data = in.readLine( )) != null)
                    buf.append(data + "\n");
              result = buf.toString( );
              in.close( );
              return result;
        }
        catch (Exception excp)
        {     excp.printStackTrace( );
              try
              { out.close( );
                in.close( );
              }
              catch (Exception ex)
              { ex.printStackTrace( );
              }
              return null;
        }
  }
  /* main */
  public static void main(String argv[ ])
  {
        String cmd=null, clas=null, param=null, data=null, line;
        StringBuffer buff = new StringBuffer(BUF_SIZE);
        if(argv.length < 3)
        { System.out.println("Usage: java Slam <slamserver> Folder|SLC <cmd> [param] [xmlfile]");
              return;
        }
        cmd = argv[2];
        clas = argv[1];
        if(argv.length >=4)
              param = argv[3];
        if(argv.length >=5)
        { try
              { BufferedReader f = new BufferedReader(new FileReader(argv[4]));
                    while ((line = f.readLine( ))!=null)
                    { buff.append(line+"\n");
                    }
                    data = buff.toString( );
              }
              catch(Exception ex)
              { ex.printStackTrace( );
                data = null;
              }
        }
        // Perform HTTP request
        try
        {
              slam sa = new slam("http://"+argv[0]);
              java.lang.Thread.sleep(3000);
              String res = sa.doGet(sa._login); // login
              System.out.println("***Login: " + res);
              int idx = res.lastIndexOf(':'); // get session ID
              String session = res.substring(idx+1);
              System.out.println("***Session ID: " + session);
              java.lang.Thread.sleep(7000); // perform request(s) w/ session ID
```

-continued

```
            String result = sa.doPost(session, clas, cmd, param, data);
            System.out.println("***Response1:\n" + result);
            java.lang.Thread.sleep(7000); // this request will fail w/out a valid session ID
            result = sa.doPost("badsession", clas, cmd, param, data);
            System.out.println("***Response2:\n" + result);
            java.lang.Thread.sleep(7000);
            sa.doGet(sa._logout); // logout
            System.out.println("***Logout – Bye !");
        }
        catch (Exception ex)
        { ex.printStackTrace( );
        }
    }
}
```

For simplicity, all the following examples are shown only as the Post command that is required for the request. If you were doing these requests in conjunction with the Java sample shown above, you would embed the requests into the command strings of the code. Note that not all commands go to the same servlet, so you may need to specify a different servlet than the one shown in the example code.

7.2. Getting Device Lists

Devices must already be available in the RME Inventory database before the devices can be monitored by SLM. Also, the capabilities of the device must match the types of metrics that are to be collected. You can use the Admin Servlet to retrieve a list of devices that are available prior to defining an SLC. You can further specify the type of device metrics you are interested in to ensure the devices are capable of handling the desired metric type.

7.2.1. Device List Request

The following request is used to find devices that are managed by the RME Inventory and are capable of returning ICMP Metrics.

```
POST
http://myhost:1741/CSCOnm/servlet/com.cisco.nm.slam.admi
n.servlet.AdminServlet HTTP/1.0
Accept: text/html
. . .
Content-type: application/x-www-foz-m-ux-lencode
class=Inventory & cmd=GetDevices & Type=ICMP
```

7.2.2. Device List Response

A list of fully qualified device names will be returned in XML format. The hostname will be returned if it is available. Otherwise, the IP Address will be returned.

```
<?xml version="1.0"?>
<!DOCTYPE DeviceList SYSTEM DeviceList.dtd>
<DeviceList type=ICMP >
    <Device> "myhostname.mydomain.com" </ >
    <Device> "anotherhostname.mydomain.com" </ >
    <Device> "123.11.12.13" </>
</DeviceList>
```

7.3. Defining SLCs and SLAs 7.3.1. Request to Add a New SLC

The following command would add a new SLC to the folder whose handle number is 9876. If the folder ID had been omitted, the SLC would be created in the default folder.

```
POST
http://myhost:1741/CSCOnm/servlet/com.cisco.nm.slam.admi
n.servlet.AdminServlet HTTP/1.0
Accept: text/html
. . .
Content-type: application/x-www-form-urlencode
class=Slc & cmd=Add & ffolder=9876 & data=". . . URL-encoded
XML String off the SLC definition you want to create . . . "
```

7.3.2. Response to Add Request

If successful, the SLC Handle number is returned. This handle can be used for further manipulation of the SLC definition, or to retrieve the resulting SLC data. Note that it may take several hours for the data to be collected and made available on the SLM Server.

```
<SlamAdminResult>
    1234
</SlamAdminResult>
```

7.4. Getting Existing SLC Handles and Names

The SLC handles are returned when you define a new SLC. Alternatively, you can list all SLCs by getting an SLC or Folder List, find the one you want by name, and use the handles returned in the list.

7.4.1. Using SLC Lists 7.4.1.1.5 LC List Request

```
POST
http://myhost:1741/CSCOnm/servlet/com.cisco.nm.slam.admi
n.servlet.AdminServlet HTTP/1.0
Accept: text/html
. . .
Content-type: application/x-www-form-urlencode
class=Slc & cmd=Enumerate
```

SLC List Response:

```
<SlcList>
    <Slc handle="7654">
        <Name>"SLC Number 1"</Name>
            <LastModifiedTime> "08-Sep-1999:15:03" </LastModifiedTime>
    </Slc>
    <Slc handle="8765">
        <Name>"Another SLC"</Name>
            <LastModifiedTime> "08-Sep-1999:15:03" </LastModifiedTime>
    </Slc>
    <Slc handle="9876">
        <Name>"Yet Another SLC"</Name>
            <LastModifiedTime> "08-Sep-1999:15:34" </LastModifiedTime>
    </Slc>
</SlcList>
```

7.4.2. Using Folder Lists

If you're only interested in the SLC's of a particular folder, you may choose to use the Folder List rather than the SLC List mechanism. If you omit the handle from the Folder list request, all Folders and their associated SLCs will be returned.

7.4.2.1. Folder List Request

```
    POST
    http://myhost:1741/CSCOnm/servlet/com.cisco.nm.slam.admi
    n.servlet.AdminServlet HTTP/1.0
    Accept: text/html
    . . .
    Content-type: application/x-www-form-urlencode
    class=Folder & cmd=Get & folderhandle="1234"
```

7.4.2.2. Folder List Response

```
<FolderList>
    <Folder handle="1234">
        <Name>"A Folder Name"</Name>
        <SlcList>
            <Slc handle="8765">
                <Name>"Another SLC"</Name>
                                <LastModifiedTime> "08-Sep-
1999:15:03" </LastModifiedTime>
            </Slc>
            <Slc handle="9876">
                <Name>"Yet Another SLC"</Name>
                                <LastModifiedTime> "08-Sep-
1999:15:34" </LastModifiedTime>
            </Slc>
        </SlcList.>
    </Folder>
</FolderList>
```

Getting SLA Handles and Names from an Existing SLC

To get information about the SLAs included in an SLC, you must retrieve the SLC definition by using its handle. This will return the complete SLC description in XML format and will include all the SLA Handles, Names, and definitions for that SLC.

7.4.3. SLC Request:

```
        POST
                    http://hostname:1741/CSCOnm/servl
        et/com.cisco.nm.slam.admin.servlet. AdminServlet
```

-continued

```
        HTTP/1.0
        Accept: text/html
        . . .
        Content-type: application/x-www-form-urlencoded
        class2=Slc & cmd=Get & slchandle=1234
```

7.4.4. SLC Response:

```
<Slc Enabled="true" Handle="1234">
                <Name>ISP Service SLC 4</Name>
                <Comment>Testing SLC</Comment>
                <ApplyTime Zone="LOCAL">
                    <ApplyMon>
                      <FromTime>8</FromTime>
                      <ToTime>17</ToTime>
                    </ApplyMon>
                    <ApplyTue>
                      <FromTime>8</FromTime>
                      <ToTime>17</ToTime>
                    </ApplyTue>
                    <ApplyWed>
                      <FromTime>8</FromTime>
                      <ToTime>17</ToTime>
                    </ApplyWed>
                    <ApplyThu>
                      <FromTime>8</FromTime>
                      <ToTime>17</ToTime>
                    </ApplyThu>
                    <ApplyFri>
                      <FromTime>8</FromTime>
                      <ToTime>17</ToTime>
                    </ApplyFri>
                    <ApplySat>
                      <FromTime>0</FromTime>
                      <ToTime>0</ToTime>
                    </ApplySat>
                    <ApplySun>
                      <FromTime>0</FromTime>
                      <ToTime>0</ToTime>
                    </ApplySun>
                </ApplyTime>
                <Sla Handle="9876">
                    <Name>SLA9</Name>
                    <Comment>This is a demo Round
Trip Report SLA</Comment>
                    <CreateTime>Tue Aug 17
13:10:40 PDT 1999</CreateTime>
                    <ICMPMetric
SamplingInterval="1" TOS="1">
                      <ICMPThreshold>
<AvgHourlyLatency>10</AvgHourlyLatency>
<AvgDailyLatency>10</AvgDailyLatency>
```

-continued

```
<DailyAvailability>70</DailyAvailability>
<MonthlyAvailability>70</MonthlyAvailability>
                    </ICMPThreshold>
                    <ICMPDeviceSpec>
                        <SourceDevice>
host9.cisco.com </SourceDevice>
                        <TargetDevice>
host9.ibm.net</TargetDevice>
                        <CreateTime> 10-25-1999
14:06:07 GMT </CreateTime>
                    </ICMPDeviceSpec>
                    <ICMPDeviceSpec>
                        <SourceDevice>
host8.cisco.com </SourceDevice>
<TargetDevice>host8.ibm.net</TargetDevice>
                        <CreateTime> 10-25-1999
14:06:20 GMT </CreateTime>
                    </ICMPDeviceSpec>
                </ICMPMetric>
            </Sla>
            <LastModifiedTime>Sat Aug 12
01:23:00 PDT 1995</LastModifiedTime>
</Slc>
```

Retrieving SLC/SLA Data

Once you have the SLC and SLA handles, you can use this information to retrieve the available data via the Slam Data Export Servlet. You can either retrieve information about all devices included in an SLA, or you can specify a particular device pair in that SLA. You can also specify time ranges to limit the amount of data that is returned.

7.4.5. SLA Data Request

```
POST
http://hostname:1741/CSCOnm/servlet/com.cisco.nm.slam.re
port.servlet. SlamDataExportServlet HTTP/1.0
Accept: text/html
. . .
Content-type: application/x-www-form-urlencoded
slcid=4 & slaid=24 & srcdev=name1.cisco.com &
destdev=name2.cisco.com & start="08-Sep-1999:15:00" &
end="08-Sep-1999:17:00"
```

7.4.6.

7.4.7. SLA Data Response

Because no Type was specified in the request, both the Latency and Availability hourly data is returned for the requested time period:

```
<Results slcHandle="12" slaHandle="3" >
    <ICMPResult SourceDevice="MyHost.com"
TargetDevice="YourHost.com">
        <Latency Date="08-Sep-1999:15:00" Min="2"
Max="23" Avg="14"
    NumSuccessfulSamples=60 NumUnsuccessfulSamples=0
Status="ok"> </>
        <Latency Date="08-Sep-1999:16:00" Min="7"
Max="44" Avg="26"
    NumSuccessfulSamples=48 NumUnsuccessfulSamples=12
Status="ok"> </>
        <Latency Date="08-Sep-1999:17:01" Min="5"
Max="15" Avg="11"
    NumSuccessfulSamples=60 NumUnsuccessfulSamples=0
Status="ok"> </>
        <Availability Date="08-Sep-1999:15:01"
Device="0.0" Link="0.0"> </>
        <Availability Date="08-Sep-1999:16:00"
```

-continued

```
Device="0.2" Link="0.0"> </>
        <Availability Date="08-Sep-1999:17:02"
Device="0.0" Link="0.0"> </>
    </ICMPResult>
    <ICMPResult SourceDevice="AnotherHost.com"
TargetDevice="YourHost.com">
        <Latency Date="08-Sep-1999:15:00" Min="1"
Max="13" Avg="4"
    NumSuccessfulSamples=60 NumUnsuccessfulSamples=0
Status="ok"> </>
        <Latency Date="08-Sep-1999:16:00" Min="3"
Max="24" Avg="16"
    NumSuccessfulSamples=48 NumUnsuccessfulSamples=12
Status="ok"> </>
        <Latency Date="08-Sep-1999:17:01" Min="2"
Max="17" Avg="9"
    NumSuccessfulSamples=60 NumUnsuccessfulSamples=0
Status="ok"> </>
        <Availability Date="08-Sep-1999:15:01"
Device="0.0" Link="0.0"> </>
        <Availability Date="08-Sep-1999:16:00"
Device="0.2" Link="0.0"> </>
        <Availability Date="08-Sep-1999:17:02"
Device="0.0" Link="0.0"> </>
    </ICMPResult>
</Results>
```

XML Document Type Definitions (DTDs)

The following DTDs may be viewed from a SLM Server via the URL:

http://SLM_SERVER:PORT/slam/DTD/fileName.dtd

Where "SLM_SERVER" is the host name and "PORT" is the port number (if applicable) of the machine on which the SLM server is installed.

For example, to view the FolderList file via the SLM server on port 1741 of the host called MyServerName, you would enter:

http://MyServerName:1741/slam/DTD/FolderList.dtd 7.5. FolderList.dtd

```
<?xml encoding="UTF-8"?>
<!-- Revision: 1.0 FolderList.dtd -->
<!ELEMENT FolderList (Folder*)>
<!ELEMENT Folder (Name, SlcList)>
<!ATTLIST Folder Handle CDATA #IMPLIED>
<!ELEMENT SlcList (Slc*)>
<!ELEMENT Slc (Name, LastModifiedTime)>
<!ATTLIST Slc Handle CDATA #IMPLIED>
<!ELEMENT Name (#PCDATA)>
<!ELEMENT LastModifiedTime (#PCDATA)>
<!-- LastModifiedTime format: MM-DD-YYYY hh:mm:ss GMT --
>
<!-- For example: 12-20-1999 08:51:49 GMT -->
```

7.6. SLCList.dtd

```
<?xml encoding="UTF-8"?>
<!-- Revision: 1.0 SlcList.dtd -->
<!ELEMENT SlcList (Slc*)>
<!ELEMENT Slc (Name, LastModifiedTime)>
<!ATTLIST Slc Handle CDATA #IMPLIED>
<!ELEMENT Name (#PCDATA)>
<!ELEMENT LastModifiedTime (#PCDATA)>
<!-- LastModifiedTime format: MM-DD-YYYY hh:mm:ss GMT --
>
<!-- For example: 12-20-1999 08:51:49 GMT -->
```

SLC.dtd

```
<?xml version="1.0" encoding="UTF-8"?>
<!-- (C) Copyright 1999 Cisco Systems, Inc.-->
<!-- All Rights Reserved -->
<!ENTITY % UDPMetricEntity SYSTEM "UDPMetric.dtd">
<!ENTITY % ICMPMetricEntity SYSTEM "ICMPMetric.dtd">
<!ENTITY % HTTPMetricEntity SYSTEM "HTTPMetric.dtd">
<!ENTITY % DNSMetricEntity SYSTEM "DNSMetric.dtd">
<!ENTITY % VoIPMetricEntity SYSTEM "VoIPMetric.dtd">
<!-- Slc -->
<!ELEMENT Slc (Name, Comment?, Sla+, ApplyTime,
LastModifiedTime?)>
<!ATTLIST Slc Handle CDATA #IMPLIED>
<!ATTLIST Slc Enabled (true | false) "true">
<!ATTLIST Slc TimeZone CDATA #IMPLIED>
<!-- The time zone based on which daily rollup/reports
are done. -->
<!-- Currently only the server local time zone is
supported.    -->
<!ELEMENT Name (#PCDATA)>
<!ELEMENT Comment (#PCDATA)>
<!-- ApplyTime for Slc
-->
<!-- If FromTime and ToTime are both 0, it means that
Slc -->
<!-- is not applied for that day. If FromTime is 0 and
-->
<!-- ToTime is 24, then the Slc is applied all day.
-->
<!-- If Zone is LOCAL, the server local time will be
used -->
<!-- to determined the apply time. If Zone is UTC, GMT
+0 -->
<!-- will be used to determined the apply time.
-->
<!ELEMENT ApplyTime (ApplyMon, ApplyTue, ApplyWed,
ApplyThu, ApplyFri, ApplySat, ApplySun)>
<!ATTLIST ApplyTime Zone (UTC | LOCAL) #REQUIRED>
<!ELEMENT ApplyMon (FromTime, ToTime)>
<!ELEMENT ApplyTue (FromTime, ToTime)>
<!ELEMENT ApplyWed (FromTime, ToTime)>
<!ELEMENT ApplyThu (FromTime, ToTime)>
<!ELEMENT ApplyFri (FromTime, ToTime)>
<!ELEMENT ApplySat (FromTime, ToTime)>
<!ELEMENT ApplySun (FromTime, ToTime)>
<!ELEMENT FromTime (#PCDATA)>
<!ELEMENT ToTime (#PCDATA)>
<!ELEMENT LastModifiedTime (#PCDATA)>
<!-- LastModified/CreateTime format is DD-MMM-YYYY
hh:mm:ss GMT -->
<!-- For example: 20-Dec-1999 08:51:49 GMT
-->
<!-- Tags used for Device Specifications -->
<!ELEMENT SourceDevice (#PCDATA)>
<!ATTLIST SourceDevice WriteCommStr CDATA #IMPLIED>
<!ELEMENT TargetDevice (#PCDATA)>
<!ELEMENT CreateTime (#PCDATA)>
<!-- Sla -->
<!ELEMENT Sla (Name, Comment?, LastModifiedTime?,
(UDPMetric | ICMPMetric | HTTPMetric | DNSMetric |
VoIPMetric))>
<!ATTLIST Sla Handle CDATA #IMPLIED>
%UDPMetricEntity;
%ICMPMetricEntity;
%DNSMetricEntity;
%HTTPMetricEntity;
%VoIPMetricEntity;
<!-- Tags used for thresholds -->
<!ELEMENT AvgHourlyLatency (#PCDATA)>
<!ATTLIST AvgHourlyLatency unit CDATA #FIXED "msec" >
<!ELEMENT AvgDailyLatency (#PCDATA)>
<!ATTLIST AvgDailyLatency unit CDATA #FIXED "msec" >
<!ELEMENT DailyAvailability (#PCDATA)>
<!ELEMENT MonthlyAvailability (#PCDATA)>
```

UDPMetric.dtd

```
<?xml version="1.0" encoding="UTF-8"?>
<!-- (C) Copyright 1999 Cisco Systems, Inc.  -->
<!-- All Rights Reserved                     -->
<!-- DTD for UDP metric                      -->
<!ELEMENT UDPMetric (UDPThreshold, UDPDeviceSpec+)>
<!ATTLIST UDPMetric SamplingInterval (1|5|10|15|30) "5">
<!ATTLIST UDPMetric PayloadSize CDATA #IMPLIED>
<!ATTLIST UDPMetric Port (7) "7">
<!ATTLIST UDPMetric TOS CDATA #IMPLIED>
<!ELEMENT UDPDeviceSpec (SourceDevice, TargetDevice,
CreateTime?)>
<!ELEMENT UDPThreshold
(AvgHourlyLatency,AvgDailyLatency,DailyAvailability,
MonthlyAvailability)>
```

ICMPMetric.dtd

```
<?xml version="1.0" encoding="UTF-8"?>
<!-- (C) Copyright 1999 Cisco Systems, Inc.  -->
<!-- All Rights Reserved                     -->
<!-- DTD for ICMP metric                     -->
<!ELEMENT ICMPMetric (ICMPThreshold, ICMPDeviceSpec+)>
<!ATTLIST ICMPMetric SamplingInterval (1|5|10|15|30)
"5">
<!ATTLIST ICMPMetric PayloadSize CDATA #IMPLIED>
<!ATTLIST ICMPMetric TOS CDATA #IMPLIED>
<!ELEMENT ICMPDeviceSpec (SourceDevice, TargetDevice,
CreateTime?)>
<!ELEMENT ICMPThreshold
(AvgHourlyLatency,AvgDailyLatency,DailyAvailability,Monthly
Availability)>
```

7.7. DNSMetric.dtd

```
<?xml version="1.0" encoding="UTF-8"?>
<!-- (C) Copyright 1999 Cisco Systems, Inc.  -->
<!-- All Rights Reserved                     -->
<!-- DTD for DNS metric                      -->
<!ELEMENT DNSMetric (TestIPAddr, DNSThreshold,
DNSDeviceSpec+)>
<!ATTLIST DNSMetric SamplingInterval (1|5|10|15|30) "5"
>
<!ELEMENT TestIPAddr (#PCDATA)>
<!ELEMENT DNSDeviceSpec (SourceDevice, TargetDevice,
CreateTime?)>
<!ELEMENT DNSThreshold
(AvgHourlyLatency,AvgDailyLatency,DailyAvailability,Monthly
Availability)>
```

HTTPMetric.dtd

```
<?xml version="1.0" encoding="UTF-8"?>
<!-- (C) Copyright 1999 Cisco Systems, Inc.  -->
<!-- All Rights Reserved                     -->
<!-- DTD for HTTP metric                     -->
<!ELEMENT HTTPMetric (URLPath?, ProxyServer?,
NameServer?, HTTPThreshold, HTTPDeviceSpec+)>
<!ATTLIST HTTPMetric Port CDATA #IMPLIED>
<!ATTLIST HTTPMetric SamplingInterval (1|5|10|15|30)
"5">
<!ATTLIST HTTPMetric CacheEnable (true | false) "false">
<!ATTLIST HTTPMetric TOS CDATA #IMPLIED >
<!ELEMENT URLPath (#PCDATA)>
<!ELEMENT ProxyServer (#PCDATA)>
<!ELEMENT NameServer (#PCDATA)>
<!ELEMENT HTTPDeviceSpec (SourceDevice, TargetDevice,
```

-continued

```
CreateTime?)>
<!ELEMENT HTTPThreshold
(AvgHourlyLatency,AvgDailyLatency,DailyAvailability,Monthly
Availability)>
```

VOIPMetric.dtd

```
<?xml version="1.0" encoding="UTF-8"?>
<!-- (C) Copyright 1999 Cisco Systems, Inc.  -->
<!-- All Rights Reserved                     -->
<!-- DTD for voice-over-IP metric            -->
<!ELEMENT VoIPMetric (VoIPThreshold, VoIPDeviceSpec+)>
<!ATTLIST VoIPMetric SamplingInterval (1|5|10|15|30) "5"
>
<!ATTLIST VoIPMetric PacketsPerSample CDATA #REQUIRED >
<!ATTLIST VoIPMetric InterPacketInterval CDATA #REQUIRED
>
<!ATTLIST VoIPMetric PayloadSize CDATA #IMPLIED >
<!ATTLIST VoIPMetric EnableControl (true | false) "true"
>
<!ATTLIST VoIPMetric TOS CDATA #IMPLIED >
<!ATTLIST VoIPMetric SourcePort CDATA #REQUIRED>
<!ATTLIST VoIPMetric TargetPort CDATA #REQUIRED>
<!ELEMENT VoIPDeviceSpec (SourceDevice, TargetDevice,
CreateTime?)>
<!ELEMENT VoIPThreshold (Jitter, RoundTripLatency,
PacketLoss) >
<!ELEMENT Jitter (#PCDATA) >
<!ELEMENT RoundTripLatency (#PCDATA) >
<!ELEMENT PacketLoss (#PCDATA) >
```

7.8. SlamError.dtd

```
<?xml encoding="UTF-8" version="1.0"?>
<!-- (C) Copyright 1999 Cisco Systems, Inc.  -->
<!-- All Rights Reserved                     -->
<!-- DTD for Slam Error                      -->
<!ELEMENT SlamError (Descr, Cause?, Action?) >
<!ATTLIST SlamError Code CDATA #REQUIRED>
<!ATTLIST SlamError Sev CDATA #REQUIRED>
<!ELEMENT Descr (#PCDATA) >
<!ELEMENT Cause (#PCDATA) >
<!ELEMENT Action (#PCDATA) >
```

7.9. SlamAdminResult.dtd

```
<?xml encoding="UTF-8" version="1.0"?>
<!ELEMENT SlamAdminResult #PCDATA>
```

7.10. SlmResuls.dtd:

```
<?xml version="1.0" encoding="UTF-8"?>
<!-- (C) Copyright 1999 Cisco Systems, Inc.-->
<!-- All Rights Reserved -->
<!ENTITY % ICMPResultEntity SYSTEM "ICMPResult.dtd">
<!ENTITY % UDPResultEntity SYSTEM "UDPResult.dtd">
<!ENTITY % DNSResultEntity SYSTEM "DNSResult.dtd">
<!ENTITY % HTTPResultEntity SYSTEM "HTTPResult.dtd">
<!ENTITY % VoIPResultEntity SYSTEM "VoIPResult.dtd">
<!-- SlmResults -->
<!ELEMENT SlmResults ((ICMPResult* | UDPResult* |
DNSResult* | HTTPResult* | VoIPResult*))>
<!ATTLIST SlmResults SlcHandle CDATA #REQUIRED>
<!ATTLIST SinResults SlaHandle CDATA #REQUIRED>
```

-continued

```
<!-- Availability subset -->
<!ELEMENT Availability EMPTY>
<!ATTLIST Availability Date CDATA #REQUIRED>
<!ATTLIST Availability DeviceDown CDATA #REQUIRED>
<!ATTLIST Availability LinkDown CDATA #REQUIRED>
<!-- Generic Latency subset -->
<!ELEMENT Latency EMPTY>
<!ATTLIST Latency Date CDATA #REQUIRED>
<!ATTLIST Latency Min CDATA #IMPLIED>
<!ATTLIST Latency Max CDATA #IMPLIED>
<!ATTLIST Latency Avg CDATA #REQUIRED>
<!ATTLIST Latency NumSuccessfulSamples CDATA #REQUIRED>
<!ATTLIST Latency NumUnsuccessfulSamples CDATA
#REQUIRED>
<!ATTLIST Latency Status CDATA #REQUIRED>
<!ATTLIST Latency StatusDesc CDATA #IMPLIED>
```

7.11. ICMPResult.dtd:

```
<?xml version="1.0" encoding="UTF-8"?>
<!-- (C) Copyright 1999 Cisco Systems, Inc.-->
<!-- All Rights Reserved -->
<!ELEMENT ICMPResult (Latency*, Availability*)>
<!ATTLIST ICMPResult SourceDevice CDATA #REQUIRED>
<!ATTLIST ICMPResult TargetDevice CDATA #REQUIRED>
```

7.12. UDPResult.dtd:

```
<?xml version="1.0" encoding="UTF-8"?>
<!-- (C) Copyright 1999 Cisco Systems, Inc.-->
<!-- All Rights Reserved -->
<!ELEMENT UDPResult (Latency*, Availability*)>
<!ATTLIST UDPResult SourceDevice CDATA #REQUIRED>
<!ATTLIST UDPResult TargetDevice CDATA #REQUIRED>
```

7.13. DNSResult.dtd:

```
<?xml version="1.0" encoding="UTF-8"?>
<!-- (C) Copyright 1999 Cisco Systems, Inc.-->
<!-- All Rights Reserved -->
<!ELEMENT DNSResult (Latency*, Availability*)>
<!ATTLIST DNSResult SourceDevice CDATA #REQUIRED>
<!ATTLIST DNSResult TargetDevice CDATA #REQUIRED>
```

7.14. HTTPResult.dtd:

```
<?xml version="1.0" encoding="UTF-8"?>
<!-- (C) Copyright 1999 Cisco Systems, Inc.-->
<!-- All Rights Reserved -->
<!ELEMENT HTTPResult (HTTPLatency*)>
<!ATTLIST HTTPResult SourceDevice CDATA #REQUIRED>
<!ATTLIST HTTPResult TargetDevice CDATA #REQUIRED>
<!ELEMENT HTTPLatency (Total, DNS, Connect, Transact)>
<!ATTLIST HTTPLatency Date CDATA #REQUIRED>
<!ATTLIST HTTPLatency NumSuccessfulSamples CDATA
#REQUIRED>
<!ATTLIST HTTPLatency NumUnsuccessfulSamples CDATA
#REQUIRED>
<!ATTLIST HTTPLatency Status CDATA #REQUIRED>
<!ATTLIST HTTPLatency StatusDesc CDATA #IMPLIED>
<!ELEMENT Total EMPTY>
<!ATTLIST Total Min CDATA #IMPLIED>
<!ATTLIST Total Max CDATA #IMPLIED>
<!ATTLIST Total Avg CDATA #REQUIRED>
<!ELEMENT DNS EMPTY>
```

-continued

```
<!ATTLIST DNS Min CDATA #IMPLIED>
<!ATTLIST DNS Max CDATA #IMPLIED>
<!ATTLIST DNS Avg CDATA #REQUIRED>
<!ELEMENT Connect EMPTY>
<!ATTLIST Connect Min CDATA #IMPLIED>
<!ATTLIST Connect Max CDATA #IMPLIED>
<!ATTLIST Connect Avg CDATA #REQUIRED>
<!ELEMENT Transact EMPTY>
<!ATTLIST Transact Min CDATA #IMPLIED>
<!ATTLIST Transact Max CDATA #IMPLIED>
<!ATTLIST Transact Avg CDATA #REQUIRED>
<!ELEMENT HTTPResponseSize EMPTY>
<!ATTLIST HTTPResponseSize Min CDATA #IMPLIED>
<!ATTLIST HTTPResponseSize Max CDATA #IMPLIED>
<!ATTLIST HTTPResponseSize Avg CDATA #REQUIRED>
```

7.15. VolPResult.dtd:

```
<?xml version="1.0" encoding="UTF-8"?>
<!-- (C) Copyright 1999 Cisco Systems, Inc.-->
<!-- All Rights Reserved -->
<!ELEMENT VoIPResult (Row*)>
<!ATTLIST VoIPResult SourceDevice CDATA #REQUIRED>
<!ATTLIST VoIPResult TargetDevice CDATA #REQUIRED>
<!ELEMENT Row (FwdJitter, BwdJitter, FwdLoss, BwdLoss,
JLatency)>
<!ATTLIST Row Date CDATA #REQUIRED>
<!ATTLIST Row NumSuccessfulSamples CDATA #REQUIRED>
<!ATTLIST Row NumUnsuccessfulSamples CDATA #REQUIRED>
<!ATTLIST Row Status CDATA #REQUIRED>
<!ATTLIST Row StatusDesc CDATA #IMPLIED>
<!ELEMENT FwdJitter EMPTY>
<!ATTLIST FwdJitter Min CDATA #IMPLIED>
<!ATTLIST FwdJitter Max CDATA #IMPLIED>
<!ATTLIST FwdJitter Avg CDATA #REQUIRED>
<!ELEMENT BwdJitter EMPTY>
<!ATTLIST BwdJitter Min CDATA #IMPLIED>
<!ATTLIST BwdJitter Max CDATA #IMPLIED>
<!ATTLIST BwdJitter Avg CDATA #REQUIRED>
<!ELEMENT FwdLoss EMPTY>
<!ATTLIST FwdLoss Min CDATA #IMPLIED>
<!ATTLIST FwdLoss Max CDATA #IMPLIED>
<!ATTLIST FwdLoss Avg CDATA #REQUIRED>
<!ELEMENT BwdLoss EMPTY>
<!ATTLIST BwdLoss Min CDATA #IMPLIED>
<!ATTLIST BwdLoss Max CDATA #IMPLIED>
<!ATTLIST BwdLoss Avg CDATA #REQUIRED>
<!ELEMENT JLatency EMPTY>
<!ATTLIST JLatency Min CDATA #IMPLIED>
<!ATTLIST JLatency Max CDATA #IMPLIED>
<!ATTLIST JLatency Avg CDATA #REQUIRED>
```

DeviceList.dtd

```
<?xml version="1.0" encoding="UTF-8"?>
<!-- (C) Copyright 1999-2000 Cisco Systems, Inc.-->
<!-- All Rights Reserved                    -->
<!ELEMENT DeviceList (Device*)>
<!ATTLIST DeviceList Type (ICMP|UDP|DNS|HTTP|VoIP|All)
"All">
<!ATTLIST DeviceList View CDATA "All">
<!ELEMENT Device (#PCDATA)>
```

SAADeviceList.dtd

```
<?xml version="1.0" encoding="UTF-8"?>
<!-- (C) Copyright 1999-2000 Cisco Systems, Inc.-->
```

-continued

```
<!-- All Rights Reserved                    -->
<!ELEMENT SAADeviceList (SAADevice*)>
<!ATTLIST SAADeviceList View CDATA "All">
<!ELEMENT SAADevice (#PCDATA)>
<!ATTLIST SAADevice Types CDATA #REQUIRED>
```

7.16.

7.17. ViewList.dtd

```
<?xml version="1.0" encoding="UTF-8"?>
<!-- (C) Copyright 1999 Cisco Systems, Inc.  -->
<!-- All Rights Reserved                      -->
<!ELEMENT ViewList (View*)>
<!ELEMENT View (#PCDATA)>
<!ATTLIST View Id CDATA #REQUIRED>
```

What is claimed is:

1. A network device configured for monitoring a level of network service provided by a service provider, comprising:

a network interface;

a processor coupled to the network interface and receiving information from the network interface;

a computer-readable medium accessible by the processor and comprising one or more sequences of instructions which, when executed by the processor, cause the processor to carry out the steps of:

receiving a schema that provides a configuration for monitoring a service level contract between the service provider and a particular customer, wherein the schema comprises:

data defining one or more metric tests for monitoring the level of network service being provided to the particular customer by the service provider, each said metric test measuring a level of service of a particular type of network operation, and including a set of one or more threshold values that define one or more particular performance metrics for the particular type of network operation, and information defining a specific time range for when the one or more metric tests are to be performed; and distributing the one or more metric tests to one or more agents, wherein the one or more agents configure devices associated with the network to perform the one or more metric tests during the specific time range and receive result information from the devices performing the one or more metric tests, wherein each of the one or more metric tests is selected from the group consisting of ICMP metric test, UDP metric test, DNS metric test, HTTP metric test and VoIP metric test.

2. The network device recited in claim 1, wherein the sequence of instructions further comprises instructions that cause the one or more processors to:

for each metric test defined in the schema, determine whether result information for that metric test is within the range of acceptable values defined by the set of one or more threshold values included with that metric test; and create and store reporting information that indicates whether the customer is actually receiving, during the specific time range, the level of network service offered by the service provider in the service level contract, said reporting information based on said determinations.

3. The network device recited in claim 1, said schema being based on Extensible Markup Language (XML), and wherein the schema models the service level contract.

4. The network device recited in claim 1, wherein the sequence of instructions further comprises the steps of:

generating, at a server, interface data for defining the schema for monitoring the service level contract; and communicating the interface data to a client that is remote from said server, wherein the interface data allows users to configure specific times for monitoring the level of service that is being provided by the service provider, and to configure the set of one or more threshold values associated with each metric test.

5. The network device recited in claim 1, wherein:

the one or more agents configure the devices to perform the one or more metric tests only within the specific time range.

6. A method for monitoring a level of network service provided by a service provider, the method comprising the computer-implemented steps of:

receiving a schema that provides a configuration for monitoring a service level contract between the service provider and a particular customer, wherein the schema comprises:

data defining one or more metric tests for monitoring the level of network service being provided to the particular customer by the service provider, each said metric test measuring a level of service of a particular type of network operation, and including a set of one or more threshold values that correspond to one or more particular performance metrics for the particular type of network operation, and information defining a specific time range for when the one or more metric tests are to be performed; and distributing the one or more metric tests to one or more agents, wherein the one or more agents configure devices associated with the network to automatically perform the one or more metric tests during the specific time range, and receive result information from the devices performing the one or more metric tests, wherein each of the one or more metric tests is selected from the group consisting of ICMP metric test, UDP metric test, DNS metric test, HTTP metric test and VoIP metric test.

7. The method recited in claim 6, further including the steps of:

for each metric test defined in the schema, determining whether result information for that metric test is within the set of one or more threshold values included in that metric test; and creating and storing reporting information that indicates whether the customer is actually receiving, during the specific time range, the level of network service offered by the service provider in the service level contract, said reporting information based on said determinations.

8. The method recited in claim 6, said schema being based on Extensible Markup Language (XML), and wherein the schema models the service level contract.

9. The method recited in claim 6, further comprising the steps of:

generating, at a server, interface data for defining the schema for monitoring the service level contract; and communicating the interface data to a client that is remote from said server, wherein the interface data allows users to configure specific times for monitoring the level of service that is being provided by the service provider, and to configure the set of one or more threshold values included with each metric test.

10. The method recited in claim 6, wherein:

the one or more agents configure the devices to perform the one or more metric tests only within the specific time range.

11. A computer readable storage medium carrying sequences of instructions for monitoring a level of network service provided by a service provider, the sequences of instructions including instructions for performing the steps of:

receiving a schema that provides a configuration for monitoring a service level contract between the service provider and a particular customer, wherein the schema comprises:

data defining one or more metric tests for monitoring the level of network service being provided to the particular customer by the service provider, each said metric test measuring a level of service of a particular type of network operation, and including a set of one or more threshold values that define one or more particular performance metrics for the particular type of network operation, and information defining a specific time range for when the one or more metric tests are to be performed; and distributing the one or more metric tests to one or more agents, wherein the one or more agents configure devices associated with the network to perform the one or more metric tests during the specific time range and receive result information from the devices performing the one or more metric tests, wherein each of the one or more metric tests is selected from the group consisting of ICMP metric test, UDP metric test, DNS metric test, HTTP metric test and VoIP metric test.

12. The computer readable storage medium recited in claim 11, further comprising instructions for performing the steps of:

for each metric test defined in the schema, determining whether result information for that metric test is within the range of acceptable values defined by the set of one or more threshold values included with that metric test; and creating and storing reporting information that indicates whether the customer is actually receiving, during the specific time range, the level of network service offered by the service provider in the service level contract, said reporting information based on said determinations.

13. The computer readable storage medium recited in claim 11, said schema being based on Extensible Markup Language (XML), and wherein the schema models the service level contract.

14. The computer readable storage medium recited in claim 11, further comprising instructions for performing the steps of:

generating, at a server, interface data for defining the schema for monitoring the service level contract; and communicating the interface data to a client that is remote from said server, wherein the interface data allows users to configure specific times for monitoring the level of service that is being provided by the service provider, and to configure the set of one or more threshold values associated with each metric test.

15. The computer readable storage medium recited in claim 11, wherein: the one or more agents configure the devices to perform the one or more metric tests only within the specific time range.

16. A network device configured for monitoring a level of network service provided by a service provider, comprising:

means for receiving a schema that provides a configuration for monitoring a service level contract between the service provider and a particular customer, wherein the schema comprises:

data defining one or more metric tests for monitoring the level of network service being provided to the particular customer by the service provider, each said metric test measuring a level of service of a particular type of network operations, and including a set of one or more threshold values that define one or more particular performance metrics for the particular type of network operation, and information defining a specific time range for when the one or more metric tests are to be performed; and means for distributing the one or more metric tests to one or more agents, wherein the one or more agents configure devices associated with the network to perform the one or more metric tests during the specific time range and receive result information from the devices performing the one or more metric tests, wherein each of the one or more metric tests is selected from the group consisting of ICMP metric test, UDP metric test, DNS metric test, HTTP metric test and VoIP metric test.

17. The network device recited in claim 16, further including:

for each metric test defined in the schema, means for determining whether result information for that metric test is within the range of acceptable values defined by the set of one or more threshold values included with that metric test; and means for creating and storing reporting information that indicates whether the customer is actually receiving, during the specific time range, the level of network service offered by the service provider in the service level contract, said reporting information based on said determinations.

18. The method recited in claim 6, wherein the range of threshold values included with a particular metric test is configured according to a level of performance specified in a service level agreement for the type of network operation measured by the particular metric test.

* * * * *